(12) United States Patent
Chang et al.

(10) Patent No.: US 9,130,893 B2
(45) Date of Patent: Sep. 8, 2015

(54) MOBILE TERMINAL AND METHOD FOR DISPLAYING MESSAGE THEREOF

(75) Inventors: Minkyoung Chang, Seoul (KR); Yunmi Kwon, Seoul (KR); Sunghye Yoon, Seoul (KR); Jian Choi, Seoul (KR); Jaeho Choi, Seoul (KR); Yunjueng Mhun, Seoul (KR); Yeonsuk Na, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 434 days.

(21) Appl. No.: 13/548,075

(22) Filed: Jul. 12, 2012

(65) Prior Publication Data

US 2013/0069969 A1 Mar. 21, 2013

(30) Foreign Application Priority Data

Sep. 15, 2011 (KR) .................. 10-2011-0092823

(51) Int. Cl.
*H04L 12/58* (2006.01)
*H04M 1/725* (2006.01)
*G09G 5/14* (2006.01)
*G06F 3/0488* (2013.01)

(52) U.S. Cl.
CPC .............. *H04L 51/04* (2013.01); *H04L 12/581* (2013.01); *H04M 1/72552* (2013.01); *G06F 3/0488* (2013.01); *G09G 5/14* (2013.01); *H04M 2250/22* (2013.01)

(58) Field of Classification Search
None
See application file for complete search history.

(56) References Cited

U.S. PATENT DOCUMENTS

| | | | | |
|---|---|---|---|---|
| 5,870,091 A | * | 2/1999 | Lazarony et al. | 715/804 |
| 5,894,305 A | * | 4/1999 | Needham | 715/733 |
| 2002/0047868 A1 | * | 4/2002 | Miyazawa | 345/835 |
| 2006/0133585 A1 | * | 6/2006 | Daigle et al. | 379/88.06 |
| 2007/0288560 A1 | * | 12/2007 | Bou-Ghannam et al. | 709/204 |
| 2009/0113452 A1 | * | 4/2009 | Grigsby et al. | 719/318 |
| 2010/0005402 A1 | * | 1/2010 | George et al. | 715/758 |
| 2010/0058203 A1 | * | 3/2010 | Moudy et al. | 715/759 |
| 2011/0260997 A1 | * | 10/2011 | Ozaki | 345/173 |

* cited by examiner

*Primary Examiner* — Mark Zimmerman
*Assistant Examiner* — Nurun N Flora
(74) *Attorney, Agent, or Firm* — Lee, Hong, Degerman, Kang & Waimey

(57) ABSTRACT

A mobile terminal and a method of controlling the same are provided. The mobile terminal displays a group chat area for displaying a group message transmitted to or received from a plurality of another parties and a private chat area for displaying a private message transmitted to or received from one of the plurality of another parties within one chat window.

20 Claims, 41 Drawing Sheets

FIG. 4
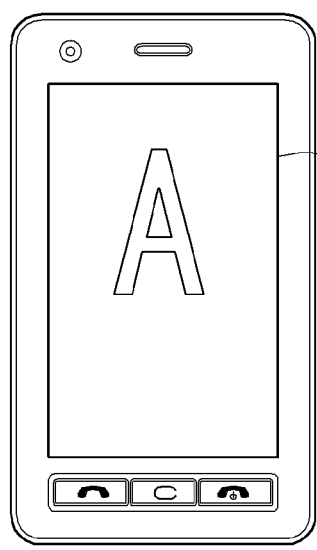
(a)
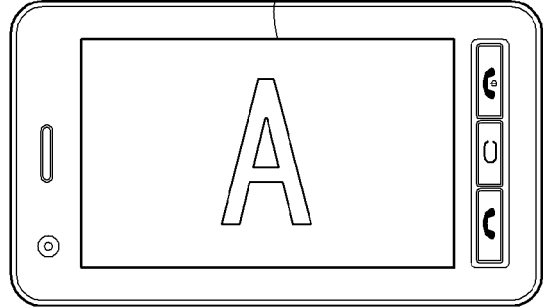
(b)

FIG. 6
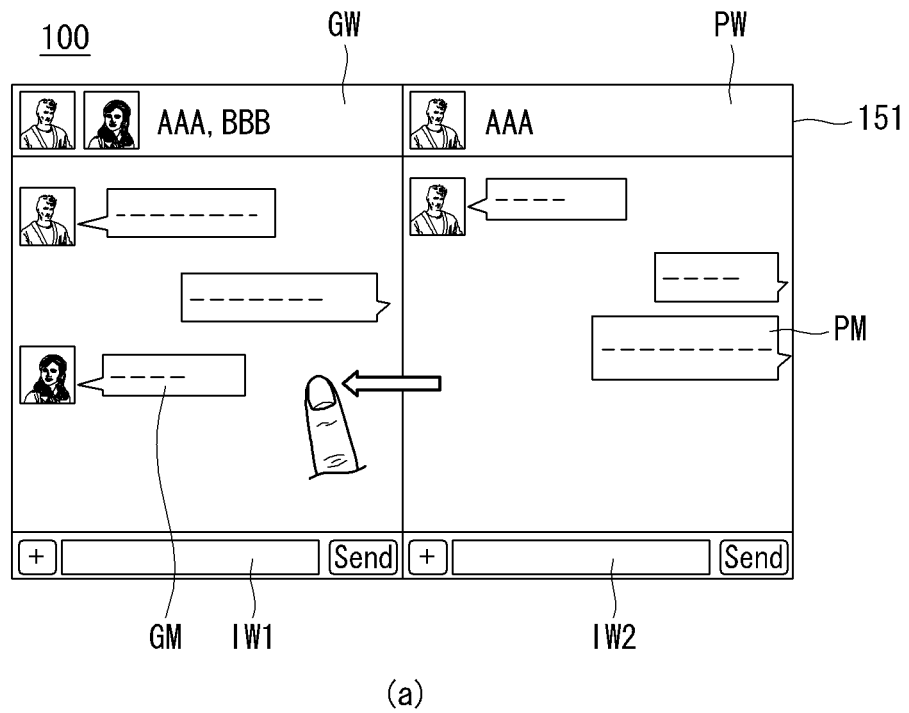
(a)
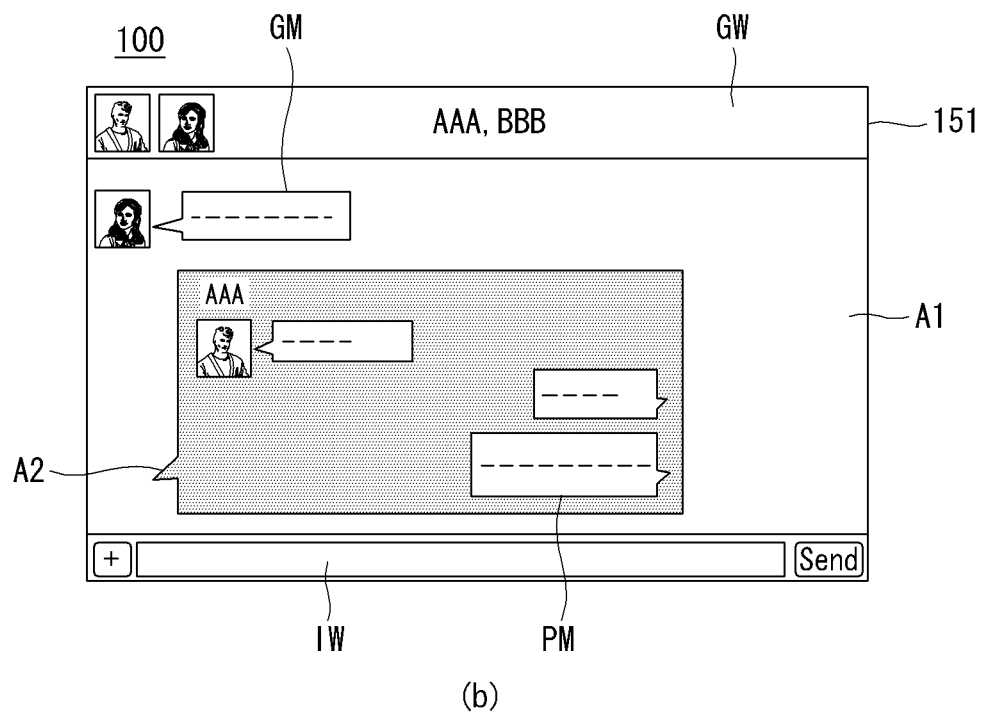
(b)

FIG. 8
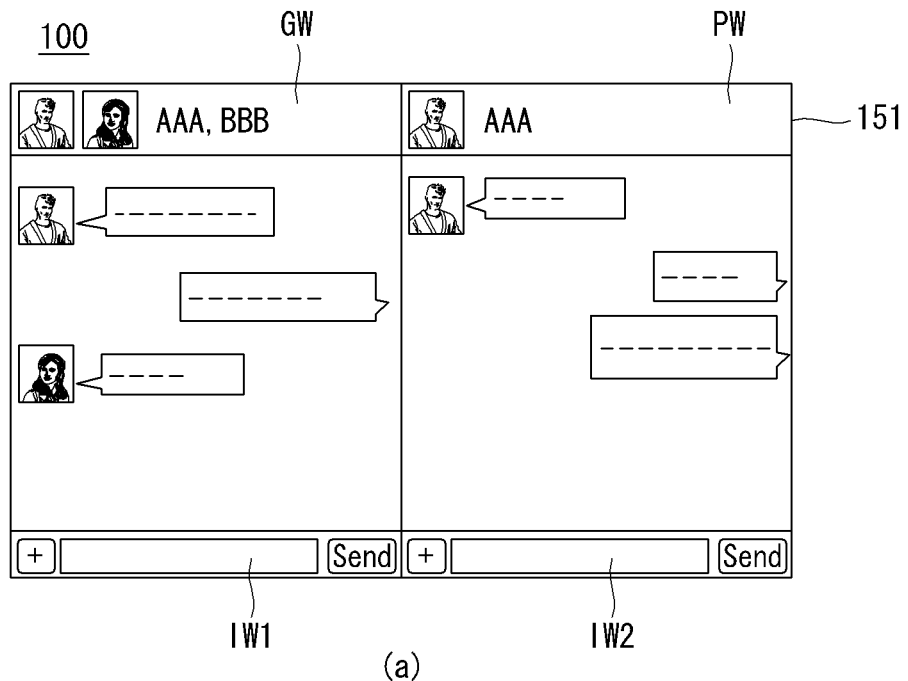
(a)
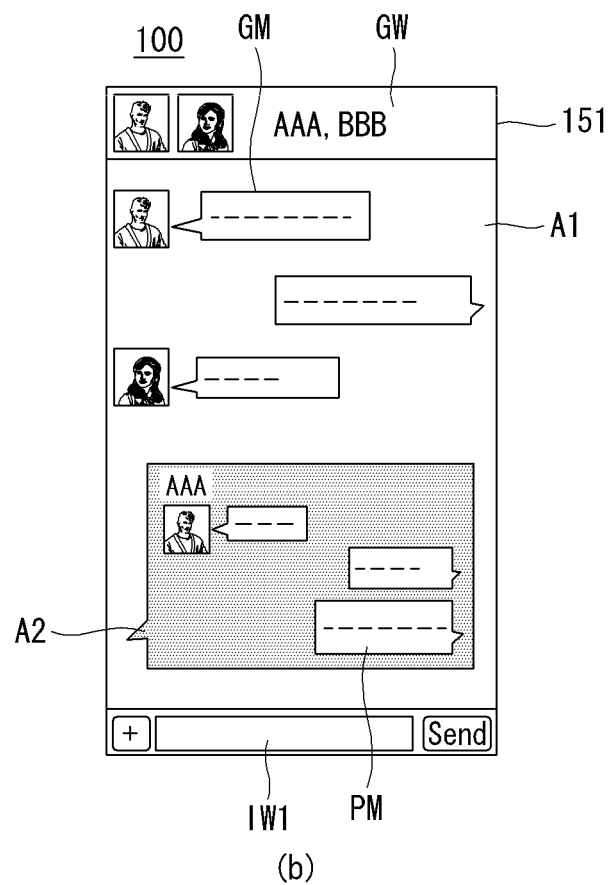
(b)

FIG. 9
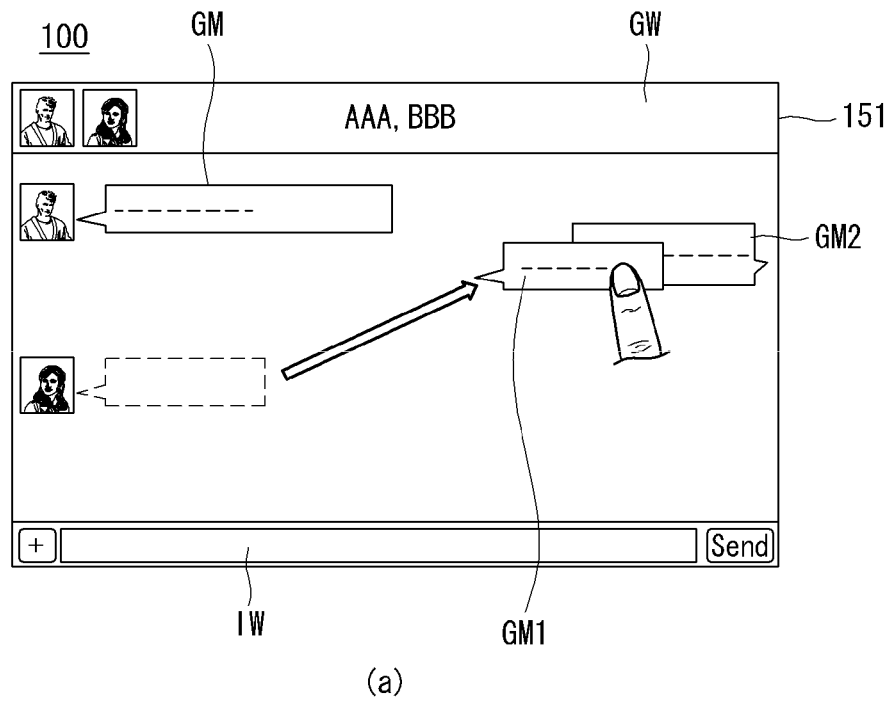
(a)
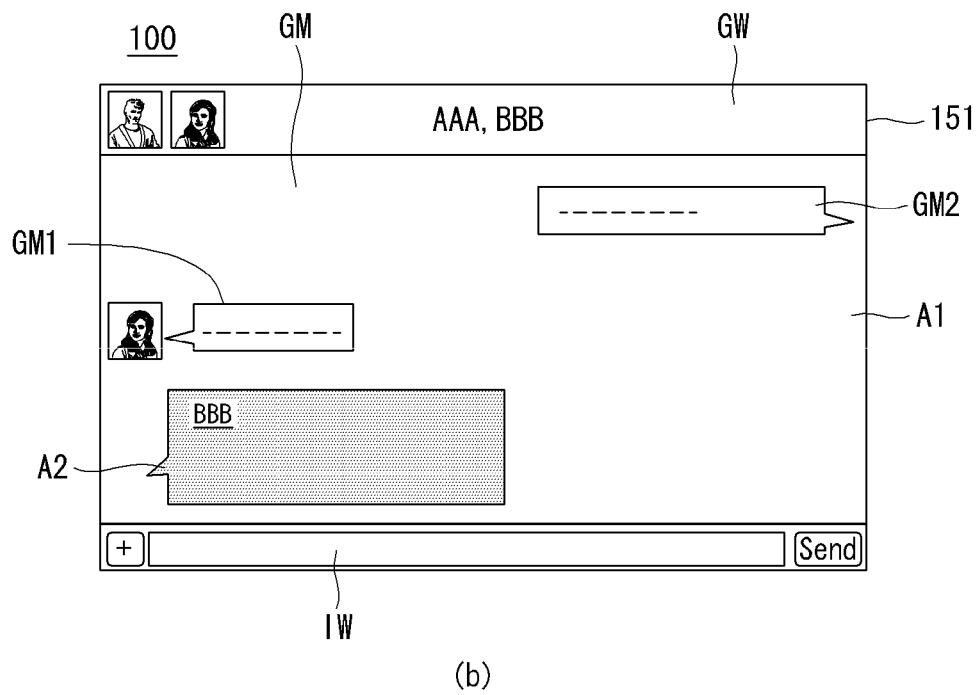
(b)

FIG. 10
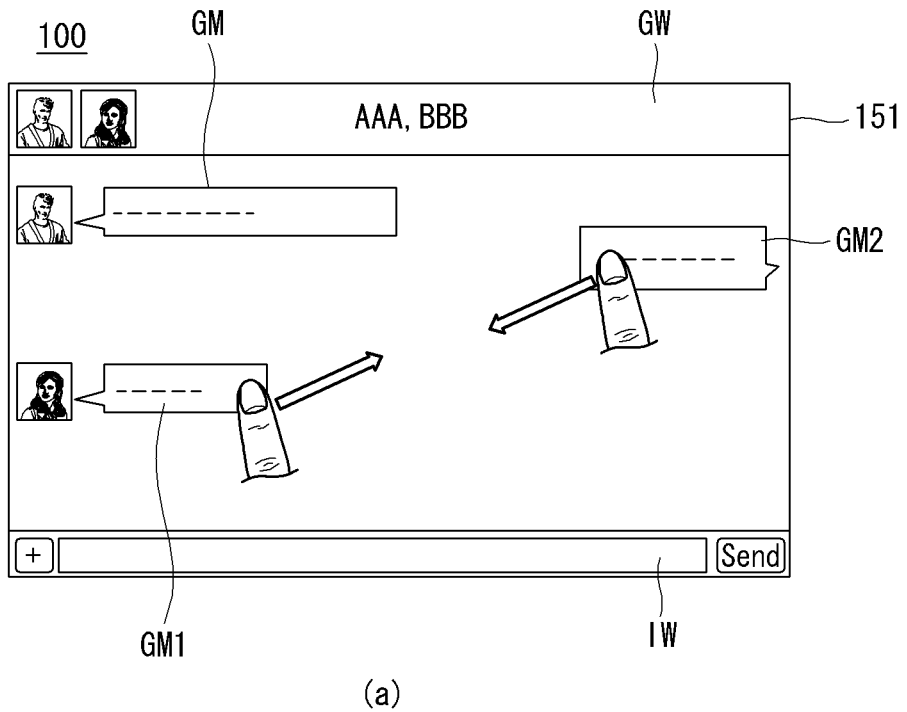
(a)
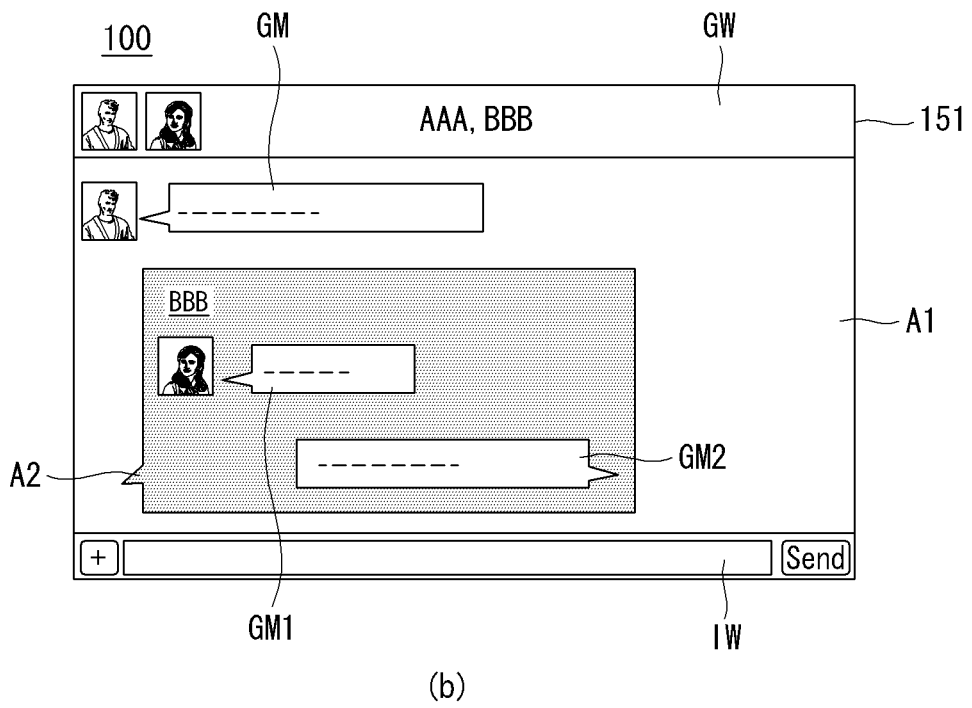
(b)

FIG. 11
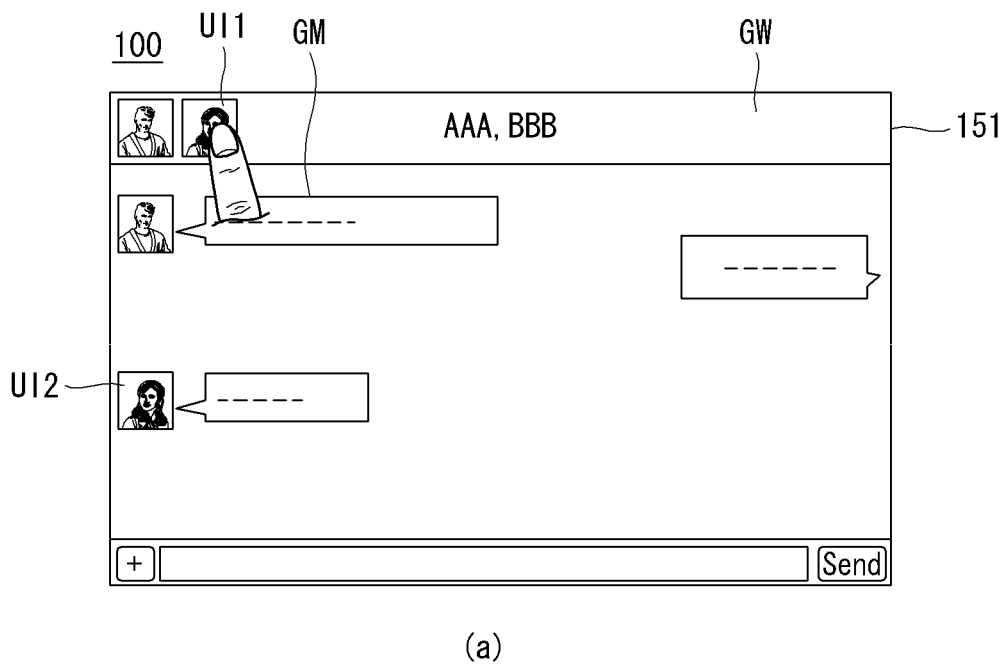
(a)
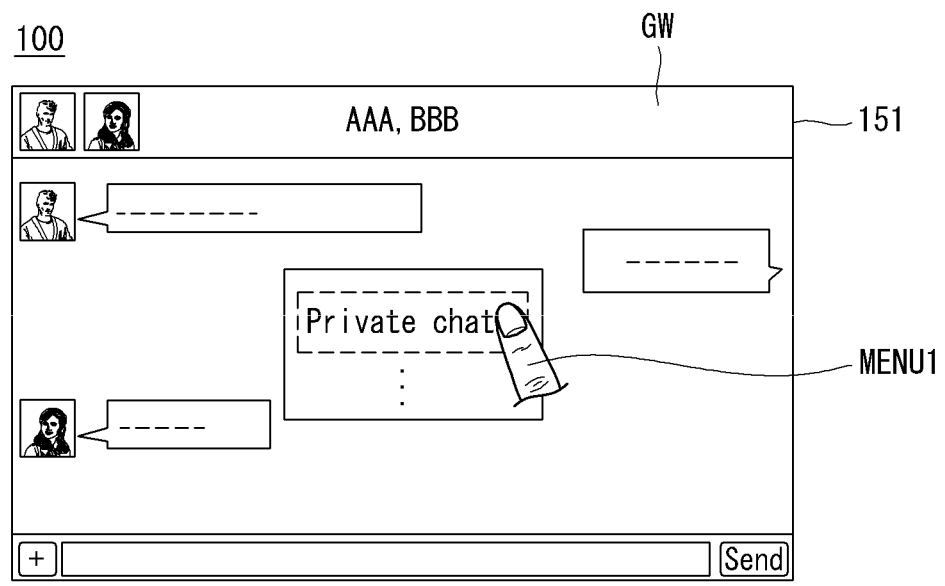
(b)

FIG. 14
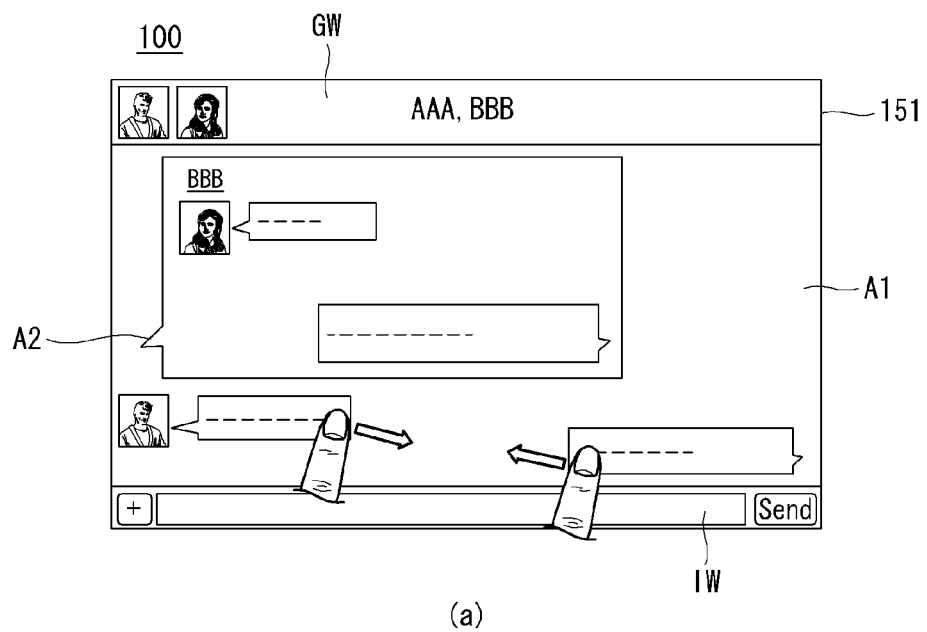
(a)
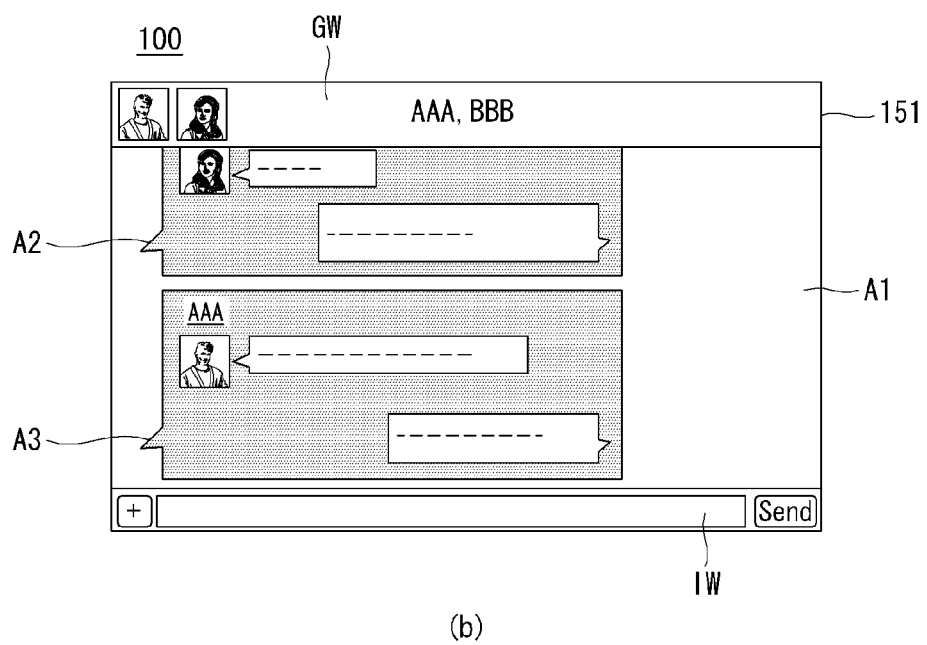
(b)

FIG. 15
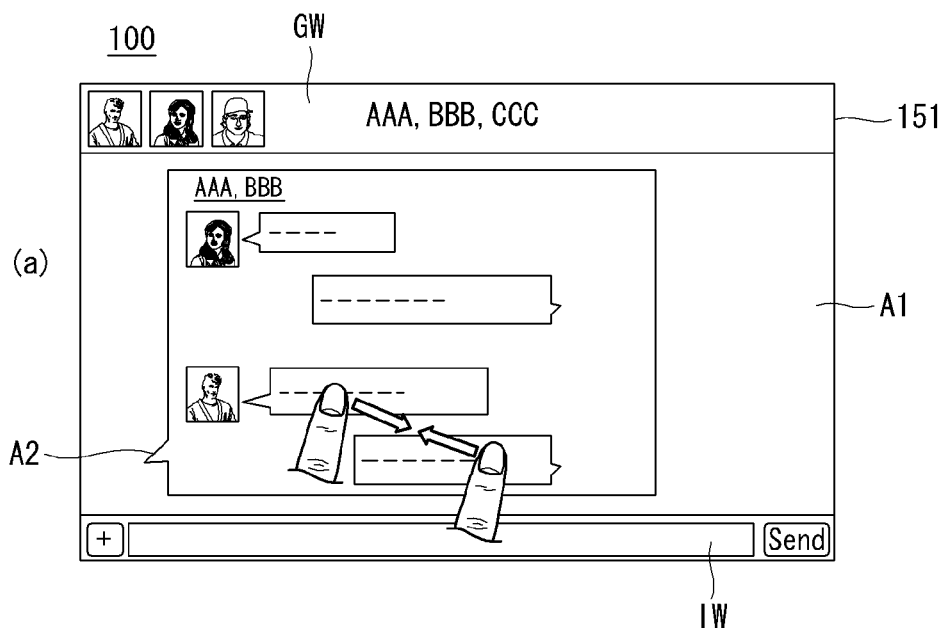
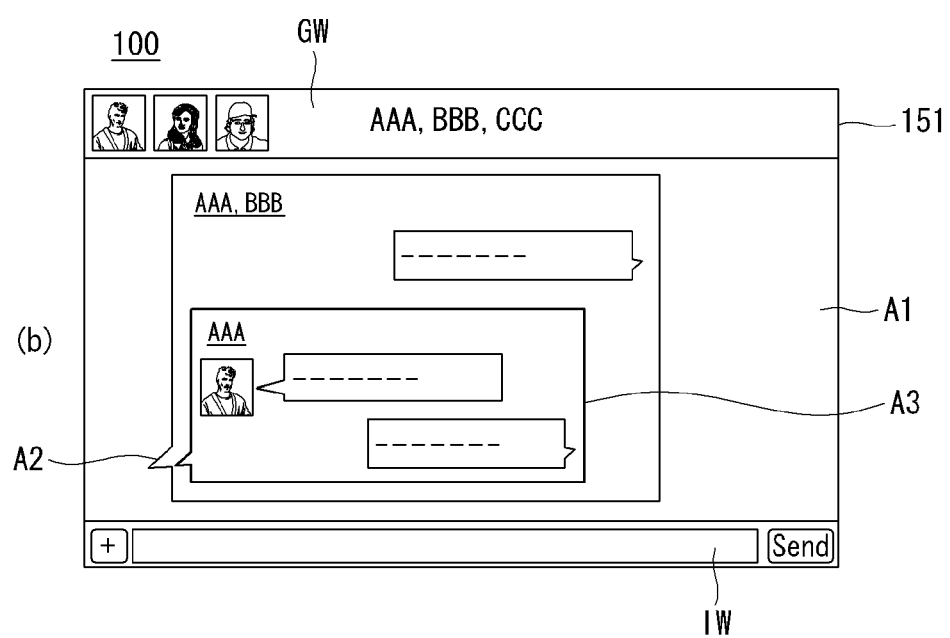

FIG. 16
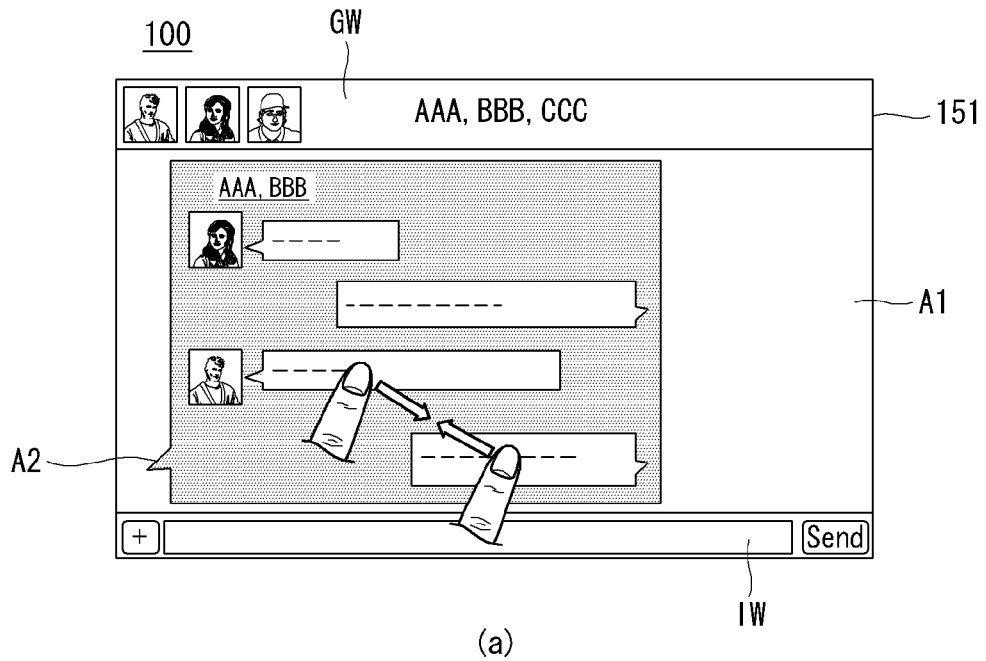
(a)
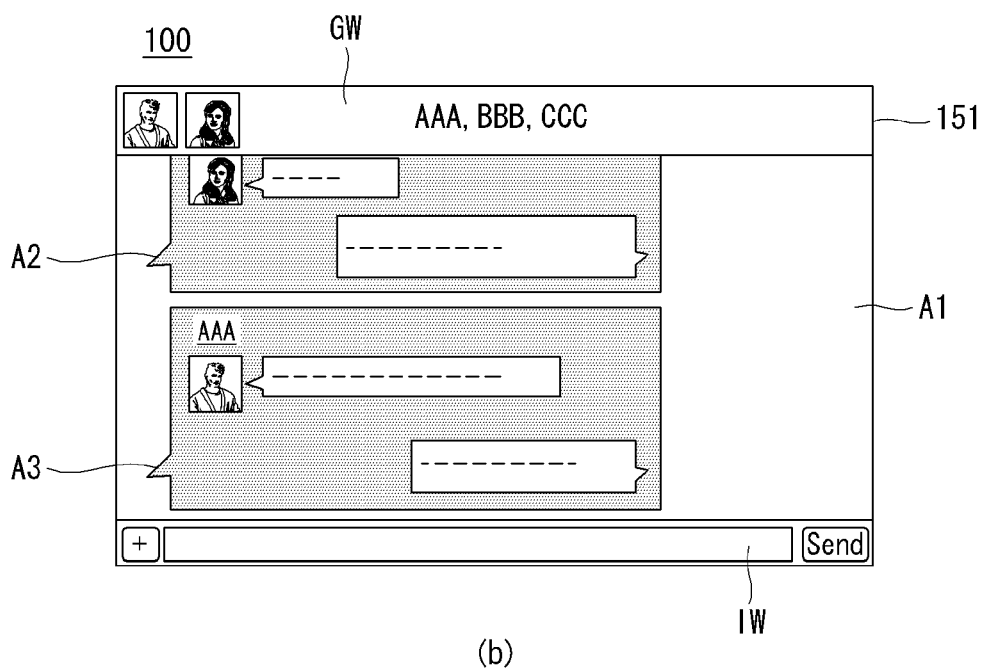
(b)

FIG. 17
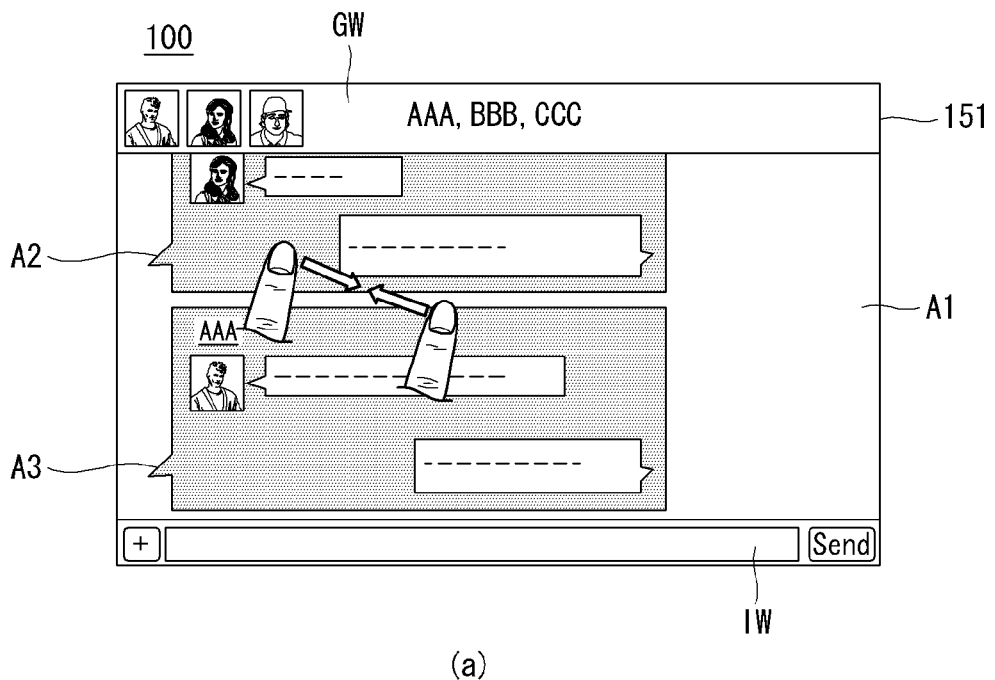
(a)
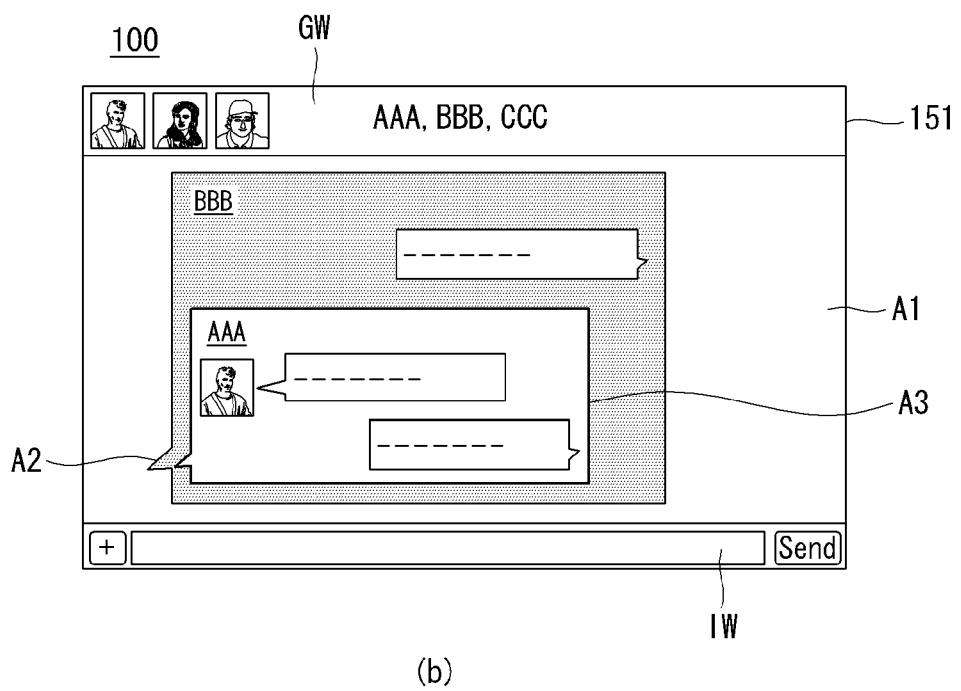
(b)

FIG. 18
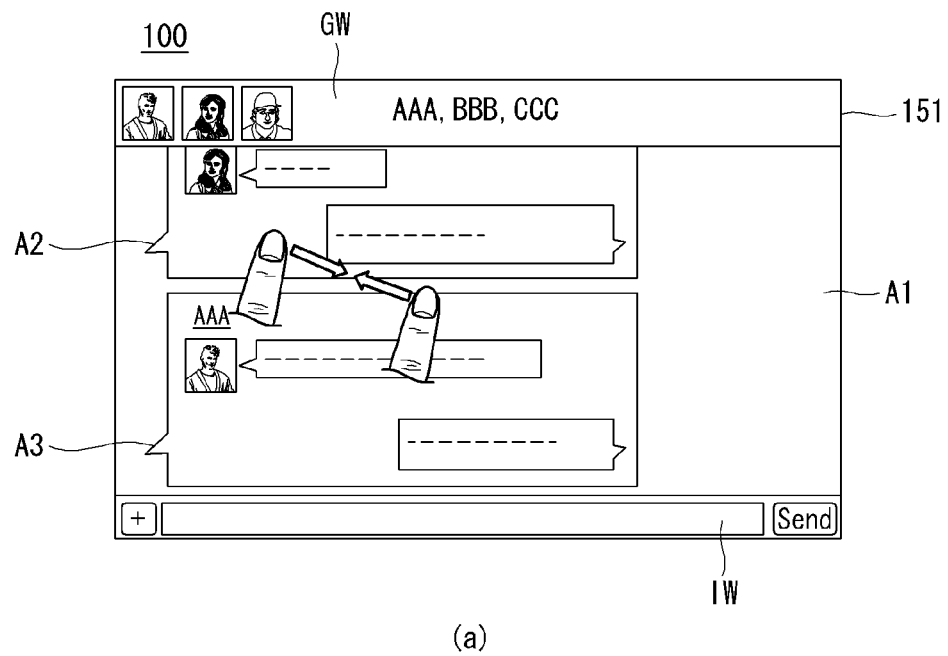
(a)
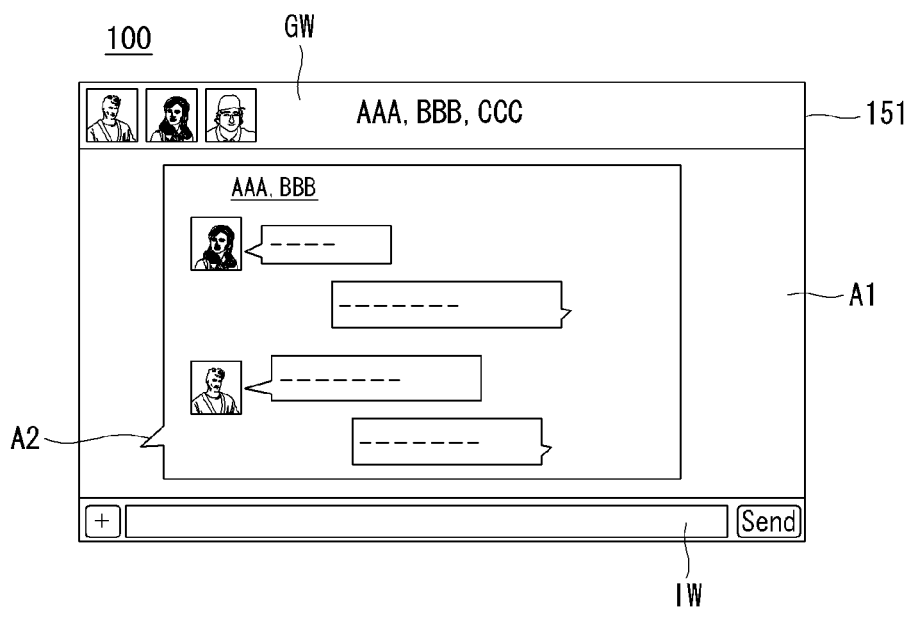
(b)

FIG. 19
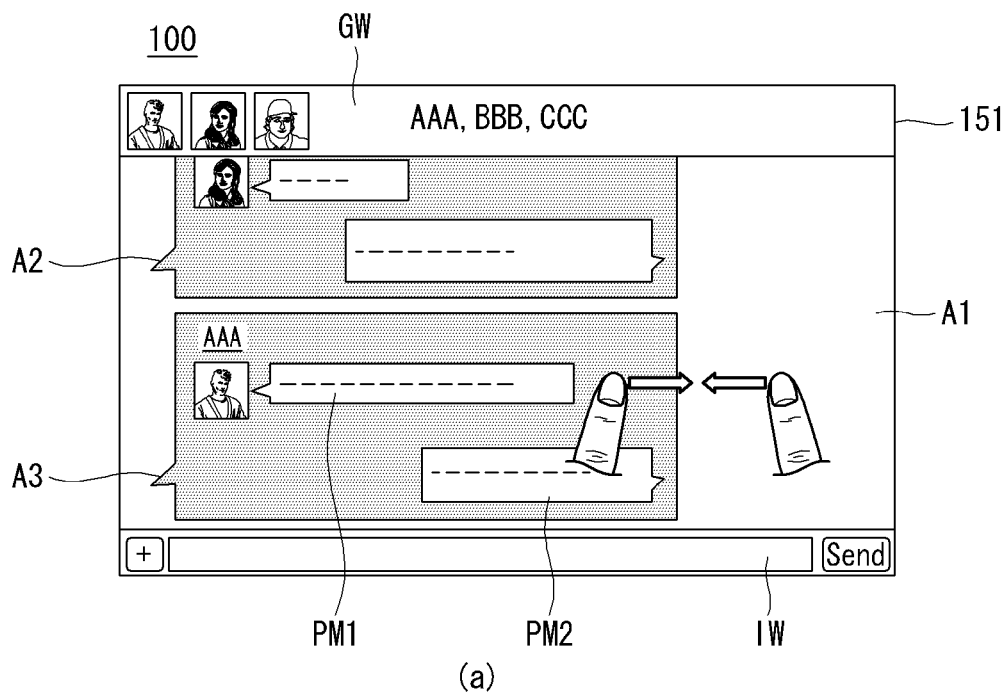
(a)
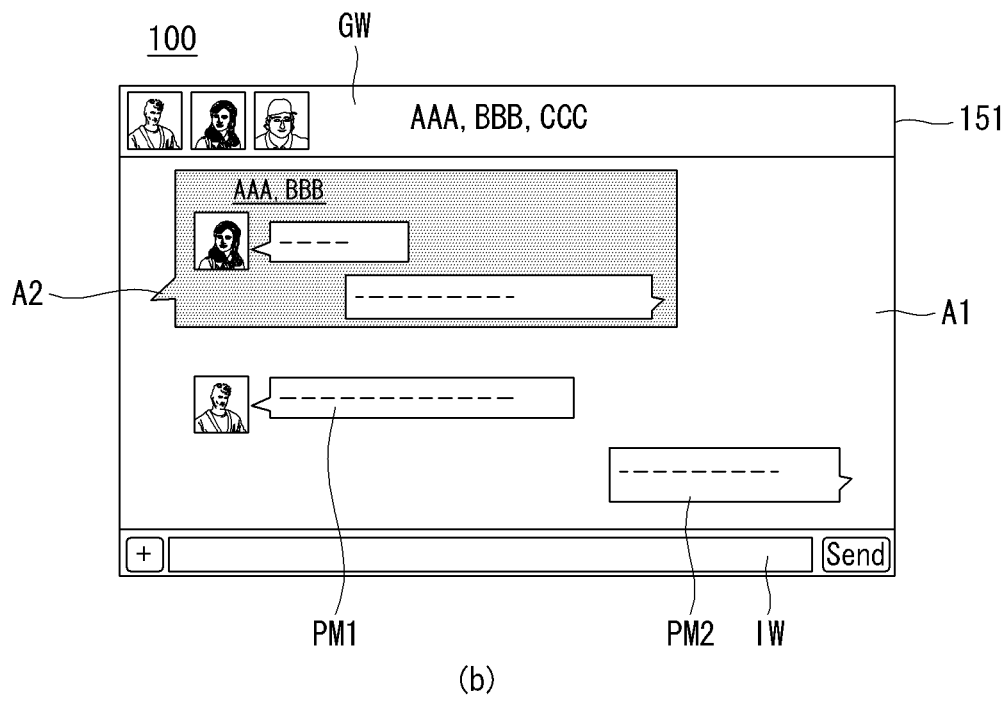
(b)

FIG. 21
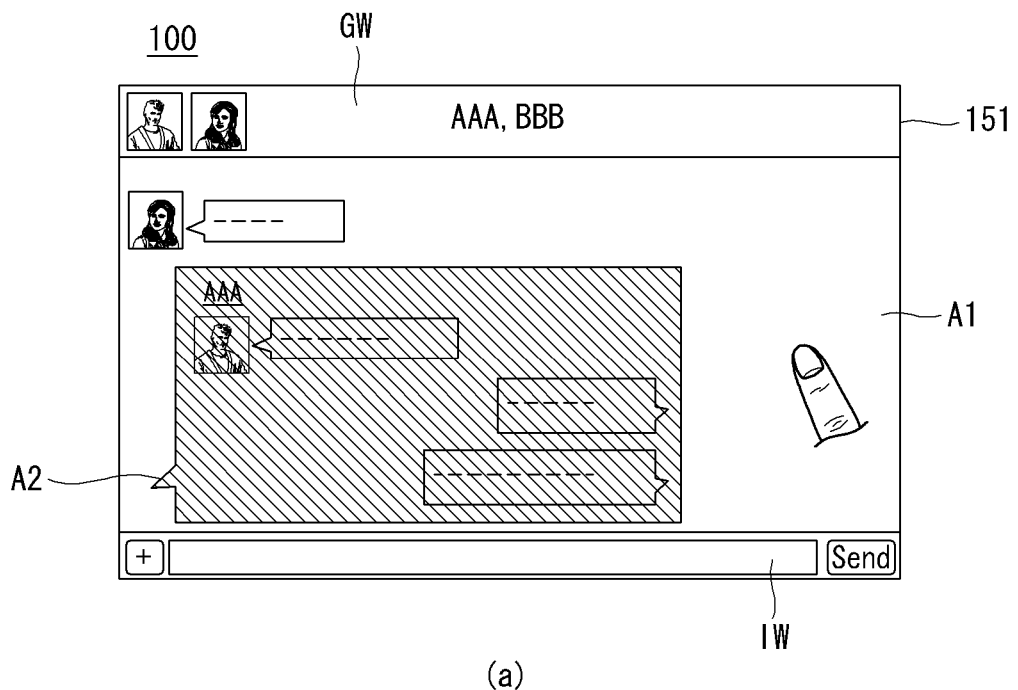
(a)
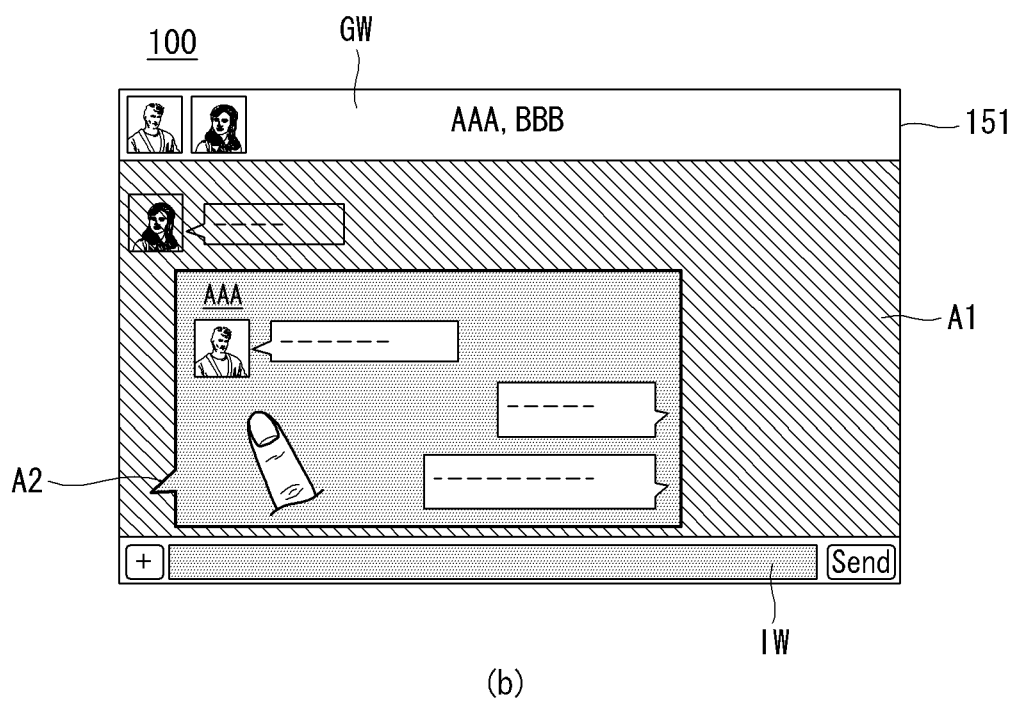
(b)

FIG. 22
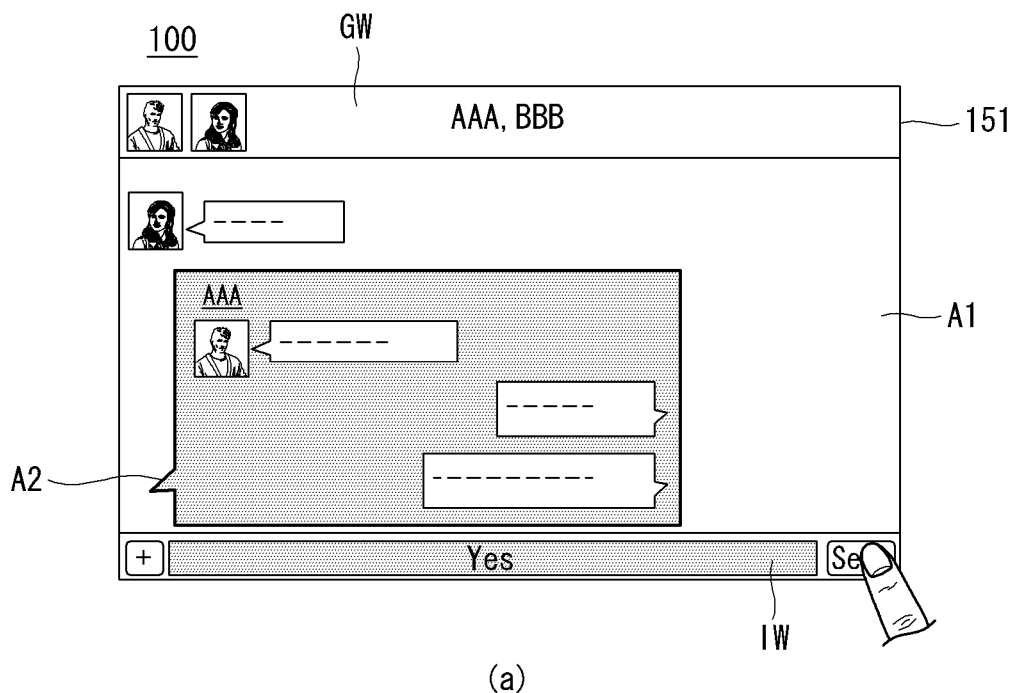
(a)
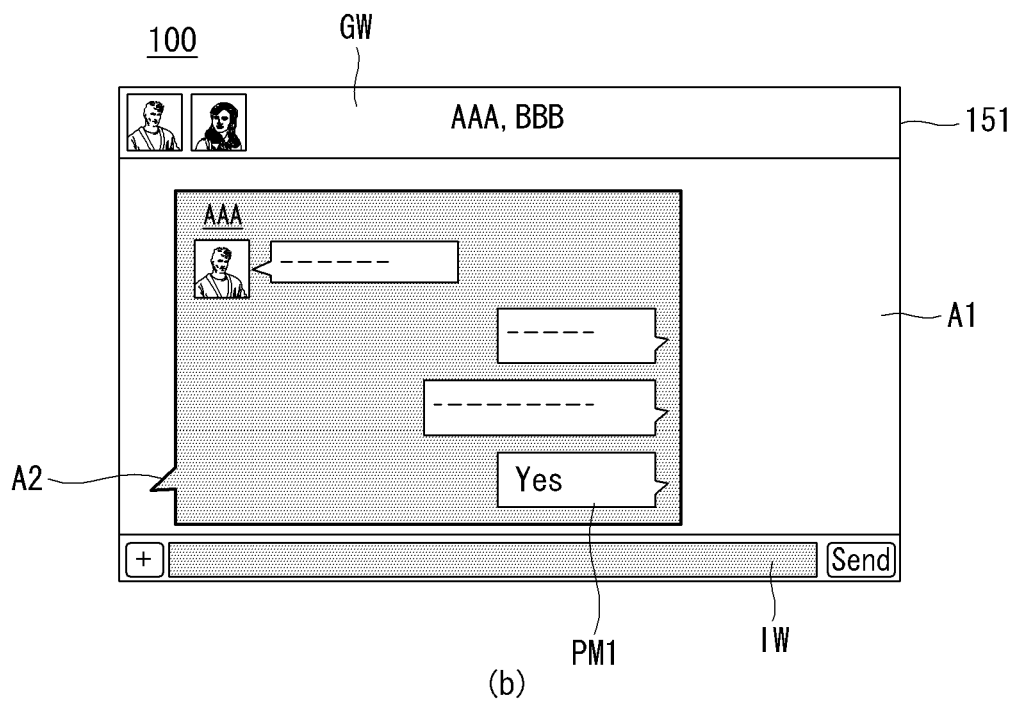
(b)

FIG. 26
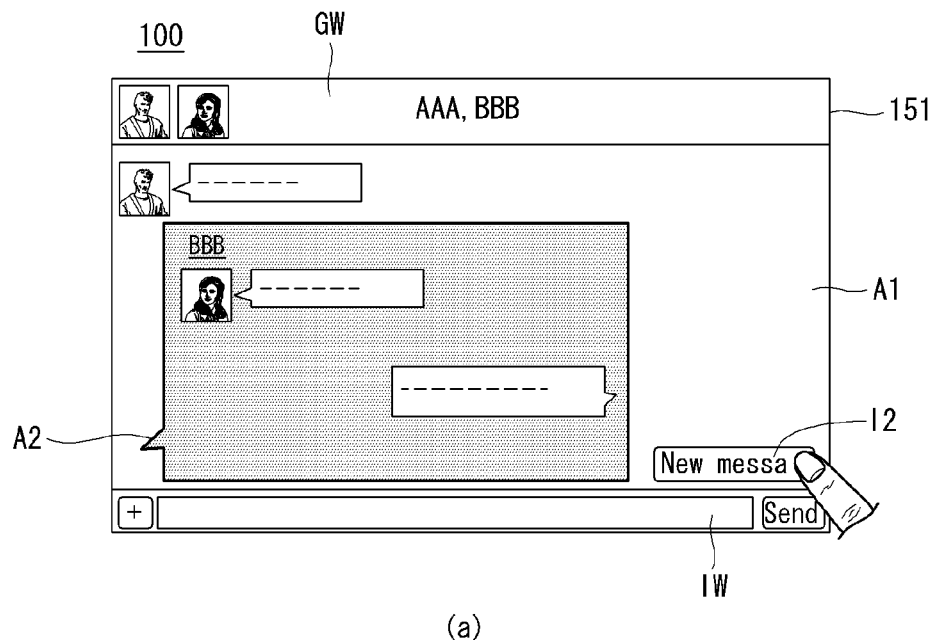
(a)
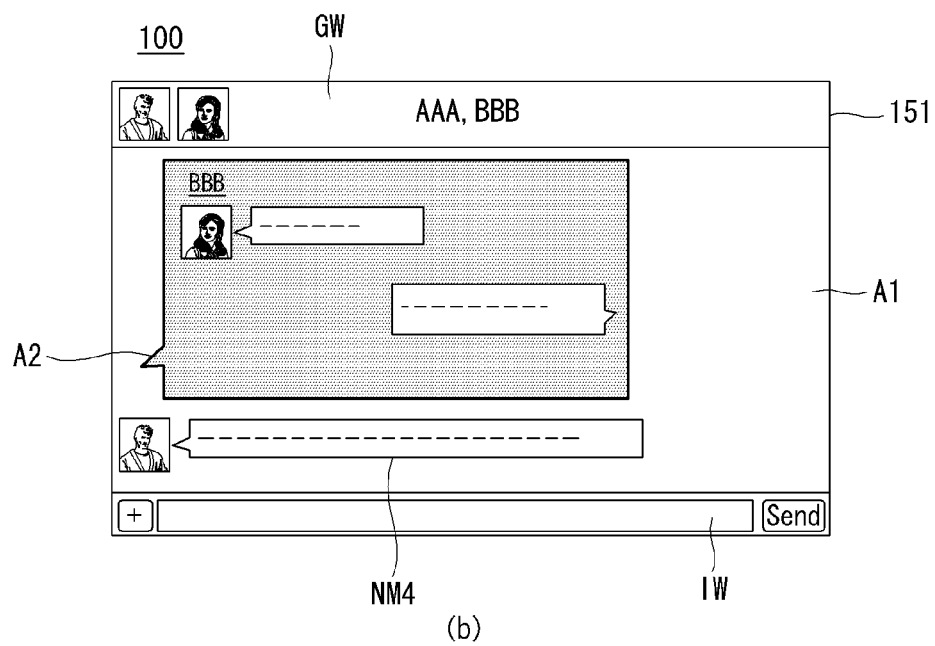
(b)

FIG. 28
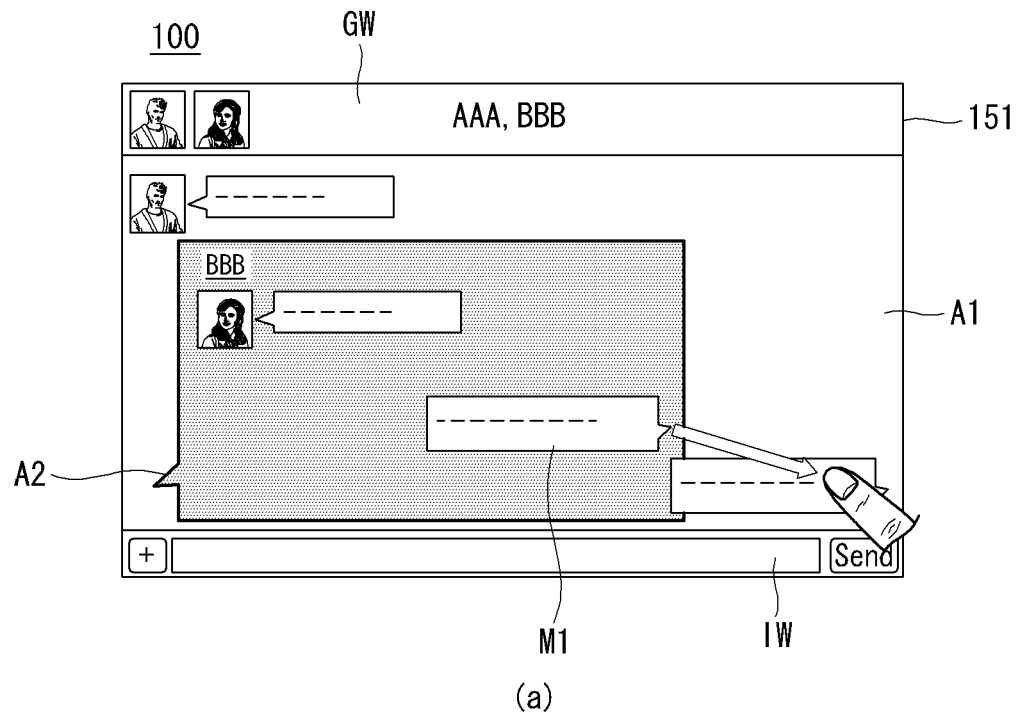
(a)
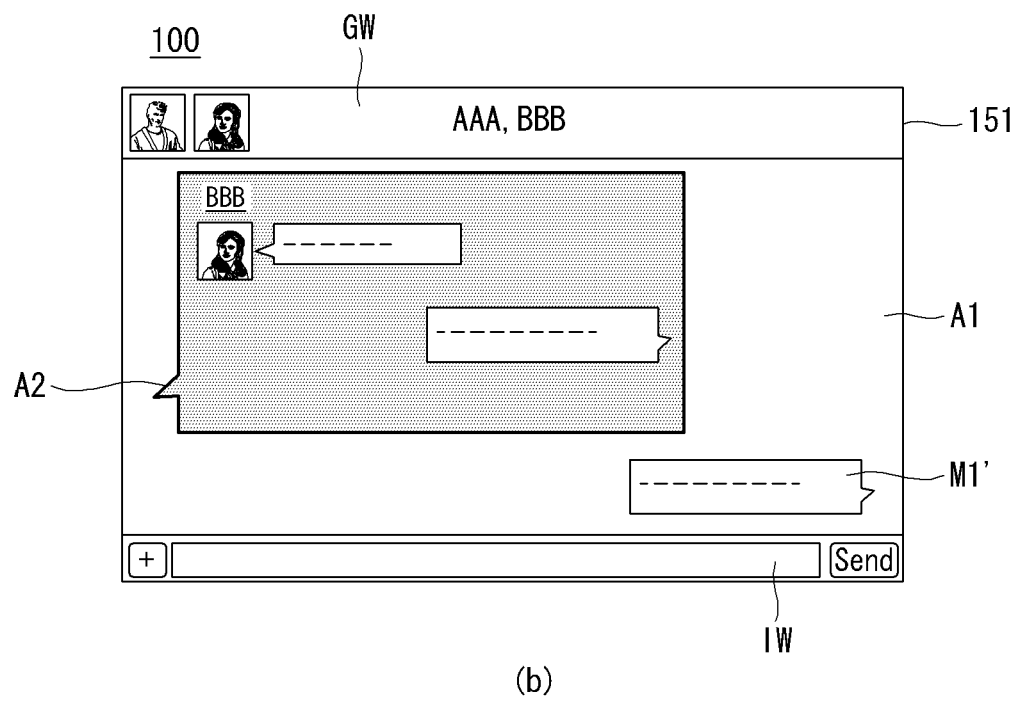
(b)

FIG. 29
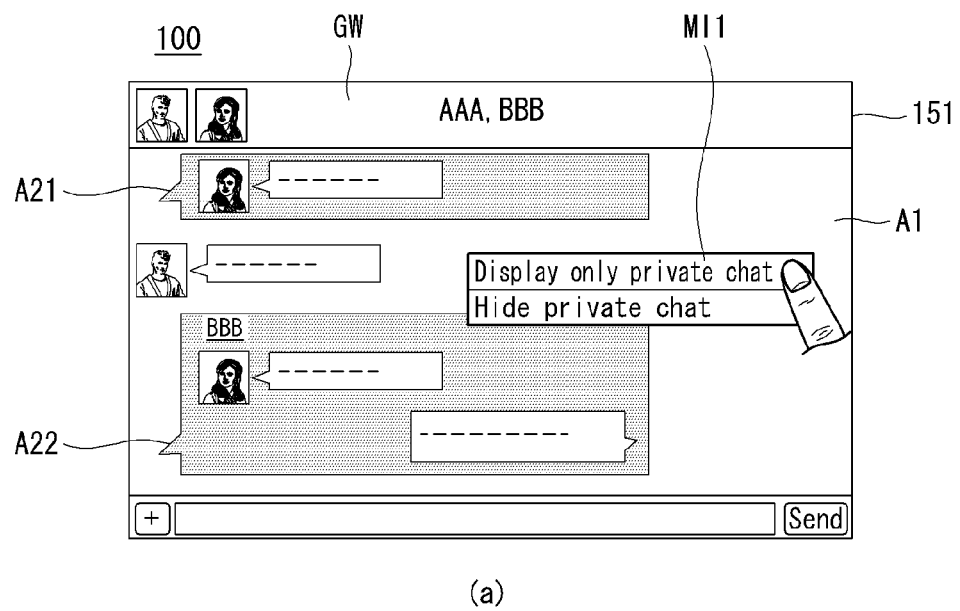
(a)
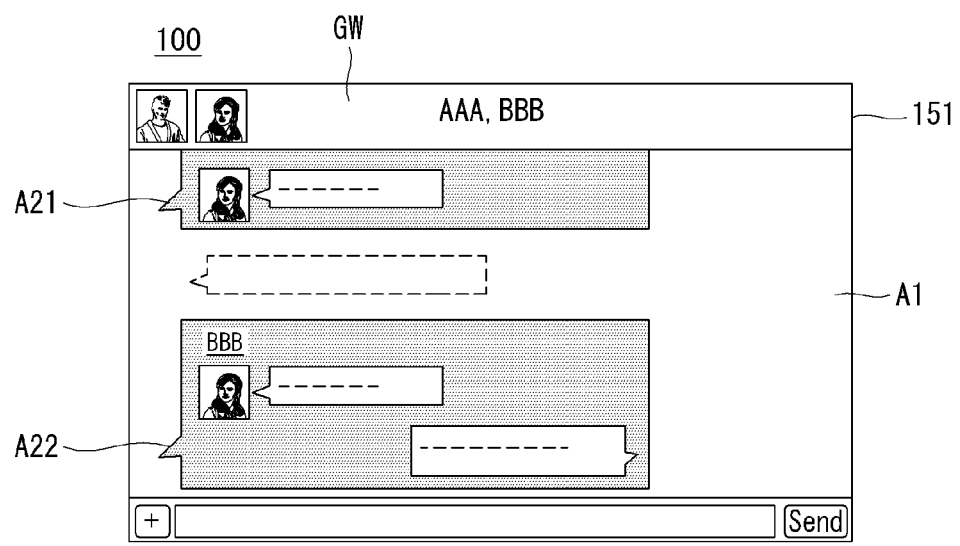
(b)

FIG. 30
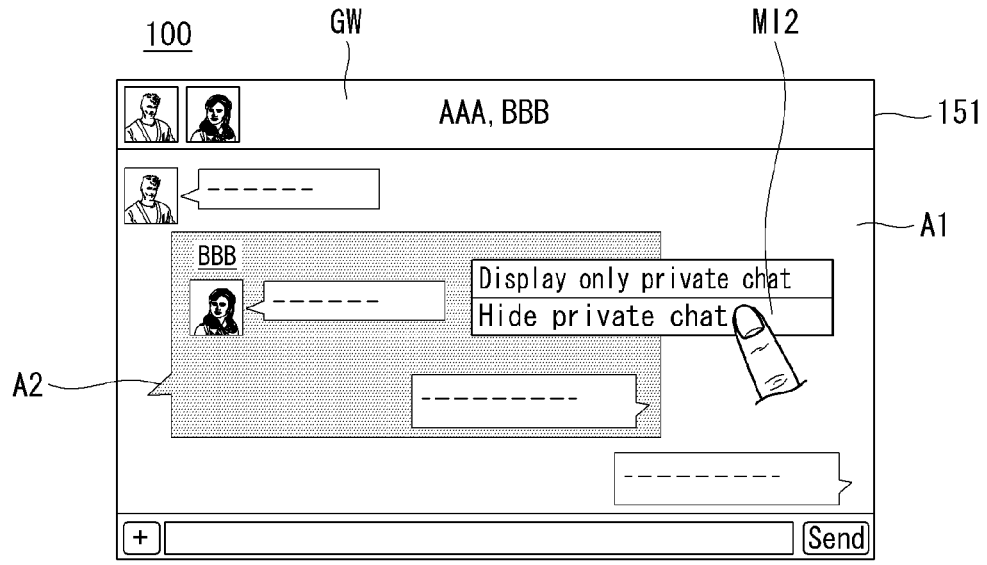
(a)
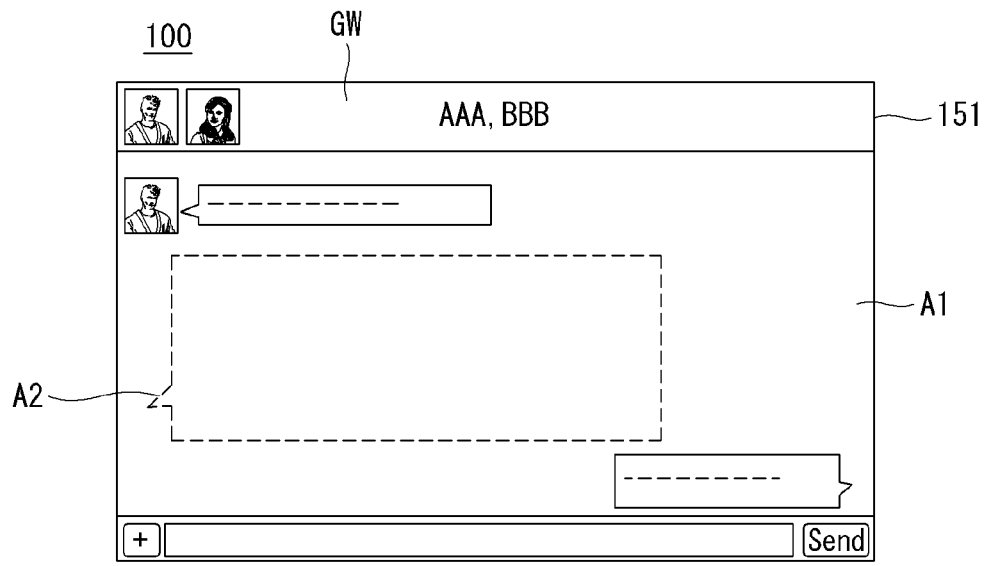
(b)

FIG. 32
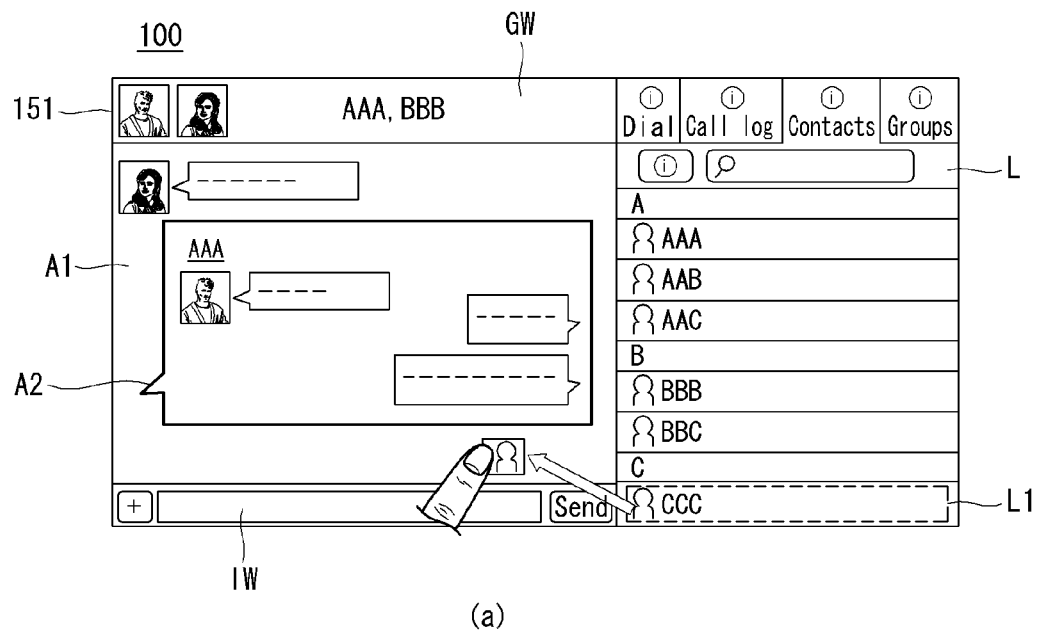
(a)
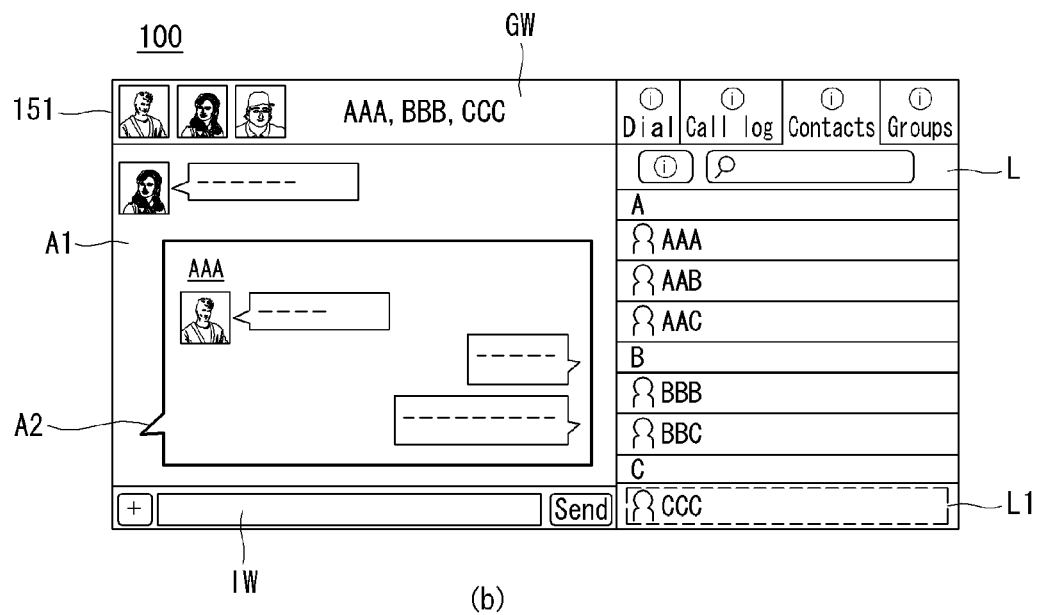
(b)

FIG. 35
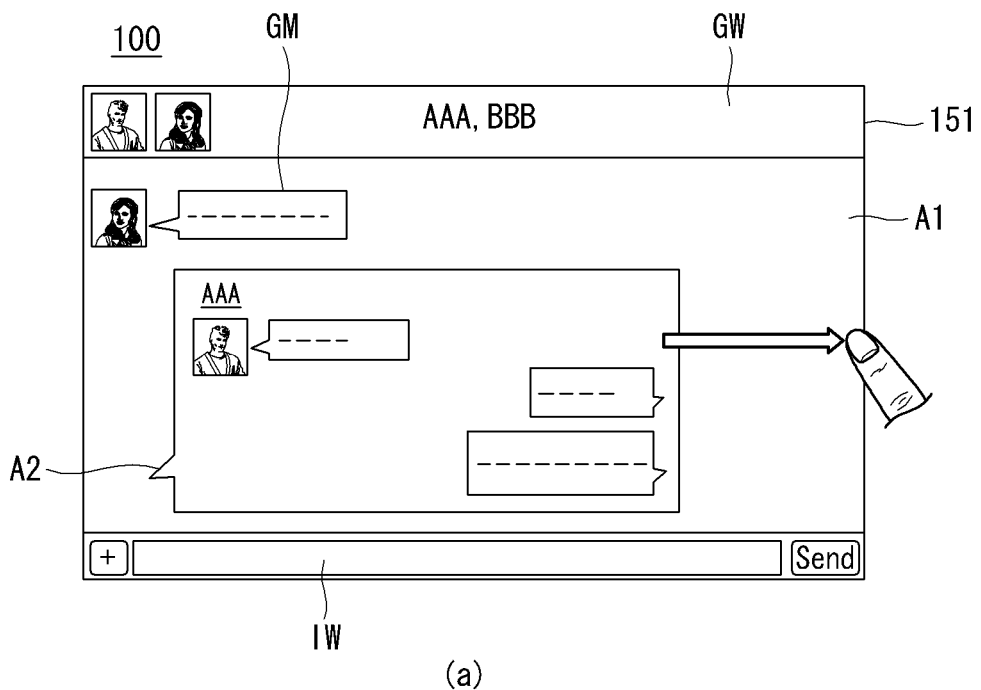
(a)
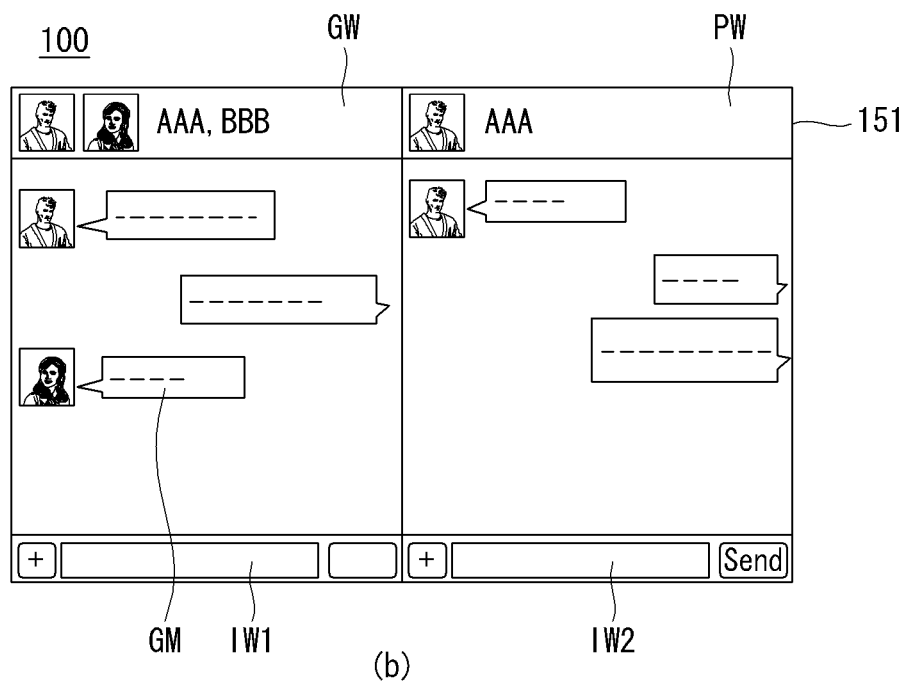
(b)

FIG. 37
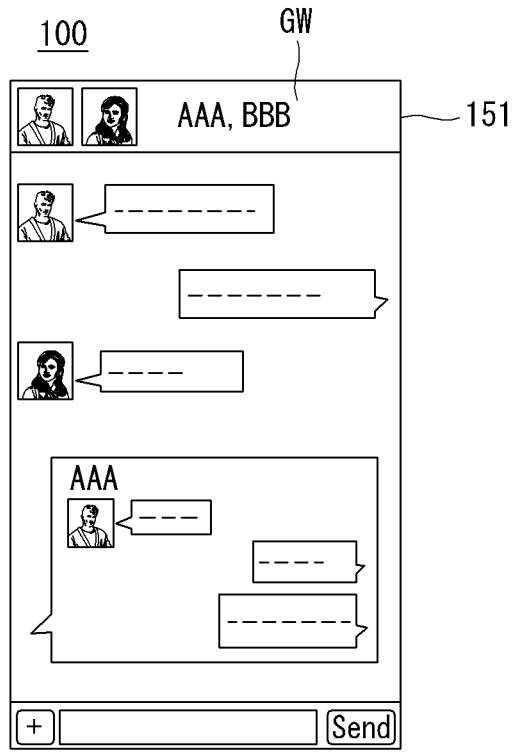
(a)
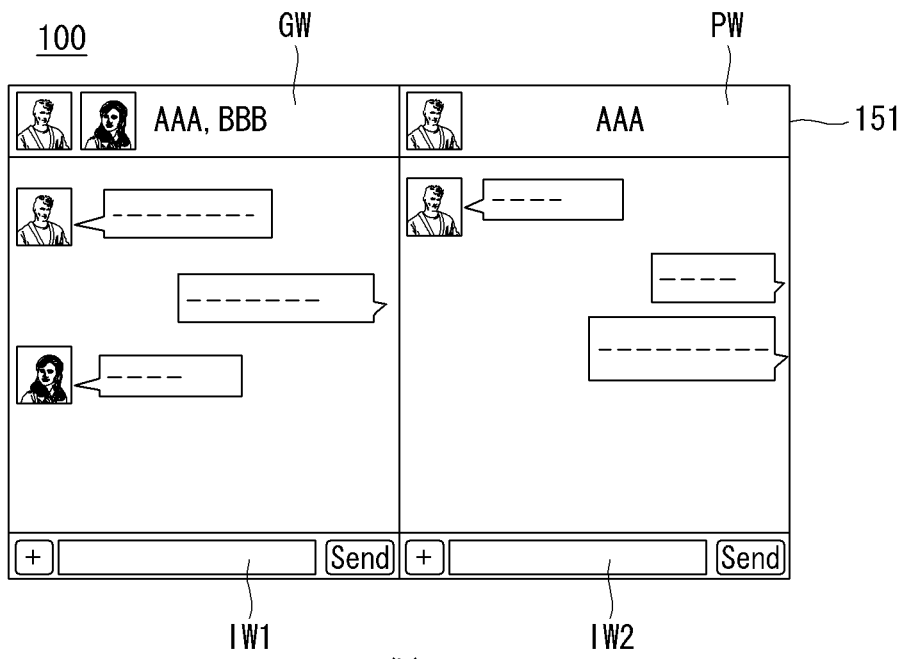
(b)

FIG. 38
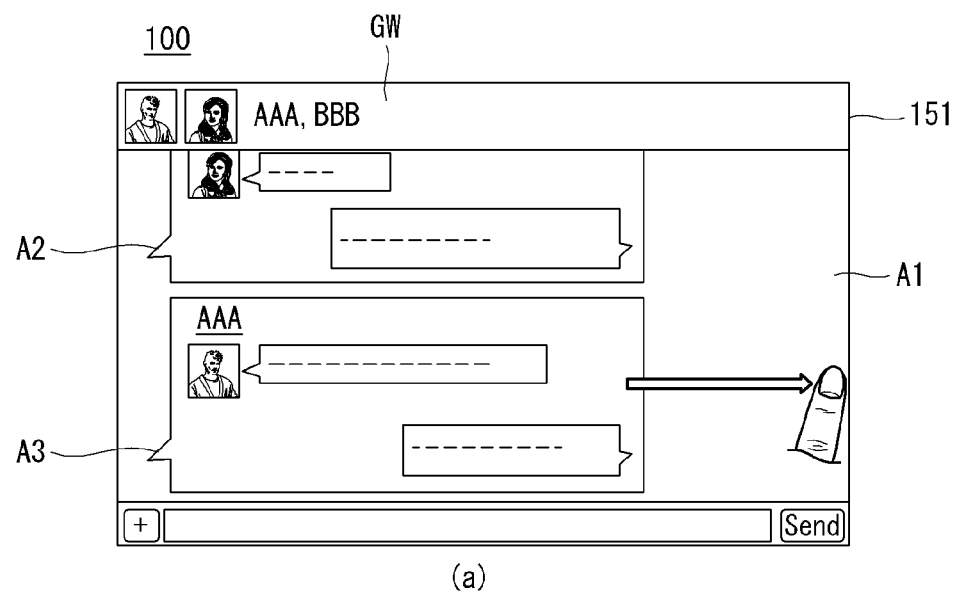
(a)
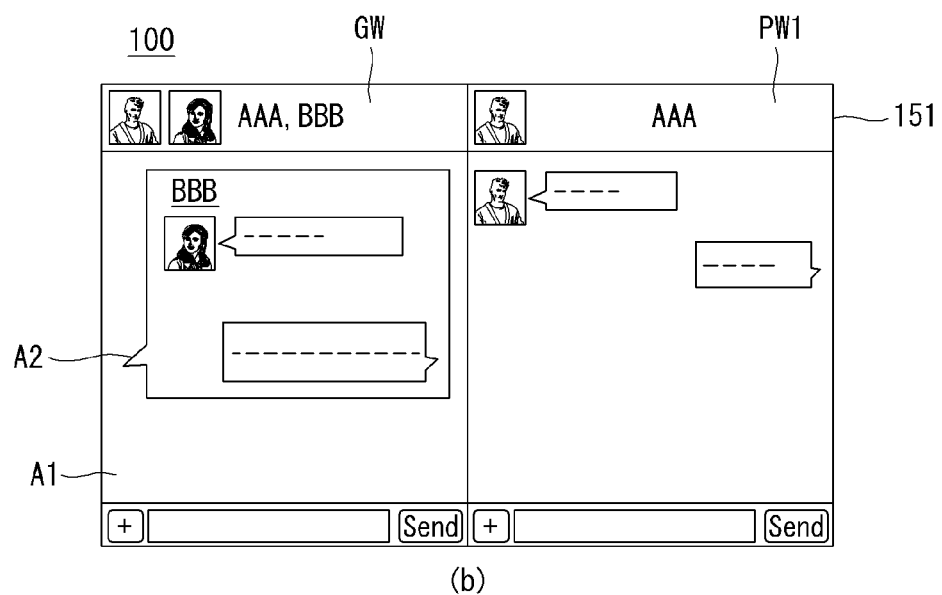
(b)

FIG. 39
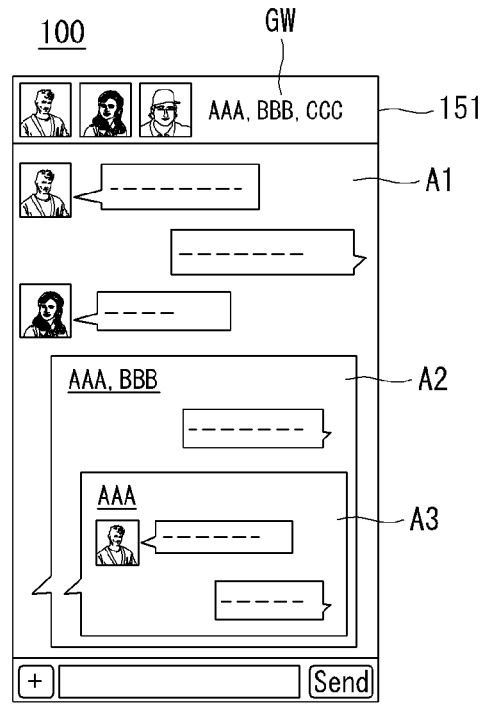
(a)
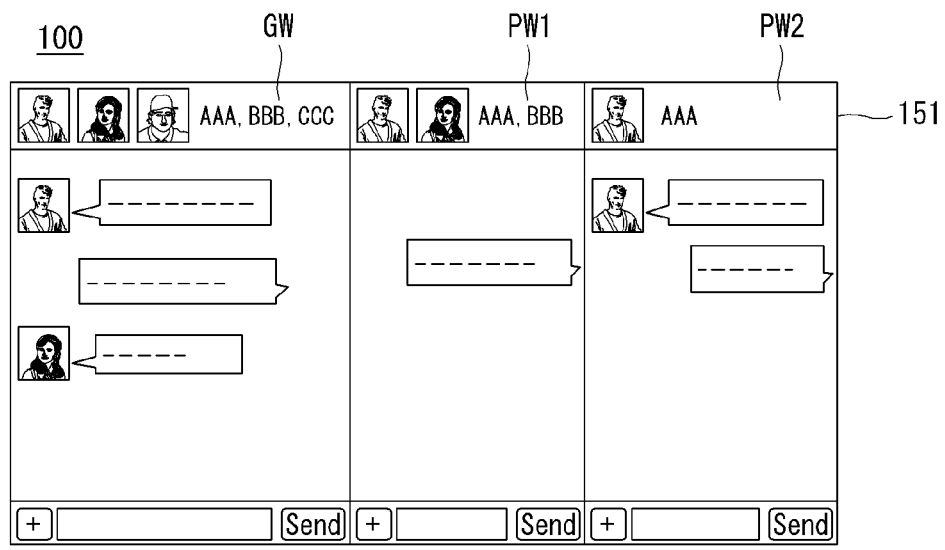
(b)

FIG. 43
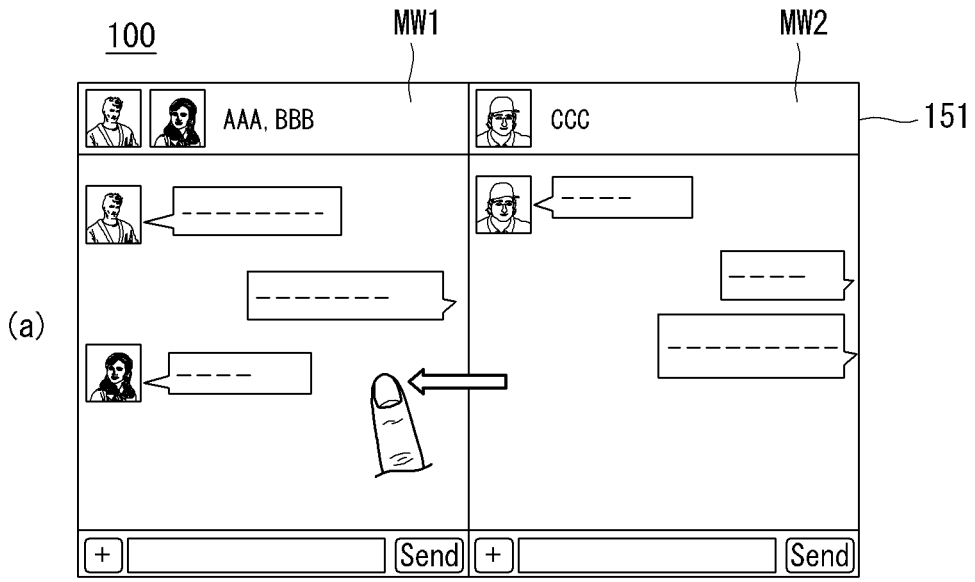
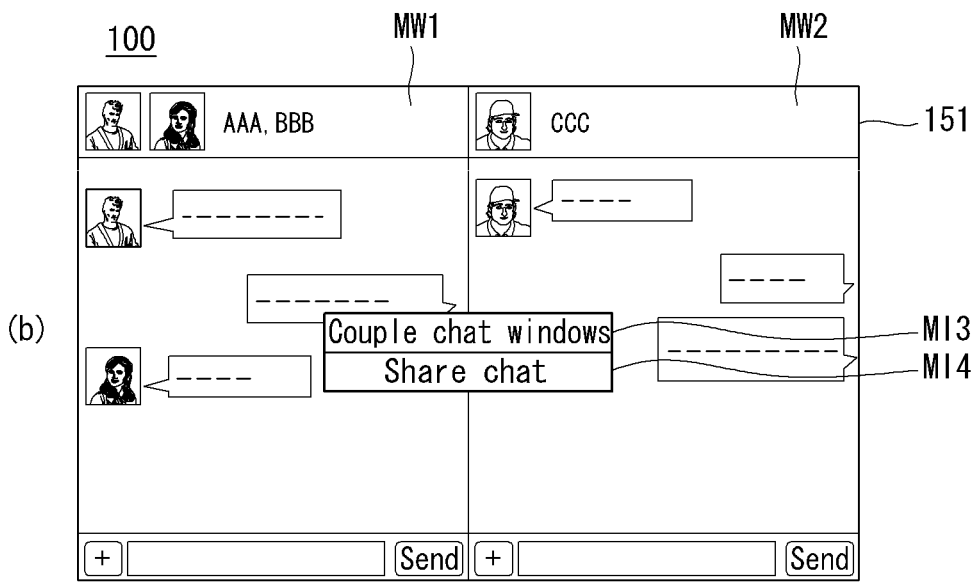

MOBILE TERMINAL AND METHOD FOR DISPLAYING MESSAGE THEREOF

CROSS-REFERENCE TO RELATED APPLICATION

Pursuant to 35 U.S.C. 119(a), this application claims the benefit of earlier filing date and right of priority to Korean Patent Application No. 10-2011-0092823, filed on Sep. 15, 2011, the contents of which are all hereby incorporated by reference herein in its entirety.

BACKGROUND

1. Field

Embodiments relate to a mobile terminal and a method for displaying a message thereof.

2. Background

Terminals can be divided into mobile terminals and stationary terminals. The mobile terminals can be classified as handheld terminals or vehicle mounted terminals according to whether users can personally carry the terminals.

Nowadays, as mobile terminals provide various services, a user can chat in real time with at least one another party using an instant message in the mobile terminal.

However, in view of a characteristic of the mobile terminal, a screen size is limited and thus when it is necessary to generate two or more chat windows like a case where the user simultaneously performs private chat with another party while group chatting together with another parties, the user feels inconvenience when chatting while alternately moving chat windows.

Therefore, in order to minimize such inconvenience, it is considered to improve a structural portion and/or a software portion of the terminal.

SUMMARY

An aspect of the present invention is to provide a mobile terminal and a method for displaying a message thereof that can improve user convenience when simultaneously performing group chat and private chat using a message.

In an aspect, a mobile terminal includes: a wireless communication unit configured to communicate with a plurality of another parties; a display module; and a controller configured to control the display module to display a first chat window for displaying a message transmitted to or received from the plurality of another parties, and control the display module to provide a group chat area for displaying a group message transmitted to or received from the plurality of another parties and a first private chat area for displaying a one-on-one message transmitted to or received from first another party of the plurality of another parties within the first chat window, when a specific user input is input.

In another aspect, a method for displaying a message of a mobile terminal, the method includes: displaying a chat window for displaying a message transmitted to or received from a plurality of another parties; providing a group chat area for displaying a group message transmitted to or received from a group with the plurality of another parties and a private chat area for displaying a one-on-one message transmitted to or received from one of the plurality of another parties within the chat window; selecting one of the group chat area and the private chat area; receiving a message through an input window; and displaying the received message in the group chat area or the private chat area based on the selected chat area.

BRIEF DESCRIPTION OF THE DRAWINGS

The accompanying drawings, which are included to provide a further understanding of described embodiments of the present invention and are incorporated in and constitute a part of this specification, illustrate embodiments of the present invention and together with the description serve to explain aspects and features of the present invention.

FIG. 4 illustrates a view mode of a mobile terminal according to exemplary embodiments of the present invention;

FIGS. 6 to 12 illustrate examples of receiving a control input of requesting generation of a private chat area in a mobile terminal according to a first exemplary embodiment of the present invention;

FIG. 14 illustrates an example of providing two or more private chat areas within a group chat window in a mobile terminal according to a first exemplary embodiment of the present invention;

FIG. 15 illustrates an example of providing another private chat area within a private chat area in a mobile terminal according to a first exemplary embodiment of the present invention;

FIG. 16 illustrates another example of providing two or more private chat areas within a group chat window in a mobile terminal according to a first exemplary embodiment of the present invention;

FIGS. 17 and 18 illustrate an example of coupling private chat areas in a mobile terminal according to a first exemplary embodiment of the present invention;

FIG. 19 illustrates an example of sharing a message within a private chat area with another parties of a group chat area in a mobile terminal according to a first exemplary embodiment of the present invention;

FIG. 21 illustrates an example of selecting a chat area in a mobile terminal according to a first exemplary embodiment of the present invention;

FIGS. 22 to 24 illustrate examples of displaying a message in a mobile terminal according to a first exemplary embodiment of the present invention;

FIG. 26 illustrates an example of displaying a received message in a mobile terminal according to a first exemplary embodiment of the present invention;

FIG. 28 illustrates an example of moving a message to another chat area in a mobile terminal according to a first exemplary embodiment of the present invention;

FIG. 29 illustrates an example of displaying only a private chat area in a group chat window in a mobile terminal according to a first exemplary embodiment of the present invention;

FIG. 30 illustrates an example of displaying only a private chat area on a screen in a mobile terminal according to a first exemplary embodiment of the present invention.

FIGS. 32 and 33 illustrate examples of adding chat anther party in a mobile terminal according to a first exemplary embodiment of the present invention;

FIGS. 35 to 39 illustrate examples of separating a chat window in a mobile terminal according to a first exemplary embodiment of the present invention;

FIG. 43 is a diagram illustrating a method for displaying a message in a mobile terminal according to a second exemplary embodiment of the present invention.

DETAILED DESCRIPTION

Embodiments of the present invention will now be described more fully with reference to the accompanying drawings, in which certain embodiments of the invention are illustrated. The invention may, however, be embodied in many different forms and should not be construed as being limited to the embodiments set forth herein; rather, these embodiments are described and/or illustrated so that this disclosure will be more thorough and complete, and will more fully convey the aspects of the invention to those skilled in the art.

Hereinafter, a mobile terminal according to embodiments of the present invention will be described below in more detail with reference to the accompanying drawings. In the following description, the suffixes "module" and "unit" are used in reference to components of the mobile terminal for convenience of description and do not have meanings or functions different from each other.

The mobile terminals described herein may include a cellular phone, a smart phone, a laptop computer, a digital broadcasting terminal, a personal digital assistant (PDA), a portable multimedia player (PMP), and a navigation system.

Figure 1:
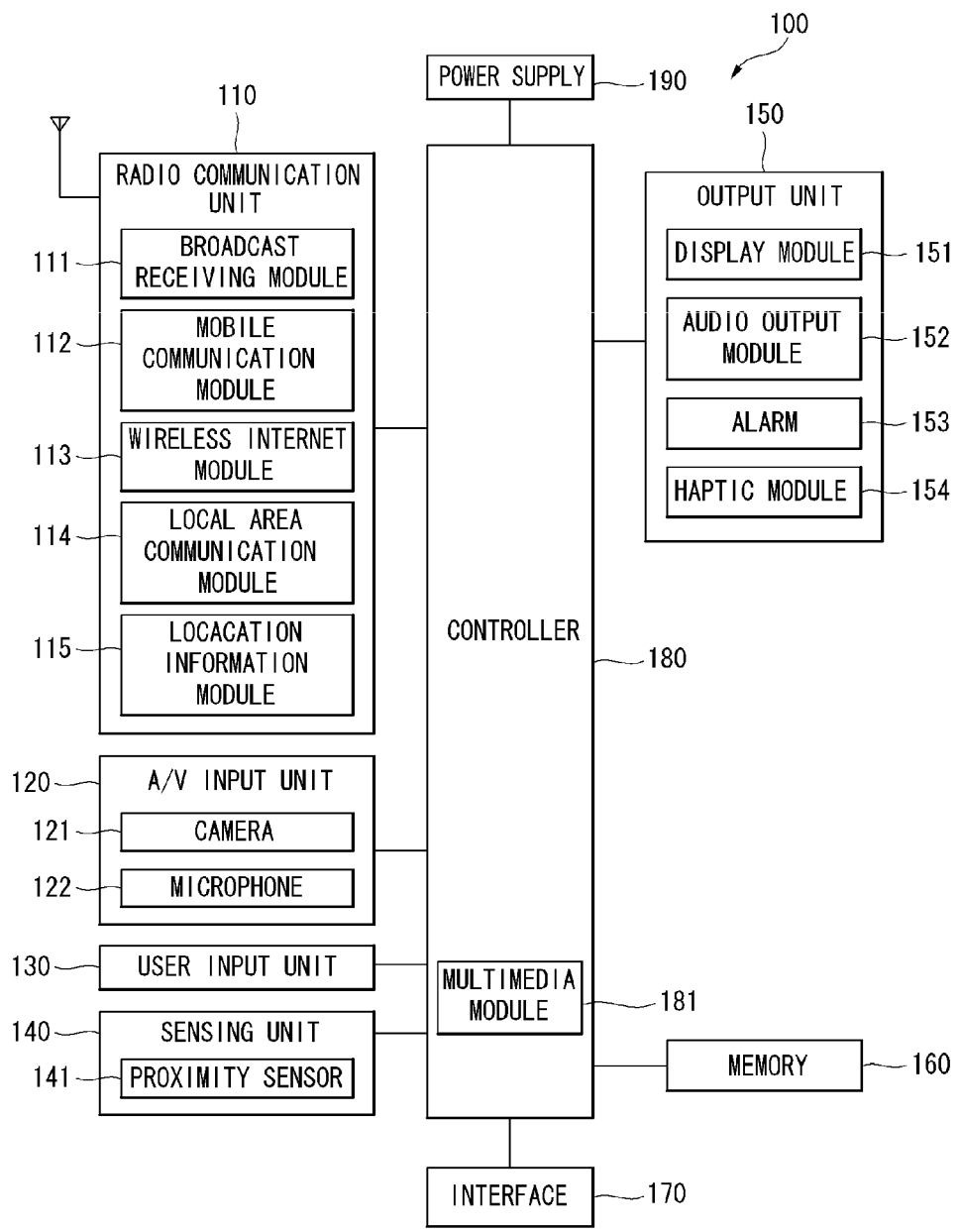
FIG. 1 is a block diagram illustrating a configuration of a mobile terminal according to embodiments of the present invention.

FIG. 1 is a block diagram of a mobile terminal 100 according to an embodiment of the present invention. It is understood that other embodiments, configurations and arrangements may also be provided. With reference to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply 190. Not all of the components shown in FIG. 1 are essential, and the number of components included in the mobile terminal 100 may be varied. The components of the mobile terminal 100, as illustrated with reference to FIG. 1 will now be described.

The wireless communication unit 110 may include at least one module that enables wireless communication between the mobile terminal 100 and a wireless communication system or between the mobile terminal 100 and a network in which the mobile terminal 100 is located. For example, the wireless communication unit 110 may include a broadcast receiving module 111, a mobile communication module 112, a wireless Internet module 113, a local area (or short-range) communication module 114, and a location information (or position-location) module 115.

The broadcast receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, wireless broadcasting signals, and data broadcasting signals, but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in any of various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcast receiving module 111 may receive broadcasting signals using various broadcasting systems. More particularly, the broadcast receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO™) system, a DVB-H system, and an integrated services digital broadcast-terrestrial (ISDB-T) system. The broadcast receiving module 111 may receive signals from broadcasting systems providing broadcasting signals other than the above-described digital broadcasting systems.

The broadcasting signals and/or broadcasting related information received through the broadcast receiving module 111 may be stored in the memory 160. The mobile communication module 112 may transmit/receive a wireless signal to/from at least one of a base station, an external terminal and a server on a mobile communication network. The wireless signal may include a voice call signal, a video call signal or data in various forms according to the transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro™), world interoperability for micro-wave access (Wimax™), high speed downlink packet access (HSDPA) and other technologies may be used as a wireless Internet technique.

The local area communication module 114 may correspond to a module for local area communication. Further, Bluetooth™, radio frequency identification (RFID), infrared data association (IrDA), ultra wideband (UWB) and/or Zig-Bee™ may be used as a local area communication technique.

The position-location module 115 may confirm or obtain the position of the mobile terminal 100. The position-location module 115 may obtain position information by using a global navigation satellite system (GNSS). The GNSS refers to a radio navigation satellite system that revolves around the earth and transmits reference signals to predetermined types of radio navigation receivers such that the radio navigation receivers may determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan among others.

A global positioning system (GPS) module is one example of the position-location module 115. The GPS module 115 may calculate information regarding distances between one point or object and at least three satellites and information regarding a time when the distance information is measured and apply trigonometry to the obtained distance information to obtain three-dimensional position information on the point or object according to latitude, longitude and altitude at a predetermined time. A method of calculating position and time information using three satellites and correcting the calculated position and time information using another satellite may also be used. In addition, the GPS module 115 may continuously calculate the current position in real time and calculate velocity information using the location or position information.

As shown in FIG. 1, the A/V input unit 120 may input an audio signal or a video signal and include a camera 121 and a microphone 122. The camera 121 may process image frames of still images or moving pictures obtained by an image sensor in a video call mode or a photographing mode. The processed image frames may be displayed on a display module 151 which may be a touch screen.

The image frames processed by the camera 121 may be stored in the memory 160 or may be transmitted to an external device through the wireless communication unit 110. The mobile terminal 100 may also include two or more cameras 121.

The microphone 122 may receive an external audio signal in a call mode, a recording mode or a speech recognition mode and process the received audio signal into electronic audio data. The audio data may then be converted into a form that may be transmitted to a mobile communication base station through the mobile communication module 112 and output in the call mode. The microphone 122 may employ various noise removal algorithms (or noise canceling algorithms) for removing or reducing noise generated when the external audio signal is received.

The user input unit 130 may receive input data required for controlling the mobile terminal 100 from a user. The user input unit 130 may include a keypad, a dome switch, a touch pad (e.g., constant voltage/capacitance), a jog wheel, and a jog switch.

The sensing unit 140 may sense a current state of the mobile terminal 100, such as an open/closed state of the mobile terminal 100, a position of the mobile terminal 100, whether a user touches the mobile terminal 100, a direction of the mobile terminal 100, and acceleration/deceleration of the mobile terminal 100, and generate a sensing signal required for controlling the mobile terminal 100. For example, if the mobile terminal 100 is a slide phone, the sensing unit 140 may sense whether the slide phone is opened or closed. Further, the sensing unit 140 may sense whether the power supply 190 supplies power and/or whether the interface unit 170 is connected to an external device. The sensing unit 140 may also include a proximity sensor 141.

The output unit 150 may generate visual, auditory and/or tactile output and may include the display module 151, an audio output module 152, an alarm unit 153 and a haptic module 154. The display module 151 may display information processed by the mobile terminal 100. The display module 151 may display a user interface (UI) or a graphic user interface (GUI) related to a voice call when the mobile terminal 100 is in the call mode. The display module 151 may also display a captured and/or received image and a UI or a GUI when the mobile terminal 100 is in the video call mode or the photographing mode.

In addition, the display module 151 may include at least a liquid crystal display, a thin film transistor liquid crystal display, an organic light-emitting diode display, a flexible display or a three-dimensional display. Some of these displays may be of a transparent type or a light transmissive type. That is, the display module 151 may include a transparent display.

The transparent display may include a transparent liquid crystal display. The rear of the display module 151 may include a light transmissive type display. Accordingly, a user may be able to see an object located behind the body of the mobile terminal 100 through the transparent portion of the display unit 151 on the body of the mobile terminal 100.

The mobile terminal 100 may also include two or more display modules 151. For example, the mobile terminal 100 may include a plurality of display modules 151 that are arranged on a single face of the mobile terminal 100 and spaced apart from each other at a predetermined distance or that are integrated together. The plurality of display modules 151 may also be arranged on different sides of the mobile terminal 100.

Further, when the display module 151 and a touch-sensing sensor (hereafter referred to as a touch sensor) form a layered structure that is referred to as a touch screen, the display module 151 may be used as an input device in addition to an output device. The touch sensor may be in the form of a touch film, a touch sheet, or a touch pad, for example.

The touch sensor may convert a variation in pressure, applied to a specific portion of the display module 151, or a variation in capacitance, generated at a specific portion of the display module 151, into an electric input signal. The touch sensor may sense pressure, position, and an area (or size) of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display module 151.

The proximity sensor 141 of the sensing unit 140 may be located in an internal region of the mobile terminal 100, surrounded by the touch screen, or near the touch screen. The proximity sensor 141 may sense the presence of an object approaching a predetermined sensing face or an object located near the proximity sensor using an electromagnetic force or infrared rays without mechanical contact. The proximity sensor 141 may have a lifetime longer than a contact sensor and may thus be more appropriate for use in the mobile terminal 100.

The proximity sensor 141 may include a transmission type photoelectric sensor, a direct reflection type photoelectric sensor, a mirror reflection type photoelectric sensor, a high-frequency oscillating proximity sensor, a capacitive proximity sensor, a magnetic proximity sensor, and/or an infrared proximity sensor. A capacitive touch screen may be constructed such that proximity of an indicator is detected through a variation in an electric field according to the proximity of the indicator. The touch screen (touch sensor) may be considered as a proximity sensor 141.

For the convenience of description, an action in which an indicator approaches the touch screen without actually touching the touch screen may be referred to as a proximity touch, and an action in which the indicator is brought into contact with the touch screen may be referred to as a contact touch. The proximity touch point of the indicator on the touch screen may correspond to a point of the touch screen at which the indicator is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state). Information corresponding to the sensed proximity touch action and proximity touch pattern may then be displayed on the touch screen.

The audio output module 152 may output audio data received from the wireless communication unit 110 or stored in the memory 160 in a call signal receiving mode, a call mode or a recording mode, a speech recognition mode and a broadcast receiving mode. The audio output module 152 may output audio signals related to functions performed in the mobile terminal 100, such as a call signal incoming tone and a message incoming tone. The audio output module 152 may include a receiver, a speaker, and/or a buzzer. The audio output module 152 may output sounds through an earphone jack. The user may listen to the sounds by connecting an earphone to the earphone jack.

The alarm unit 153 may output a signal indicating generation (or occurrence) of an event of the mobile terminal 100. For example, alarms may be generated when a call signal or a message is received and when a key signal or a touch is input. The alarm unit 153 may also output signals different from video signals or audio signals, for example, a signal indicating generation of an event through vibration. The video signals or the audio signals may also be output through the display module 151 or the audio output module 152.

The haptic module 154 may generate various haptic effects that the user may feel. One of the haptic effects is vibration. The intensity and/or pattern of a vibration generated by the haptic module 154 may also be controlled. For example, different vibrations may be combined with each other and output or may be sequentially output.

The haptic module 154 may generate a variety of haptic effects including an effect attributed to an arrangement of pins vertically moving against a contact skin surface, an effect attributed to a jet force or a suctioning force of air through a jet hole or a suction hole, an effect attributed to a rubbing of the skin, an effect attributed to contact with an electrode, an effect of stimulus attributed to an electrostatic force, and an effect attributed to a reproduction of cold and warmth using an element for absorbing or radiating heat in addition to vibrations.

The haptic module 154 may not only transmit haptic effects through direct contact but may also allow the user to feel haptic effects through the user's fingers or arms. The mobile terminal 100 may also include a plurality of haptic modules 154.

The memory 160 may store a program for operating the controller 180 and temporarily store input/output data such as a phone book, messages, still images, and/or moving pictures. The memory 160 may also store data regarding various patterns of vibrations and sounds that are output from when a touch input is applied to the touch screen.

The memory 160 may include at least a flash memory, a hard disk type memory, a multimedia card micro type memory, a card type memory such as SD or XD memory, a random access memory (RAM), a static RAM (SRAM), a read-only memory (ROM), an electrically erasable programmable ROM (EEPROM), a programmable ROM (PROM) magnetic memory, a magnetic disk, or an optical disk. The mobile terminal 100 may also operate in association with a web storage performing the storage function of the memory 160 on the Internet.

The interface unit 170 may serve as a path to external devices connected to the mobile terminal 100. The interface unit 170 may receive data or power from the external devices, transmit the data or power to internal components of the mobile terminal 100, or transmit data of the mobile terminal 100 to the external devices. For example, the interface unit 170 may include a wired/wireless headset port, an external charger port, a wired/wireless data port, a memory card port, a port for connecting a device having a user identification module, an audio I/O port, a video I/O port, and/or an earphone port.

The interface unit 170 may also interface with a user identification module that is a chip that stores information for authenticating authority to use the mobile terminal 100. For example, the user identification module may be a user identity module (UIM), a subscriber identity module (SIM) and a universal subscriber identify module (USIM). An identification device including the user identification module may also be manufactured in the form of a smart card. Accordingly, the identification device may be connected to the mobile terminal 100 through a port of the interface unit 170.

The interface unit 170 may also be a path through which power from an external cradle is provided to the mobile terminal 100 when the mobile terminal 100 is connected to the external cradle or a path through which various command signals input by the user through the cradle are provided to the mobile terminal 100. The various command signals or power input from the cradle may be used as signals for checking whether the mobile terminal 100 is correctly settled (or loaded) in the cradle.

The controller 180 may control overall operations of the mobile terminal 100. For example, the controller 180 may control and process voice communication, data communication and/or a video call. The controller 180 may also include a multimedia module 181 for playing a multimedia file. The multimedia module 181 may be included in the controller 180 as shown in FIG. 1 or may be separated from the controller 180.

The controller 180 may perform a pattern recognition process of recognizing handwriting input or picture-drawing input applied to the touch screen as characters or images. The power supply 190 may receive external power and internal power and provide power required for operating the components of the mobile terminal 100 under the control of the controller 180.

According to a hardware implementation, embodiments of the present invention may be implemented using at least application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. The embodiments may be implemented using the controller 180.

According to a software implementation, embodiments including procedures or functions may be implemented using a separate software module executing at least one function or operation. Software code may be implemented according to a software application written in an appropriate software language. The software codes may be stored in the memory 160 and executed by the controller 180.

Figure 2:
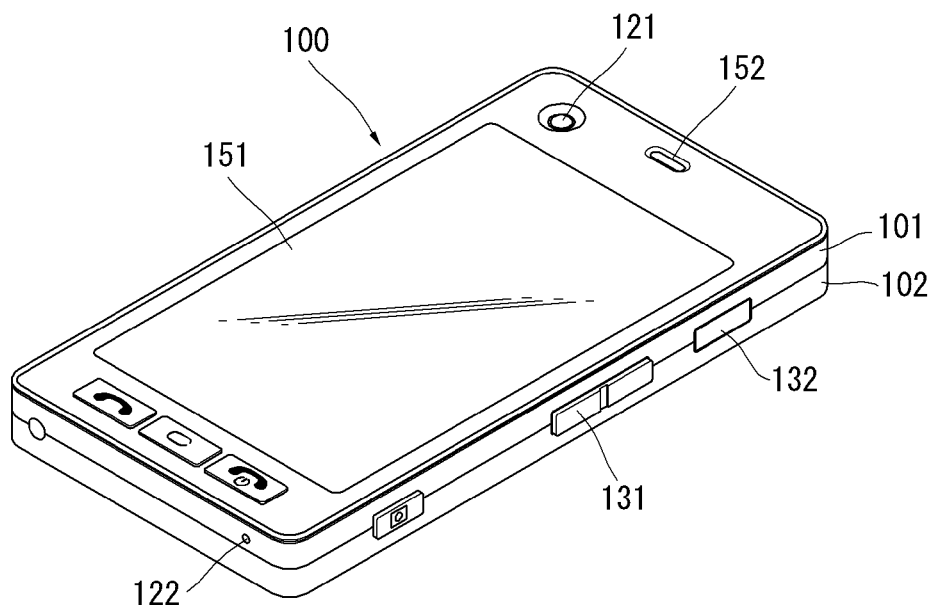
FIG. 2 is a front perspective view illustrating a mobile terminal according to exemplary embodiments of the present invention.

FIG. 2 is a front perspective view of a mobile terminal or a handheld terminal 100 according to an embodiment of the present invention. The handheld terminal 100 has a bar type terminal body. However, embodiments of the present invention are not limited to a bar type terminal and may include various types of terminals such as slide type, folder type, swing type and swivel type terminals having two or more bodies coupled such that they can move relative to each other.

The terminal body includes a case (a casing, a housing, or a cover) forming the exterior of the terminal 100. In the embodiment of FIG. 2, the case may be divided into a front case 101 and a rear case 102. Various electronic components are arranged in the space (volume) defined between the front case 101 and the rear case 102. At least one middle case may be additionally arranged between the front case 101 and the rear case 102. The cases may be made of plastics through injection molding or made of a metal material such as stainless steel (STS) or titanium (Ti).

The display module 151, the audio output module 152, the camera 121, user input unit 130 (e.g., operating units 131, 132), the microphone 122 and the interface unit 170 may be arranged in the terminal body, specifically, in the front case 101.

The display module 151 occupies a majority of the area of the main face of the front case 101. The audio output module 152 and the camera 121 are arranged in a region in proximity to an end of the display module 151, and the operating unit 131 and the microphone 122 are located in a region in proximity to the other end of the display module 151. The operating unit 132 and the interface unit 170 are arranged on the lateral sides of the front case 101 and the rear case 102.

The user input unit 130 is operated to receive commands controlling the handheld terminal 100 and may include a plurality of operating units 131 and 132. The first and second operating units 131 and 132 may be referred to as manipulating portions and may employ a tactile mechanism by which a user operates the operating units 131 and 132 by touch.

The first and second operating units 131 and 132 may receive various inputs. For example, the first operating unit 131 receives commands such as 'START,' 'END,' and 'SCROLL,' and the second operating unit 132 receives commands such as 'CONTROL' (the volume of sound output from the audio output module 152) or 'CONVERT' (a mode of the display module 151 into a touch recognition mode).

Figure 3:
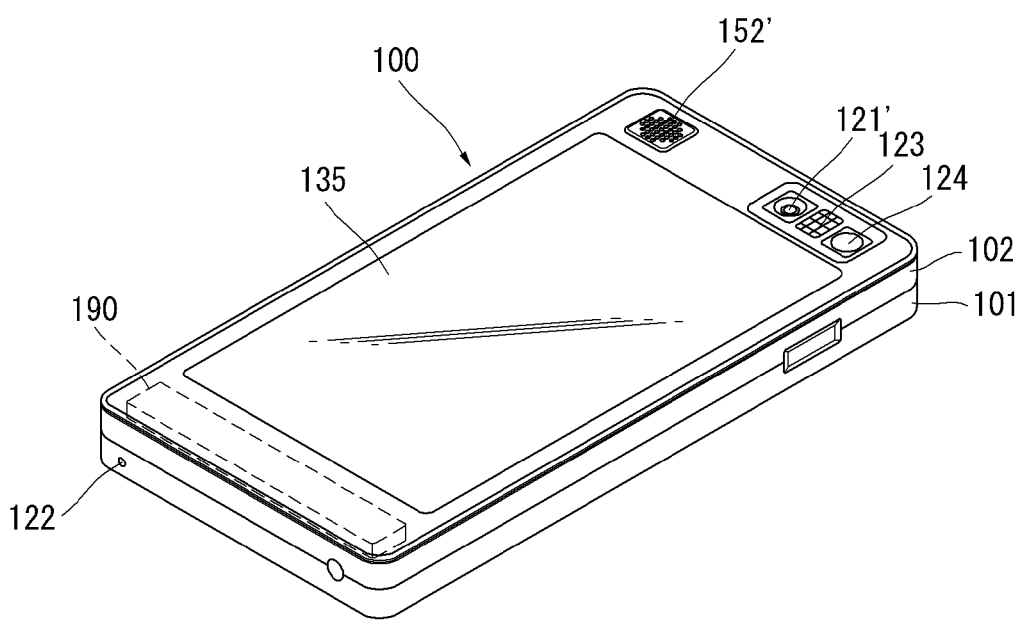
FIG. 3 is a rear perspective view illustrating a mobile terminal according to exemplary embodiments of the present invention.

FIG. 3 is a rear perspective view of the handheld terminal shown in FIG. 2 according to an embodiment of the present invention.

Referring to FIG. 3, a camera 121' may be additionally mounted at the rear side of the terminal body, that is, the rear case 102. The camera 121' captures images along a direction opposite to that of the camera 121 shown in FIG. 2 and may have a pixel resolution different from that of the camera 121.

For example, according to one embodiment, the camera 121 has a relatively low resolution suitable for capturing an image of the face of a user and transmitting the captured image in a video call, while the camera 121' has a relatively high resolution suitable for capturing a photograph of a general subject. The cameras 121 and 121' may be mounted to the terminal body such that they may be rotated or popped-up.

A flash 123 and a mirror 124 may be additionally arranged in proximity to the camera 121'. The flash 123 lights a subject when the camera 121' takes a picture of the subject. The mirror 124 may be used by the user to view his/her face when the user wants to self-photograph himself/herself using the camera 121'.

An audio output module 152' may be additionally provided on the rear side of the terminal body. The audio output module 152' may facilitate a stereo function in conjunction with the audio output module 152 shown in FIG. 2 and may be used in a speaker phone mode when the terminal is used for a voice call.

A broadcasting signal receiving antenna 116 may be additionally attached to the side of the terminal body in addition to an antenna for voice calls. The antenna, which may constitute a part of the broadcast receiving module 111 shown in FIG. 1, may be mounted in the terminal body such that the antenna may be pulled out from (and retracted into) the terminal body.

The power supply 190 for providing power to the handheld terminal 100 is set in the terminal body. The power supply 190 may be provided in the terminal body or detachably installed on the terminal body.

A touch pad 135 for sensing a touch may be additionally attached to the rear case 102. The touch pad 135 may be of a light transmission type similar to the display module 151. In this configuration, if the display module 151 outputs visual information through both of its sides (or faces), the visual information may be viewable via the touch pad 135. The information output through both sides of the display unit 151 may be controlled by the touch pad 135. Alternatively (or in addition), a display is additionally attached to the touch pad 135 such that a touch screen may be arranged in the rear case 102.

The touch pad 135 operates in connection with the display module 151 of the front case 101. The touch pad 135 may extend parallel to the display module 151 behind the display module 151. The touch panel 135 may have a size equal to or smaller than the size of the display module 151.

FIG. 4 illustrates a view mode of a mobile terminal 100 according to exemplary embodiments of the present invention.

In this document, the view mode of the mobile terminal 100 is classified into a landscape view mode and a portrait view mode according to a screen display direction.

FIG. 4(*a*) illustrates a case where a view mode of the mobile terminal 100 is a portrait view mode, and FIG. 4(*b*) illustrates a case where a view mode of the mobile terminal 100 is a landscape view mode.

In this document, a view mode of the mobile terminal 100 is determined according to a posture of the mobile terminal 100, and when a body of the mobile terminal 100 rotates, a view mode of the mobile terminal 100 is converted from a portrait view mode a to a landscape view mode b or from a landscape view mode b to a portrait view mode a.

Exemplary embodiments disclosed in this document can be embodied in the mobile terminal 100 described with reference to FIGS. 1 to 4.

In this document, it is assumed that the display module 151 is a touch screen 151. As described above, the touch screen 151 can perform both an information display function and an information input function. However, the present invention is not limited thereto.

Further, in this document, a touch gesture is a gesture embodied by a contact touch or a proximity touch of the touch screen 151, and a touch input is an input received by a touch gesture.

The touch gesture is classified into tapping, drag, flicking, press, multi touch, pinch-in, and pinch-out according to an action.

Tapping is an action of lightly pressing one time the touch screen 151 and is a touch gesture such as a click touch of a mouse in a general computer.

Further, a drag is an action of moving a finger to a specific position in a state of touching the touch screen 151, and when dragging an object, the object may continue to move in a drag direction and be displayed.

Further, flicking is an action of moving a finger in a specific direction (a right side, a left side, an upper side, a lower side, and a diagonal line) and removing after touching the touch screen 151, and when a touch input is received by flicking, the mobile terminal 100 performs a processing of a specific operation based on a flicking direction or speed. For example, the mobile terminal 100 may perform operation of turning a page of an e-book based on a flicking direction.

Further, press is an action of continuing to sustain a touch for a predetermined time period or more after touching the touch screen 151.

Further, a multi touch is an action of simultaneously touching a plurality of points of the touch screen 151.

Further, pinch-in is an action of dragging a plurality of pointers while multi-touching in an approaching direction on the touch screen 151. That is, pinch-in is started from at least one of a plurality of points while multi-touching and is an action of dragging a plurality of points while multi-touching in an approaching direction on the touch screen 151.

Further, pinch-out is an action of dragging a plurality of pointers while multi-touching in a receding direction on the touch screen 151. That is, pinch-out is started from at least one of a plurality of points while multi-touching and is an action of dragging a plurality of points while multi-touching in a receding direction on the touch screen 151.

In this document, a group of users chatting using a message transmitted and/or received using the mobile terminal 100 is referred to as a 'chat group'. Further, a message transmitted or received within the chat group is referred to as 'chat contents'.

Further, in this document, for convenience of description, a window for displaying a message communicated with a device of another user belonging to the chat group is referred to as a 'chat window'. Further, a user of the device communicating a message with the mobile terminal 100 through the wireless communication unit 110 is referred to as 'another party'. Accordingly, communicating a message between the mobile terminal and another device is referred as transmitting/receiving a message between the user of mobile terminal 100 and another party.

In this document, a case where the message is an instant message IM is exemplified. However, the present invention is not limited thereto. A technical idea disclosed in this document can be applied even to a case where the message is various forms of messages transmitted or received through the wireless communication unit 110, such as a short message service (SMS), a multimedia messaging service (MMS), and an e-mail.

Hereinafter, operation of the mobile terminal 100 for embodying exemplary embodiments disclosed in this document will be described in detail.

The sensing unit 140 acquires a rotation on an axis of the mobile terminal 100 using a gyroscope, i.e., a rotation speed or an angular velocity according to a rotation of the mobile terminal 100. Further, the sensing unit 140 acquires gravity acceleration according to a motion of the mobile terminal 100 through an accelerometer. Further, the sensing unit 140 acquires an orientation of the mobile terminal 100 like a compass through a magnetic sensor.

The controller 180 acquires a motion of the mobile terminal 100 based on at least one of an angular velocity acquired through a gyroscope of the sensing unit 140, gravity acceleration acquired through an accelerometer, and an orientation of the mobile terminal 100 acquired through a magnetic sensor.

Further, the controller 180 acquires a posture of the mobile terminal 100 based on a motion of the mobile terminal 100 acquired through the sensing unit 140 and controls a view mode based on a posture of the mobile terminal 100.

Further, the controller 180 communicates with at least one another party using a message transmitted or received through the wireless communication unit 110.

Further, the controller 180 may provide a private chat area within a group chat window for displaying a message transmitted to or received from a plurality of another parties as a group based on the user's control. The private chat area is an area for displaying private chat contents with a specific another party Further, in a state where a plurality of chat windows are displayed, if a specific gesture is input, the controller 180 may control to copy and paste chat contents displayed in one chat window within another chat window.

Hereinafter, a method for displaying a message of the mobile terminal 100 according to a first exemplary embodiment of the present invention and operation of the mobile terminal 100 for embodying the same will be described in detail with reference to necessary drawings.

FIGS. 5 to 39 illustrate a method for displaying a message of the mobile terminal 100 according to a first exemplary embodiment of the present invention.

Figure 5:
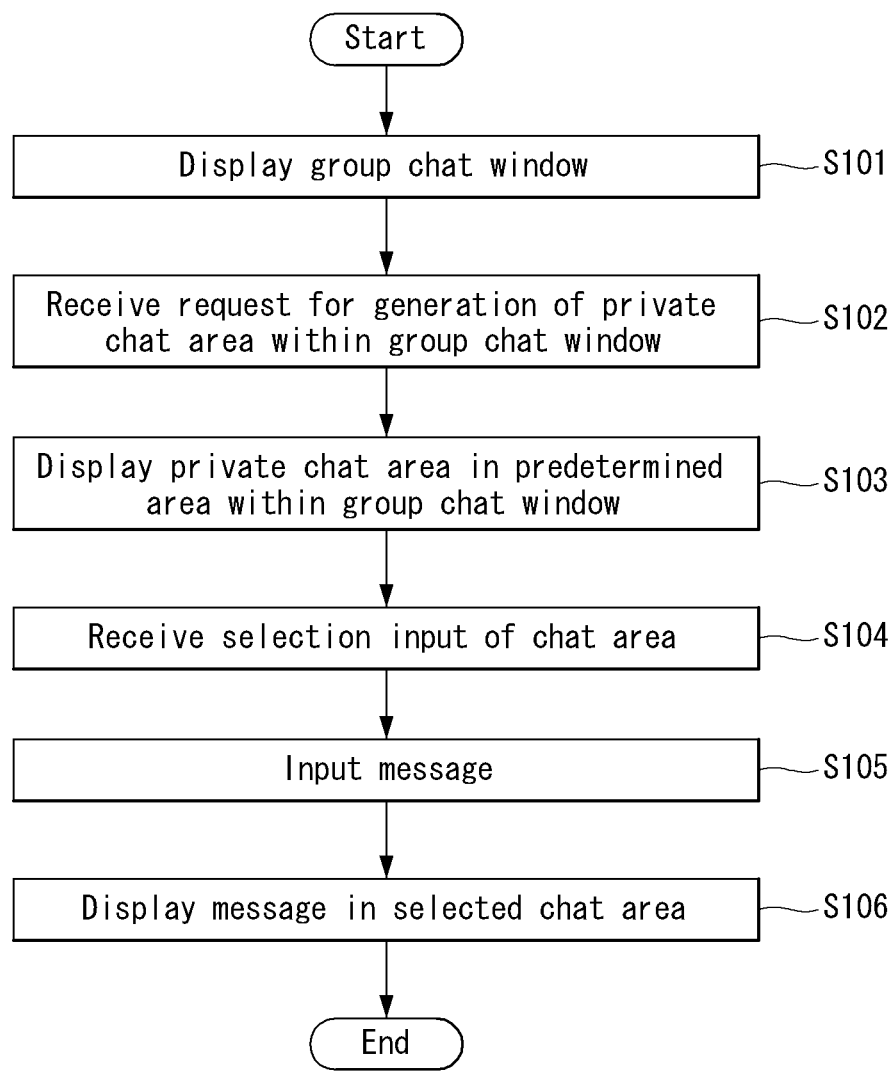
FIG. 5 is a flowchart illustrating a method of coupling chat windows in a mobile terminal according to a first exemplary embodiment of the present invention.

FIG. 5 is a flowchart illustrating a method of coupling chat windows in the mobile terminal 100 according to a first exemplary embodiment of the present invention. Further, FIGS. 6 to 10 illustrate a method of coupling chat windows of FIG. 5.

Referring to FIG. 5, the controller 180 controls the touch screen 151 to display a chat window for displaying a message transmitted and received as a group between the user of the mobile terminal 100 and a plurality of another parties based on the user's control input (S101). Hereinafter, for convenience of description, a message transmitted or receiving as a group between the user of the mobile terminal 100 and a plurality of another parties is referred to as 'group message' and a chat window for displaying the group messages referred to as a 'group chat window'.

Thereafter, when a control input for requesting generation of a private chat area corresponding to one of the plurality of another parties while group chatting is received (S102), the controller 180 controls the touch screen 151 to display a private chat area within a chat window (S103).

Here, the private chat area is an area for displaying a private message transmitted or received one-on-one between the user of the mobile terminal 100 and a specific another party. In this document, for convenience of description, a message transmitted or received one-on-one with the specific another party is referred to as 'private message'. Further, the rest area, except for the private chat area within the group chat window is referred to as a 'group chat area'. The group message transmitted or receiving as a group between the user of the mobile terminal 100 and the plurality of another parties is displayed within the group chat area.

At step S102, the control input for requesting generation of a private chat area within a group chat window may be received through various methods.

In a state where a group chat window and a private chat window are displayed, when the private chat window is dragged to the group chat window, the controller 180 may receive the control input for requesting generation of a private chat area corresponding to the dragged private chat window within the group chat window.

Further, in a state where a group chat window and a private chat window are displayed, when the group chat window and the private chat window are multi-touched and are pinched-in, the controller 180 may receive the control input for requesting generation of a private chat area corresponding to the private chat window dragged within the group chat window.

Further, in a state where a group chat window and a private chat window are displayed, when a view mode of the mobile terminal 100 is changed, the controller 180 may receive the control input for requesting generation of a private chat window corresponding to the private chat window within the group chat window.

Further, when a message received from a specific another party among messages displayed within the group chat window is dragged to a message transmitted by the user of the mobile terminal 100, the controller 180 may receive the control input for requesting generation of a private chat area for the specific another party within the group chat window.

Further, when a message received from a specific another party among messages displayed within the group chat window and a message transmitted by the user of the mobile terminal 100 are pinched-in, the controller 180 may receive the control input for requesting generation of a private chat area for the specific another party within the group chat window.

The controller 180 may receive a control input for requesting generation of a private chat area within a group chat window through various methods in addition to the above-described method.

FIGS. 6 to 12 illustrate examples of receiving the control input of requesting generation of a private chat area.

Referring to FIG. 6(*a*), the controller 180 controls the touch screen 151 to display a group message GM transmitted to or received from a plurality of another parties AAA and BBB, and a private message PM transmitted to or received from another party AAA in different chat windows GW and PW, respectively.

Further, the controller 180 controls the touch screen 151 to display a message input window IW1 for inputting a group message transmitted to another parties AAA and BBB, and a message input window IW2 for inputting a private message transmitted to the another party AAA, respectively.

Thereafter, when the private chat window PW is dragged to the group chat window GW by the user, the controller 180 receives a user input of requesting integrating two chat windows GW and PW. That is, the controller 180 receives a control input of requesting generation of a private chat area corresponding to the private chat window PW within the group chat window GW.

Accordingly, as shown in FIG. 6(*b*), the controller 180 provides a private chat area A2 within the group chat window GW as. Referring to FIG. 6(*b*), the private chat area A2 may be displayed in a speech balloon form. Further, a message PM transmitted or received one-on-one between the user of the mobile terminal 100 and another party AAA may be sequentially displayed in the private chat area A2. Further, in order to identify another party AAA chatting through the private chat area A2, identification information of another party AAA may be displayed in the private chat area A2.

Further, the controller 180 may provides the rest area A1, except for the private chat area A2 in the group chat window MW, as a group chat area. And, the controller 180 may control the touch screen 151 to sequentially display group messages GM transmitted or received between the user of the mobile terminal 100 and the another parties AAA and BBB in the group chat area A1.

Further, the controller 180 may control the touch screen 151 to display one input window IW for inputting a message transmitted to at least one another party in a predetermined area within the group chat window MW. A message input through the input window IW may be transmitted as a group to another parties AAA and BBB, or may be transmitted one-on-one to the another party AAA based on the user's selection input.

Further, referring to FIG. 6(*b*), the controller 180 differently controls a background color of the group chat area A1 and the private chat area A2. Accordingly, the user can intuitively distinguish the group chat area A1 and the private chat area A2.

FIG. 6(*b*) illustrates a case of differently displaying a background color of two areas in order to intuitively distinguish the group chat area A1 and the private chat area A2, but according to the present invention, two areas A1 and A2 may be intuitively distinguished using various methods in addition to a method of differently displaying a background color.

For example, by displaying a text, an icon, etc., for identifying each area, two areas A1 and A2 may be intuitively distinguished.

Further, for example, by embodying a cubic effect that the private chat area A2 protrudes further than the group chat area A1, two areas A1 and A2 may be intuitively distinguished.

FIG. 6(*b*) illustrates an example in which a group chat window GW is enlarged and displayed to an entire screen by integrating two chat windows GW and PW, but the present invention is not limited thereto.

According to the present invention, in a state where a display size of the group chat window GW is sustained, the private chat window PW may be integrated to the group chat window GW. That is, with a method of newly adding only a private chat area A1 within the group chat window PW having the same display size, two chat windows may be integrated.

Further, FIG. 6(*b*) illustrates a case where the private chat area is displayed in a speech balloon form, but the present invention is not limited thereto. According to the present invention, the private chat area A2 may be displayed in other forms other than a speech balloon within the group chat area A1.

Figure 7:
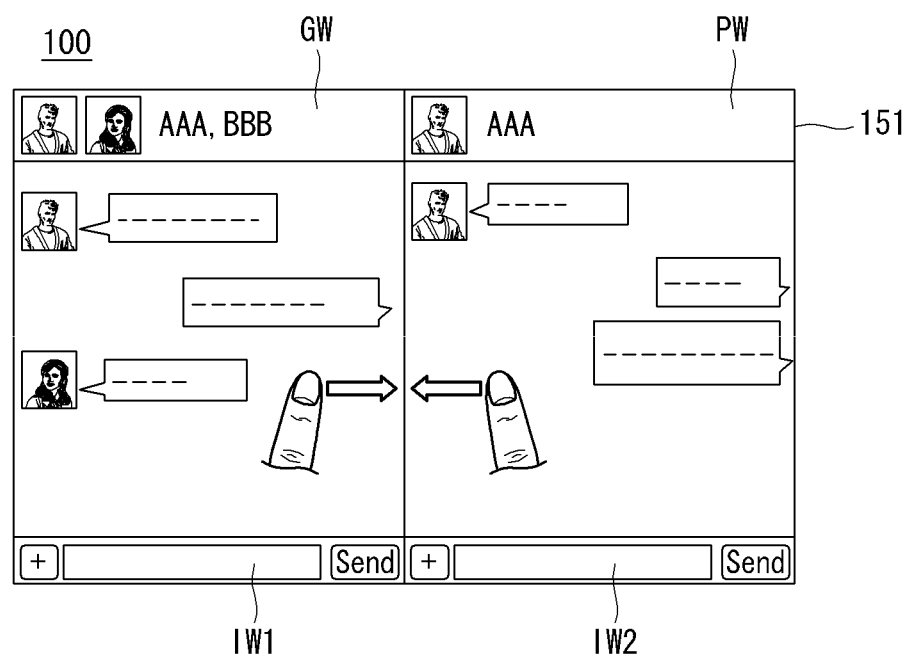

Referring to FIG. 7, in a state where a group chat window GW and a private chat window PW are multi-touched, when a pinched-in touch input is received, the controller 180 receives a control input for requesting generation of a private chat area corresponding to the private chat window PW within the group chat window GW.

Accordingly, the controller 180 provides a private chat area A2 within the group chat window GW, as shown in FIG. 6(*b*).

Referring to FIG. 8(*a*), in a landscape view mode, the controller 180 controls the touch screen 151 to display a message GM transmitted or received as a group between the user of the mobile terminal 100 and a plurality of another parties AAA and BBB and a message PM transmitted or received one-on-one with the another party AAA in different chat windows GW and PW, respectively.

Thereafter, when the mobile terminal 100 rotates in a specific direction, the controller 180 changes a view mode to portrait view mode, and receives a control input for requesting integration of two chat windows GW and PW. That is, the controller 180 receives a control input for requesting generation of a private chat area corresponding to the private chat window PW within the group chat window GW.

Accordingly, as shown in FIG. 8(*b*), the controller 180 controls to enlarge and display the group chat window GW for group chat with a plurality of another parties AAA and BBB to an entire area in a portrait view mode. Further, the controller 180 provides a private chat area A2 within the group chat window GW.

FIG. 8 illustrates a case where when a body of the mobile terminal 100 rotates in a specific direction, a view mode of the mobile terminal 100 is changed, and as the view mode of the mobile terminal 100 is changed, two chat windows GW and PW are sequentially integrated, but the present invention is not limited thereto. According to the present invention, when a rotation of the mobile terminal 100 in a specific direction is detected through the sensing unit 180, the controller 180 may integrate two chat windows GW and PW regardless of a change of a view mode.

Referring to FIG. 9(*a*), the controller 180 controls the touch screen 151 to display a group chat window GW for displaying group messages GM1 and GM2 transmitted to or received from a plurality of another parties AAA and BBB.

Thereafter, when the group message GM1 received from the another party BBB among messages displayed in the group chat window GW is dragged to the group message GM2 transmitted by the user of the mobile terminal 100, the controller 180 generates a private chat area A2 for one-on-one chatting with another party BBB, as shown in FIG. 9(*b*).

Thereafter, the controller 180 controls the touch screen 151 to sequentially display a private message transmitted to or received from another party BBB within the private chat area A2.

When the private chat area A2 is generated, FIG. 9(*b*) illustrates a case of displaying an empty area in which any message is not displayed, but the present invention is not limited thereto. According to the present invention, when the private chat area A2 is generated, the group message GM1 and the group message GM2 may be displayed within the private chat area A2.

Referring to FIG. 10(*a*), the controller 180 controls the touch screen 151 to display a group chat window GW for displaying group messages GM1 and GM2 transmitted to or received from a another parties AAA and BBB.

Thereafter, when the group message GM1 received from the another party BBB and the group message GM2 transmitted by the user of the mobile terminal 100 among messages displayed in the group chat window GW are multi-touched and pinched-in, the controller 180 generates a private chat area A2 for one-on-one chatting with corresponding another party BBB, as shown in FIG. 10(*b*).

Further, when the private chat area A2 is generated, the controller 180 controls to display the group message GM1 and the group message GM2 within the private chat area A2.

Thereafter, the controller 180 controls the touch screen 151 to sequentially display a private message transmitted to or received from another party BBB within the private chat area A2.

Referring to FIG. 11(*a*), the controller 180 controls the touch screen 151 to display a group chat window GW for displaying group messages GM1 and GM2 transmitted to or received from a plurality of another parties AAA and BBB on the screen. Further, the controller 180 controls the touch screen 151 to display identification information of another parties AAA and BBB while chatting through the group chat window GW in an upper end portion of the group chat window GW. Here, identification information may include a picture, a name, a nickname, etc., of each another party.

When identification information of the another party BBB, for example, a picture UI1 of another party BBB displayed in an upper end portion of the screen of the group chat window GW is pressed, the controller 180 controls the touch screen 151 to display menu items related to the selected another party BBB, as shown in FIG. 11(*b*).

Thereafter, when a menu item MENU1 that requests private chat is selected by the user, the controller 180 generates a private chat area A2 for one-on-one chatting with the selected another party BBB.

Figure 12:
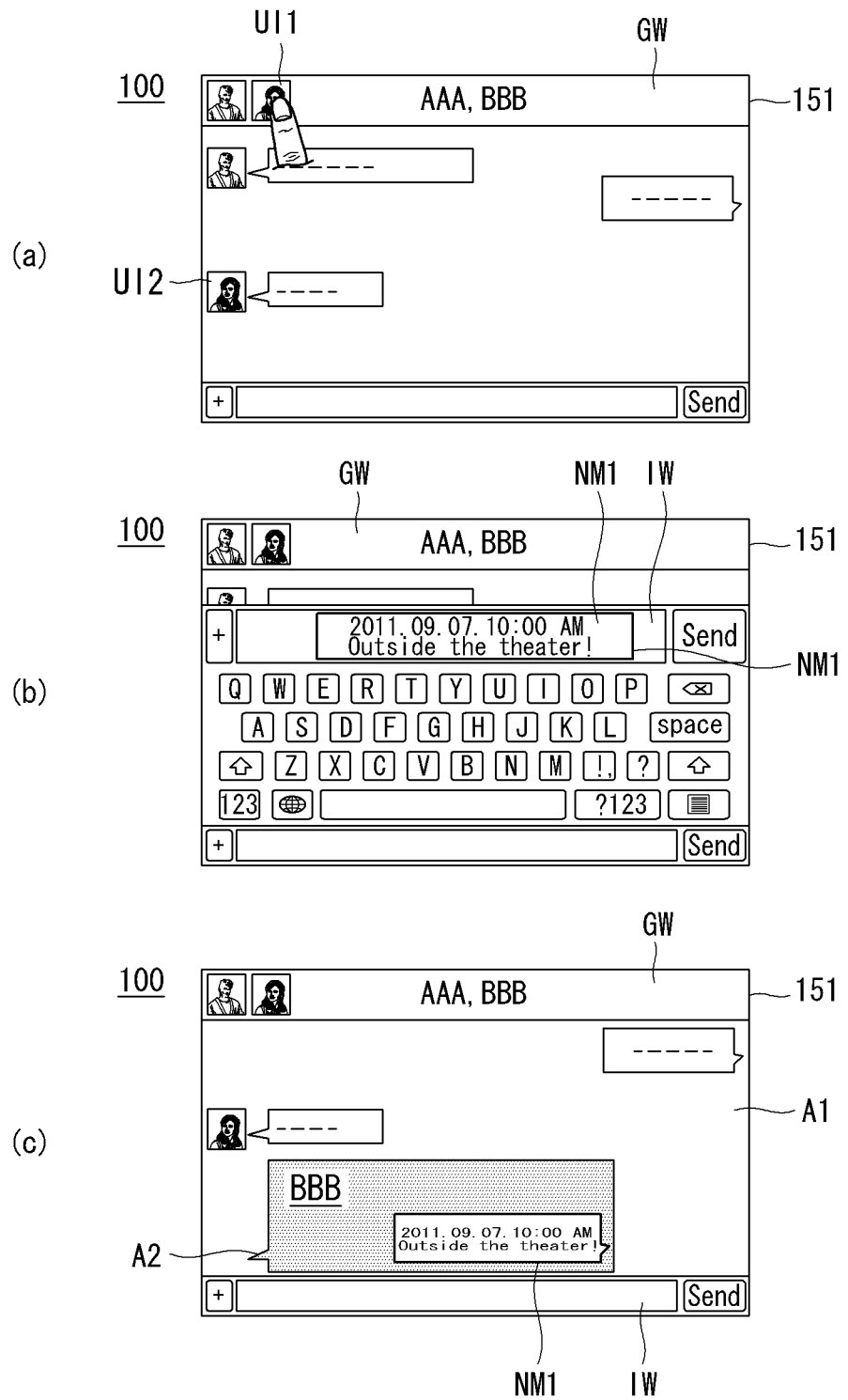

Referring to FIG. 12(*a*), when identification information of the another party BBB, for example, a picture UI1 of another party BBB displayed in an upper end portion of the screen of the group chat window GW is pressed, the controller 180 selects the pressed another party BBB.

Thereafter, in a state where the another party BBB is selected, when a new message NM1 is input through the message input window IW, the controller 180 transmits one-on-one the input message to the selected another party BBB, as shown in FIG. 12(*b*).

Further, as shown in FIG. 12(*c*), the controller 180 generates a private chat area A2 for one-on-one chatting with the selected another party BBB and controls the touch screen 151 to display a newly input message NM1 in an generated private chat area A2.

In FIG. 12(*b*), when another party of private chat is selected and private message transmitted to the selected another party BBB is input, in order to intuitively recognize another party BBB of private chatting, the controller 180 may control the touch screen 151 to change a background color of the input window IW according to the selected another party BBB, or display an indicator for indicating the selected another party BBB within the input window IW.

In FIGS. 11 and 12, another party of private chatting is selected by pressing user identification information displayed in upper end portion of the group chat window GW. But, the present invention is not limited thereto.

According to the present invention, another party of private chatting may be selected by pressing identification information UI2 of a specific another party or a message received from a specific another party for a predetermined time period or more.

Further, according to the present invention, an indicator corresponding to each of another parties while transmitting or receiving a message through the group chat window GW may be displayed within the group chat window GW, and then another party of private chatting may be selected based on a selection input to each indicator, for example, a touch input.

Further, in FIGS. 11 and 12, after another party of private chatting is selected, a private chat area is generated by selecting a menu item, or by inputting a new message. But the present invention is not limited thereto.

According to the present invention, when identification information of another chat party displayed in an upper end portion of the group chat window GW is pressed for a predetermined time period or more, a private chat area A2 with selected another party may be generated automatically.

FIGS. 6 to 10 illustrate examples of generating the private chat area A2 within a group chat window GW, but the present invention is not limited thereto. According to the present invention, the private chat area A2 can be generated within the group chat window GW using various methods in addition to the above-described method.

According to the first exemplary embodiment of the present invention, as described above, as a private chat window is integrated to a group chat window, when a private chat area for displaying one-on-one chat contents with a specific another party is included within the group chat window, the controller 180 controls to display an indicator indicating that a private chat area was included within the group chat window.

Figure 13:
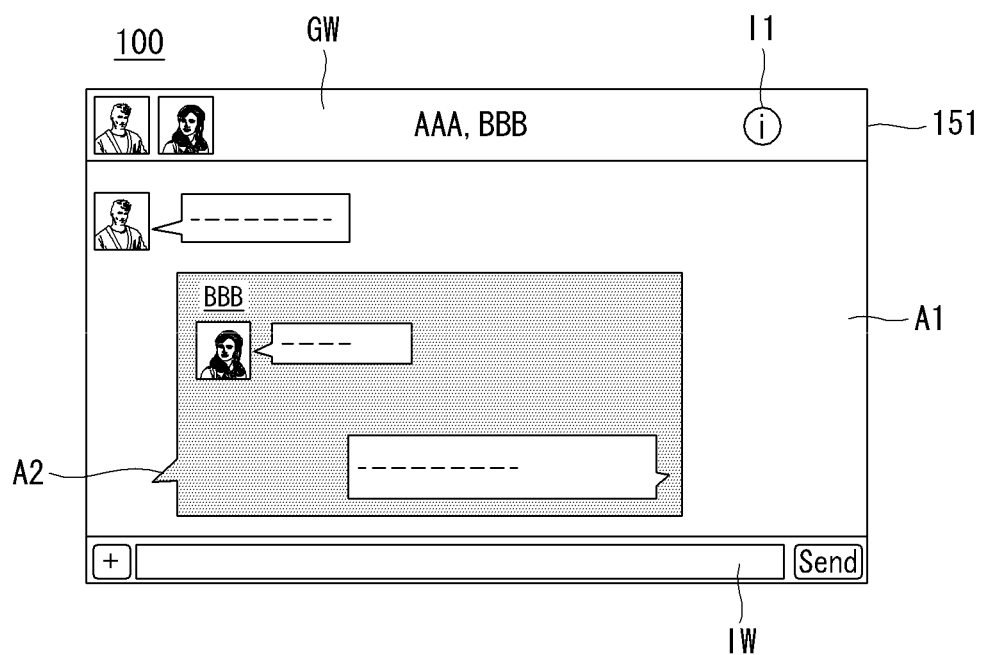
FIG. 13 illustrates an example of a screen for displaying an indicator indicating that a private chat area is included within a group chat window in a mobile terminal according to a first exemplary embodiment of the present invention.

FIG. 13 illustrates an example of a screen for displaying an indicator indicating that a private chat area was included within a group chat window.

Referring to FIG. 13, the controller 180 provides a private chat area A2 for one-on-one chatting with another party BBB within the group chat window GW. Accordingly, the controller 180 controls to display an indicator I1 indicating that the private chat area A2 in an upper end portion of the group chat window GW.

Thereafter, when the indicator I1 indicating that the private chat area A2 is touched, the controller 180 may control to move to private chat area A2. Therefore, as chat is performed or the user checks group chat contents previously performed on a screen, when the private chat area A2 disappears from a display, the user can easily move to the private chat area A2 with only an action of touching an indicator indicating the private chat area A2. Further, when chat is alternatively performed in a group chat area and a private chat area, convenience of selection of a chat area is improved.

According to the first exemplary embodiment of the present invention, two or more private chat areas may be provided within a group chat window.

FIG. 14 illustrates examples of providing two or more private chat areas within a group chat window.

Referring to FIG. 14(a), the controller 180 provides a first private chat area A2 for displaying a message transmitted to or received from another party BBB within a group chat window GW.

Therefore, when a message received from another party AAA among messages displayed within a group chat area A1 and a message transmitted using the mobile terminal 100 are multi-touched and pinched-in, the controller 180 newly generates a second private chat area A3 for one-on-one chatting with the another party AAA, as shown in FIG. 14(b).

Further, the controller 180 controls to display the generated second private chat area A3 within the group chat area A1.

Further, according to the first exemplary embodiment of the present invention, another private chat area can be provided within a private chat area displayed within a group chat window.

FIG. 15 illustrates an example of providing another private chat area within a private chat area.

Referring to FIG. 15(a), the controller 180 provides a first private chat area A2 for displaying private chat contents with another party BBB and another party AAA within a group chat window GW for group chat with another parties AAA, BBB, and CCC.

Thereafter, when a message received from another party AAA and a message transmitted using the mobile terminal 100 among messages displayed within the first private chat area A2 are multi-touched and pinched-in, the controller 180 newly generates a second private chat area A3 for one-on-one chatting with another party AAA, as shown in FIG. 15(b).

Further, the controller 180 controls to display the generated second private chat area A3 within the first private chat area A2.

Further, according to the first exemplary embodiment of the present invention, the controller 180 may control the touch screen 151 to integrate and display private chat areas in which private chat contents with different another parties are displayed.

FIG. 15 illustrates a case where the generated second private chat area A3 is displayed within the first private chat area A2, but the newly generated second private chat area A3 may be displayed in the group chat area A1 outside the first private chat area A2.

FIG. 16 illustrates another example of providing two or more private chat areas.

Referring to FIG. 16(a), when a message received from another party AAA and a message transmitted using the mobile terminal 100 among messages displayed within the first private chat area A2 are multi-touched and pinched-in, the controller 180 newly generates a second private chat area A3 for one-on-one chatting with another party AAA, as shown in FIG. 16(b).

Further, the controller 180 controls to display the generated second private chat area A3 in the group chat area A1 outside the first private chat area A2.

FIGS. 17 and 18 illustrate an example of coupling private chat areas.

Referring to FIG. 17(a), the controller 180 provides a first private chat area A2 for displaying private chat contents with another party BBB and a second private chat area A3 for displaying private chat contents with another party AAA within the group chat window GW.

Thereafter, when the first private chat area A2 and the second private chat area A3 are multi-touched and pinched-in, the controller 180 may control to integrate private chat areas A2 and A3 by displaying the second private chat area A3 within the first private chat area A2, as shown in FIG. 17(b).

Referring to FIG. 18(a), the controller 180 provides a first private chat area A2 for displaying private chat contents with another party BBB and a second private chat area A3 for displaying for private chat contents with another party AAA within the group chat window GW for group chat with another parties AAA, BBB, and CCC.

Thereafter, when the first private chat area A2 and the second private chat area A3 are multi-touched and pinched-in, the controller 180 adds another party AAA chatting through the second private chat area A3 in the first private chat area A2, as shown in FIG. 18(b). Accordingly, the second private chat area A3 may be deleted.

According to the first exemplary embodiment of the present invention, the controller 180 may control to share messages displayed in a private chat area with another parties of a group chat area based on a user input.

FIG. 19 illustrates an example of sharing a message within a private chat area with another parties of a group chat area.

Referring to FIG. 19(a), the controller 180 provides a first private chat area A2 for displaying private chat contents with another party BBB and a second private chat area A3 for displaying private chat contents with another party AAA within the group chat window GW for group chat with another parties AAA, BBB, and CCC.

Thereafter, when the second private chat area A3 and the group chat area A1 are multi-touched and pinched-in, the controller 180 controls to display messages PM1 and PM2 displayed in the second private chat area A3 in the group chat area A1, as shown in 19(b).

That is, the controller 180 controls to share the messages PM1 and PM2 displayed in the second private chat area A3 with another party while group chatting by transmitting the messages PM1 and PM2 displayed in the second private chat area A3 to another party while group chatting.

In FIG. 19(b), messages PM1 and PM2 displayed in the second private chat area A3 are added into the group chat area A1, the second private chat area A3 may be deleted. But, the present invention is not limited thereto.

According to the present invention, even if messages PM1 and PM2 displayed in the second private chat area A3 are added into the group chat area A1, the second private chat area A3 may continue to sustain.

According to the first exemplary embodiment of the present invention, the controller 180 may control to share messages displayed in a private chat area with another parties of a group chat area based on a user input.

According to the first exemplary embodiment of the present invention, as a private chat area is displayed within a group chat window, it is necessary to select whether to transmit a message input through a group chat window as a group through a group chat area, or to transmit the message input through a group chat window as one-on-one through a private chat area.

Figure 20:
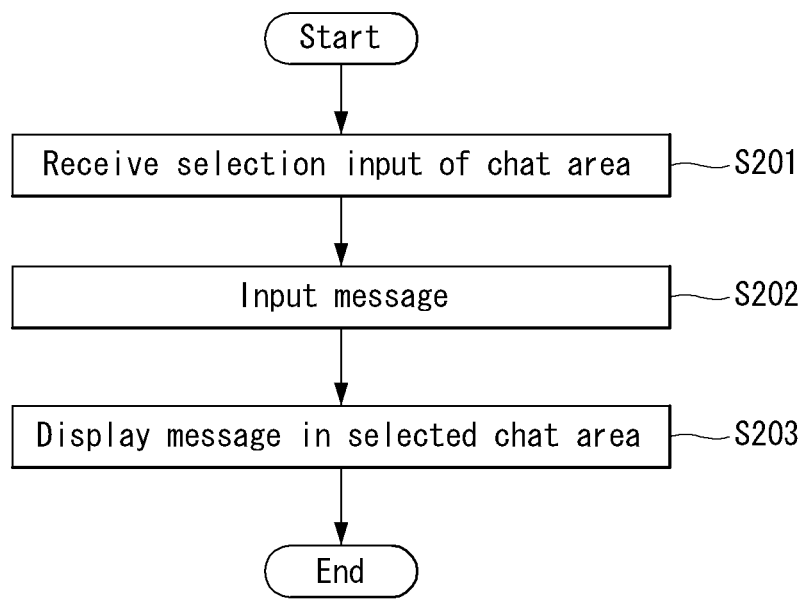
FIG. 20 is a flowchart illustrating a method for displaying a transmission message in a mobile terminal according to a first exemplary embodiment of the present invention.

FIG. 20 is a flowchart illustrating a method for displaying a transmission message in the mobile terminal 100 according to a first exemplary embodiment of the present invention. Further, FIGS. 21 and 22 illustrate a method for displaying a transmission message.

Referring to FIG. 20, the controller 180 receives a control input of selecting one of a group chat area and a private chat area displayed in one group chat window (S201). Further, the controller 180 selects one of a group chat area and a private chat area based on the received control input.

Here, operation of selecting a chat area corresponds to operation of selecting another party to transmit an input message.

For example, when selecting the group chat area, another party to transmit the input message may be selected a plurality of another parties while group chatting.

Further, for example, when the private chat area is selected, another party to transmit the input message may be selected a specific another party while private chatting.

When one chat area is selected, the controller 180 is input a message through the user input unit 130 (S202).

The controller 180 controls to display the received message in the selected chat area (S203). Further, the controller 180 transmits the input message to another parties while group chatting, or to a specific another party while private chatting according to the selected area.

For example, when the group chat area is selected, the input message may be displayed in the group chat area, and transmitted to a plurality of another parties while group chatting trough the group chat area.

Further, for example, when the private chat area is selected, the input message may be displayed in the private chat area and transmitted to a specific another party while chatting through the selected private chat area.

At step S201, the controller 180 selects a chat area to display a message input through a message input window based on a touch input to a chat window. That is, the controller 180 selects whether to transmit the input message as a group or to transmit one-on-one to specific another party.

FIG. 21 illustrates an example of selecting a chat area.

Referring to FIG. 21, the controller 180 selects a chat group according to a point touched within a group chat window.

Referring to FIG. 21, the controller 180 provides a private chat area A2 with the another party AAA within a group chat window GW for group chat with a plurality of another parties AAA and BBB.

The controller 180 controls to sequentially display a message transmitted or received one-on-one with another party AAA in the private chat area A2.

Further, the controller 180 provides a group chat area in the rest area A1, except for the private chat area A2, in the group chat window MW, and controls to sequentially display messages GM transmitted to or received from a plurality of another parties while group chatting through the group chat area.

Further, when the group chat area A1 is touched, the controller 180 selects the group chat area A1 as an area in which an input message is displayed, as shown in FIG. 21(a). Further, when the private chat area A2 is touched, the controller 180 selects the private chat area A2 as an area in which an input message is displayed, as shown in FIG. 21(b).

According to the first exemplary embodiment of the present invention, when one chat area is selected within a group chat window, the controller 180 controls to display the selected chat area with various methods so that the user intuitively recognizes the selected chat area.

For example, when one chat area is selected, the controller 180 may control to display an icon indicating the selected chat area at a predetermined position within the selected chat area.

Further, the controller 180 may control to highlight the selected chat area using a background color, shade, etc., of each chat area.

In FIG. 21, for example, when the group chat area A1 is selected, the controller 180 controls to highlight the group chat area A1 further than the private chat area A2, as shown in FIG. 21(a). Further, when the private chat area A2 is selected, the controller 180 controls to highlight the private chat area A2 further than the group chat area A1, as shown in FIG. 21(b).

Further, the controller 180 may control a background color of a message input window according to a selected chat area such that the selected chat area is identified.

In FIG. 21, for example, the controller 18 control to equal a background color of the message input window IW to a background color of a presently selected chat area such that the user to more easily recognize the selected chat area.

When the group chat area A1 is selected, the controller 180 controls to display a background color of the message input window IW the same as a background color of the group chat area A1, as shown in FIG. 21(a). Further, when the private chat area A2 is selected, the controller 180 controls to display a background color of the input window IW the same as a background color of the private chat area A2, as shown in FIG. 21(b).

As shown in FIG. 21, when one chat area is selected, the controller 180 controls to display a message input through a message input window in a selected area.

FIG. 22 illustrates an example of displaying the input message.

Referring to FIG. 22(a), when a private chat area A2 is touched, the controller 180 selects the private chat area A2. Further, the controller 180 controls to highlight the private chat area A2 and changes a background color of a message input window IW the same as a background color of the private chat area A2.

Further, in a state where the private chat area A2 is selected, the controller 180 receives a message through the message input window IW. Thereafter, when transmission of the received message is selected by the user, the controller 180 transmits the received message to another party AAA while private chatting through the private chat area A2. Further, the controller 180 controls to display the received message PM1 in the private chat area A2, as shown in FIG. 22(b).

According to the first exemplary embodiment of the present invention, when one chat area is selected within a group chat window, the controller 180 controls to display the selected chat area with various methods so that the user intuitively recognizes the selected area.

For example, when one chat area is selected, the controller 180 controls to display an icon indicating the selected chat area at a predetermined position within the selected chat area.

Further, the controller 180 controls to highlight the selected chat area by controlling a background color, shade, etc., of each chat area.

According to the first exemplary embodiment of the present invention, messages may be sequentially aligned based on a transmitting time or receiving time, or aligned according to whether private chat or group chat.

Figure 23:
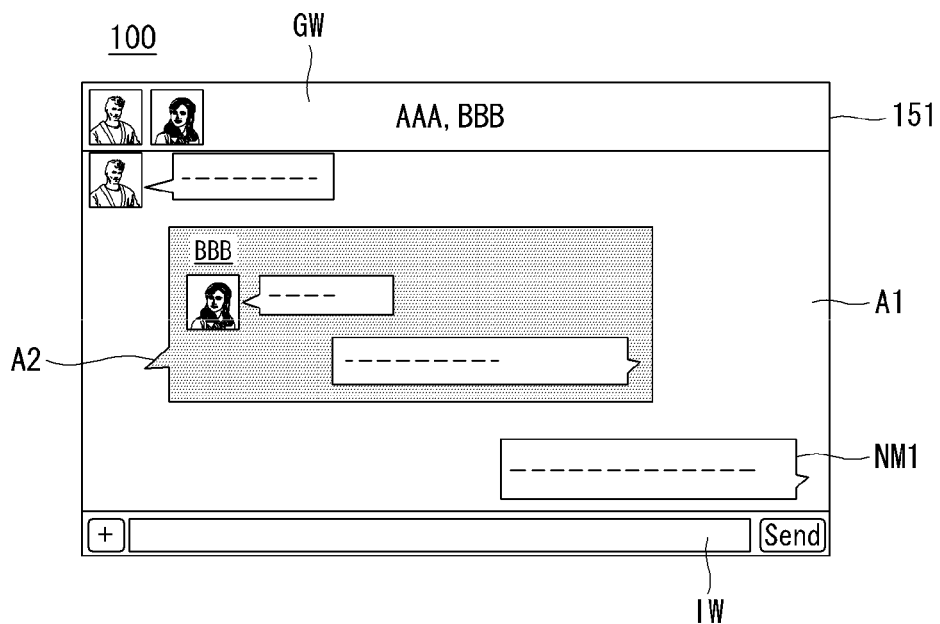
Figure 24:
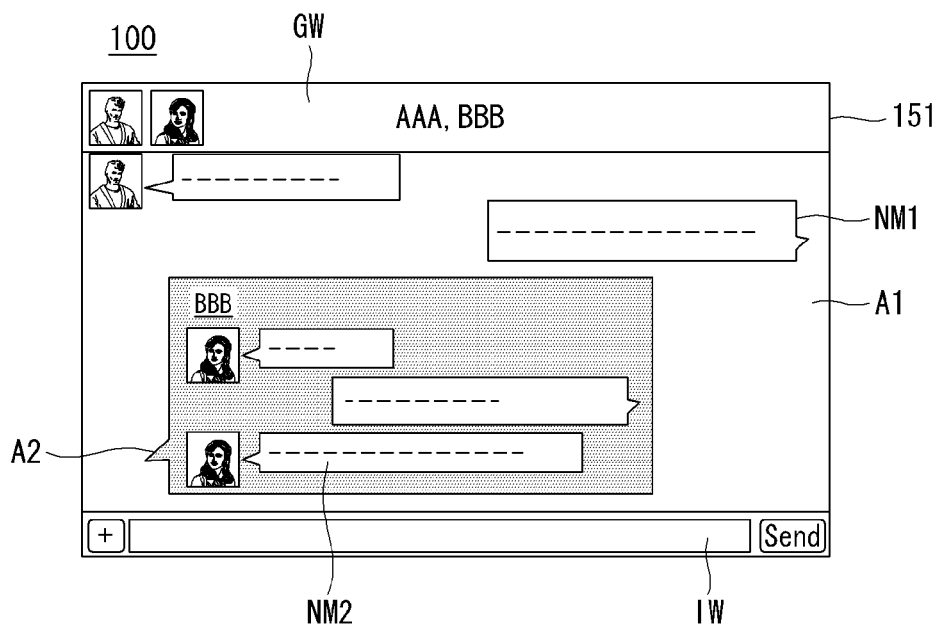

FIGS. 23 and 24 illustrate examples of aligning messages.

Referring to FIG. 23, the controller 180 controls to sequentially display messages according to a message transmitting time or a message receiving time. That is, the controller 180 controls to sequentially display messages regardless of whether a message is a group message or a private message.

Referring to FIG. 23, when a message NM1 to transmit to another party as a group is input while private chatting with another party BBB through a private chat area A2, the controller 180 controls to scroll the private chat area A2 in an upper direction of the screen. Further, the controller 180 controls to display the input message NM1 below the private chat area A2.

Thereafter, the user can perform private chat by generating a new private chat area for private chat following a finally displayed message NM1.

Referring to FIG. 24, the controller 180 may control to display each message in a predetermined area regardless of a transmitting time or a receiving time. That is, a private message may be sequentially displayed in a private chat area.

Referring to FIG. 24, when a first message NM1 to transmit as a group is input, the controller 180 controls to display the first message NM1 in a group chat area A1 following previously transmitted or received group messages. Here, messages displayed within the group chat area A1 are aligned in time order of messages transmitted or received regardless of a transmitting time and a receiving time of messages displayed within a private chat area A2.

Thereafter, when a second message NM2 is received one-on-one from another party BBB, the controller 180 controls to display the received second message NM2 following messages previously transmitted or received one-on-one with the another party BBB in the private chat area A2. Here, messages displayed within the private chat area A2 are aligned in time order of messages transmitted or received one-on-one with the another party BBB regardless of a transmitting time and a receiving time of messages displayed within the group chat area A1.

According to the first exemplary embodiment of the present invention, when a new message is received from a specific another party, the controller 180 controls to display an indicator indicating reception of the new message. Thereafter, when an indicator indicating reception of the new message is selected, the controller 180 controls to move to a chat corresponding to the received new message.

Figure 25:
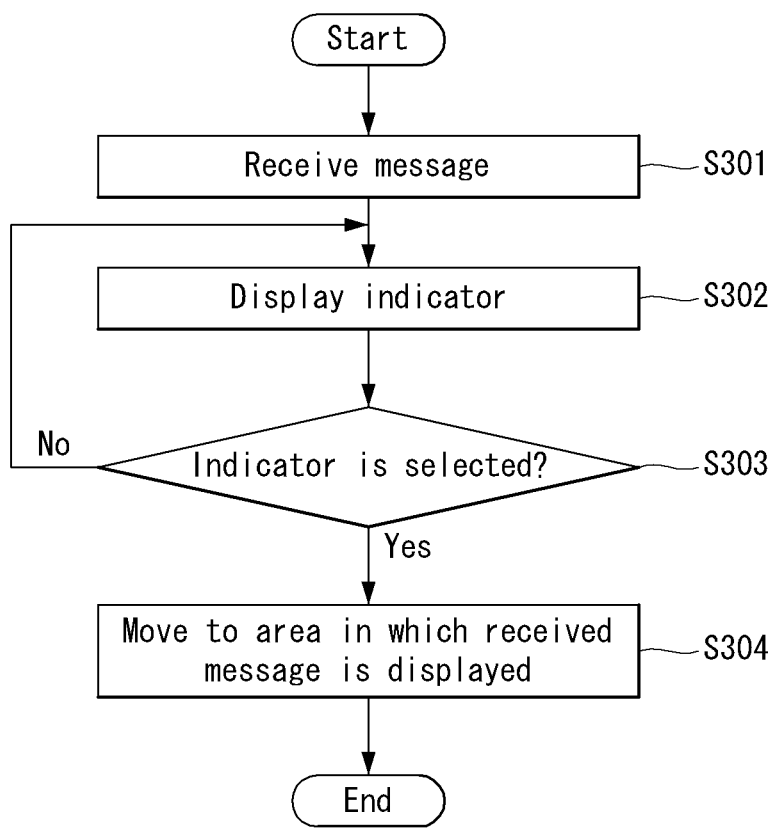
FIG. 25 is a flowchart illustrating a method for displaying a received message in a mobile terminal according to a first exemplary embodiment of the present invention.

FIG. 25 is a flowchart illustrating a method for displaying a received message in the mobile terminal 100 according to a first exemplary embodiment of the present invention. Further, FIG. 26 illustrates a method for displaying a receiving message of FIG. 25.

Referring to FIG. 25, the controller 180 receives a message from a specific another party while chatting through a group chat window (S301). Further, the controller 180 controls to display an indicator indicating a reception of a new message at a specific position within the group chat window (S302).

Thereafter, when the indicator indicating a reception of the new message is selected (S303), the controller 180 controls to move to a chat area corresponding to the received new message (S304).

For example, if the received message is a message received as a group, the controller 180 displays the received new message in a group chat area, and controls to move to the group chat area in which the received message is displayed.

Further, for example, if the received message is a message received one-on-one, the controller 180 displays the received new message in a private chat area, and controls to move to the private chat area in which the received message is displayed.

FIG. 26 illustrates an example of displaying a received message.

Referring to FIG. 26(*a*), when a new message is received from another party AAA while group chatting, the controller 180 controls to display an indicator I2 indicating reception of the new message at a predetermined position within a group chat window GW.

Further, when the indicator 12 indicating reception of the message is touched, the controller 180 controls to move to a group chat area A1 in which the new message NM4 is displayed, as shown in FIG. 26(*b*).

As described above, if the controller 180 displays an indicator indicating that a new message is received on the screen and moves to an area in which the new message is displayed using the indicator, the user easily move to the area in which the new message is displayed.

According to the first exemplary embodiment of the present invention, the controller 180 easily copies and pastes a message displayed in a specific chat area by moving the message to another chat area.

Figure 27:
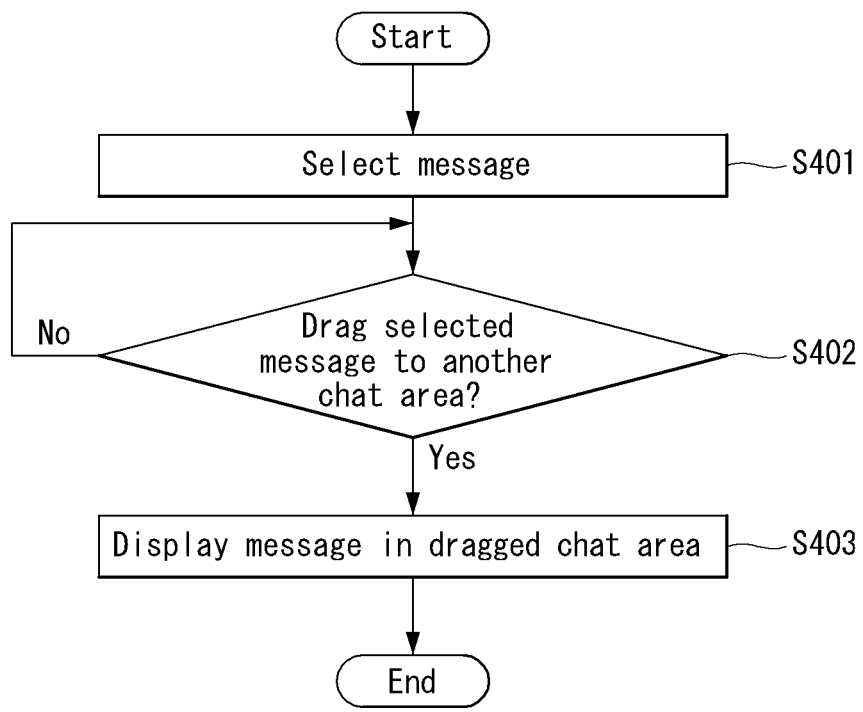
FIG. 27 is a flowchart illustrating a method of moving a message in a mobile terminal according to a first exemplary embodiment of the present invention.

FIG. 27 is a flowchart illustrating a method of moving a message in the mobile terminal 100 according to a first exemplary embodiment of the present invention. Further, FIG. 28 illustrates the method of moving a message of FIG. 27.

Referring to FIG. 27, the controller 180 selects a message displayed in a group chat area or a private chat area based on the user's selection input (S401).

Further, when the selected message is moved to another chat area instead of a present chat area (S402), the controller 180 controls to display the selected message in a chat area to which the selected message is moved (S403). Further, the controller 180 transmits the selected message to at least one another party chatting through a chat area in which the selected message is displayed.

FIG. 28 illustrates an example of moving a message to another chat area.

Referring to FIG. 28(*a*), when a message M1 displayed in a private chat area A2 is touched and dragged to a group chat area A1, the controller 180 controls to copy the message M1 and paste a message M1' identical to the message M1 to the group chat area A1, as shown in FIG. 28(*b*). Further, the controller 180 transmits the message M1' to a plurality of another parties AAA and BBB while group chatting through the group chat area A1.

FIG. 28 illustrates a case of copying and displaying a message displayed in a private chat area to a group chat area. But, according to the first exemplary embodiment of the present invention, a message displayed in a group chat area can be copied and displayed to a private chat area.

According to the first exemplary embodiment of the present invention, the controller 180 may hide one of a group chat area and a private chat area, or display only one of the group chat area and the private chat area within a group chat window.

FIG. 29 illustrates an example of hiding the selected chat area in a group chat window.

Referring to FIG. 29(a), when one of private chat areas A21 and A22 is touched for a predetermined time period or more, the controller 180 controls to display selectable menu items related to a display function of the private chat areas A21 and A22 on a screen.

Thereafter, when an item MI1 for displaying only chat contents displayed in private chat areas A21 and A22 of menu items is selected, the controller 180 inactivates a display of chat contents displayed in a group chat area A1, as shown in FIG. 29(b). Further, the controller 180 controls to display only the private chat areas A21 and A22 and messages displayed within the private chat area A21 and A22 on the screen.

FIG. 30 illustrates an example of displaying only the selected chat area in a group chat window.

Referring to FIG. 30(a), when an item MI2 related to a hiding function of a chat contents displayed in a private chat area A2 among selectable menu items related to a display function of the private chat area A2 is selected, the controller 180 inactivates a display of the private chat area A2 and messages displayed within the private chat area A2, as shown in FIG. 30(b). Further, the controller 180 controls to display only the group chat area A1 and messages displayed within the group chat area A1 on the screen.

According to the first exemplary embodiment of the present invention, the controller 180 adds new another party into a specific chat area based on a selection input of the user.

Figure 31:
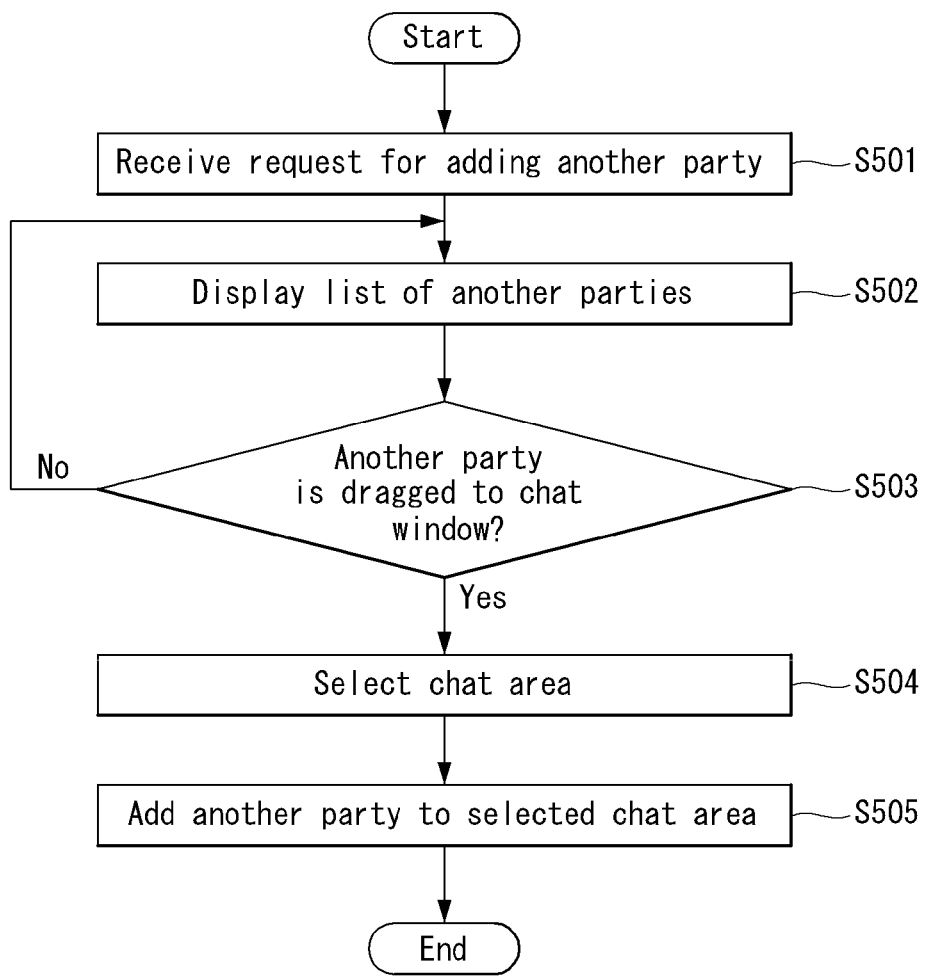
FIG. 31 is a flowchart illustrating a method of adding another party in a mobile terminal according to a first exemplary embodiment of the present invention.
Figure 33:
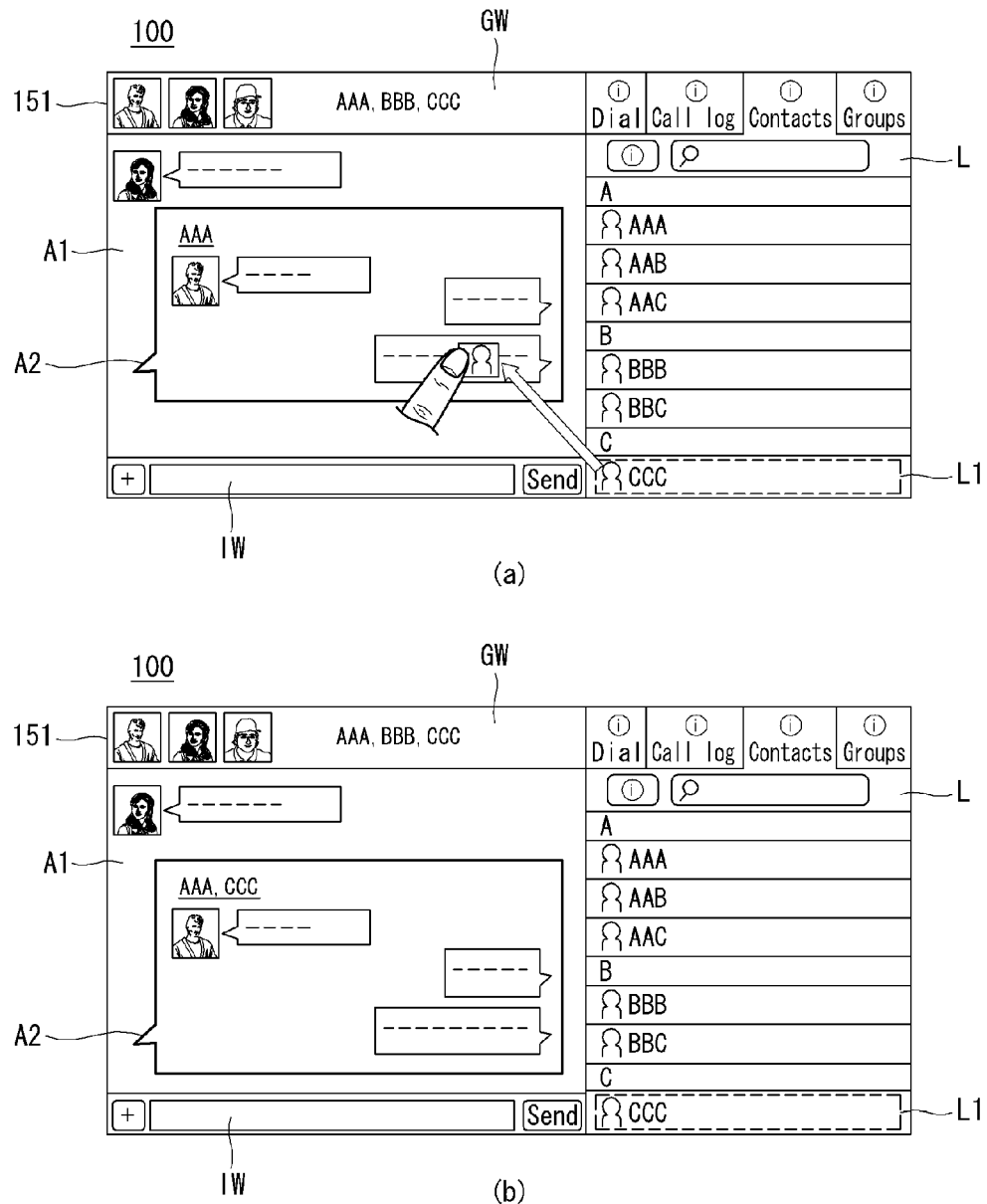

FIG. 31 is a flowchart illustrating a method of adding another party in the mobile terminal 100 according to a first exemplary embodiment of the present invention. Further, FIGS. 32 and 33 illustrate a method of adding another party of FIG. 31.

Referring to FIG. 31, the controller 180 receives a request for adding chat another party from the user (S501). Accordingly, the controller 180 acquires contact information from the memory 160. Further, the controller 180 controls to display a list of another parties that can add to a chat window based on the acquired contact information (S502).

Thereafter, if a specific another party is selected from the list and the selected another party is dragged to a chat window, the controller 180 selects a chat area into which the selected another party is added based on a position at which the selected another party is dragged (S503, S504). Further, the controller 180 adds the selected another party as chat another party of the selected chat area (S505).

For example, when a specific another party selected from the list is dragged to a group chat area, the controller 180 may add the selected another party as another party chatting through the group chat area.

Further, for example, when a specific another party selected from the list is dragged to a private chat area, the controller 180 adds the selected another party as another party chatting through the private chat area. Thereafter, as the new another party is added into the private chat area, a message transmitted or received through the private chat area to which the new another party is added is transmitted to or received from a plurality of another parties including newly added another party as a group.

FIGS. 32 and 33 illustrate examples of adding another party.

Referring to FIG. 32(a), when a request for adding another party is received, the controller 180 controls to display a list L of another parties that can be added in a partial area of the screen.

Thereafter, when another party L1 included in the list L is touched and dragged to a chat window by the user, the controller 180 selects a chat group based on a position at which another party L1 is dragged.

When the selected another party L1 is dragged to the group chat area A1, the controller 180 adds the selected another party L1 as chat another party of the group chat area A1, as shown in FIG. 32(b).

Referring to FIG. 33(a), when another party L1 included in a list L is touched and dragged to a private chat area A2, the controller 180 adds the selected another party L1 as chat another party of the private chat area A2, as shown in FIG. 33(b).

According to the first exemplary embodiment of the present invention, a private chat area displayed within a group chat window may be separated as a separate private chat window.

Figure 34:
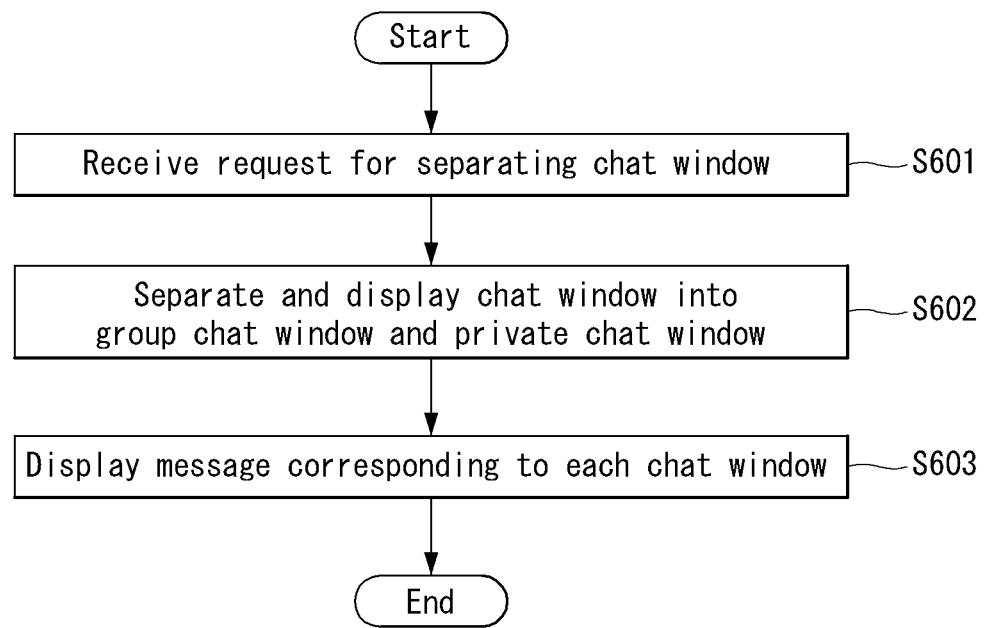
FIG. 34 is a flowchart illustrating a method of separating a chat window of a mobile terminal according to a first exemplary embodiment of the present invention.
Figure 36:
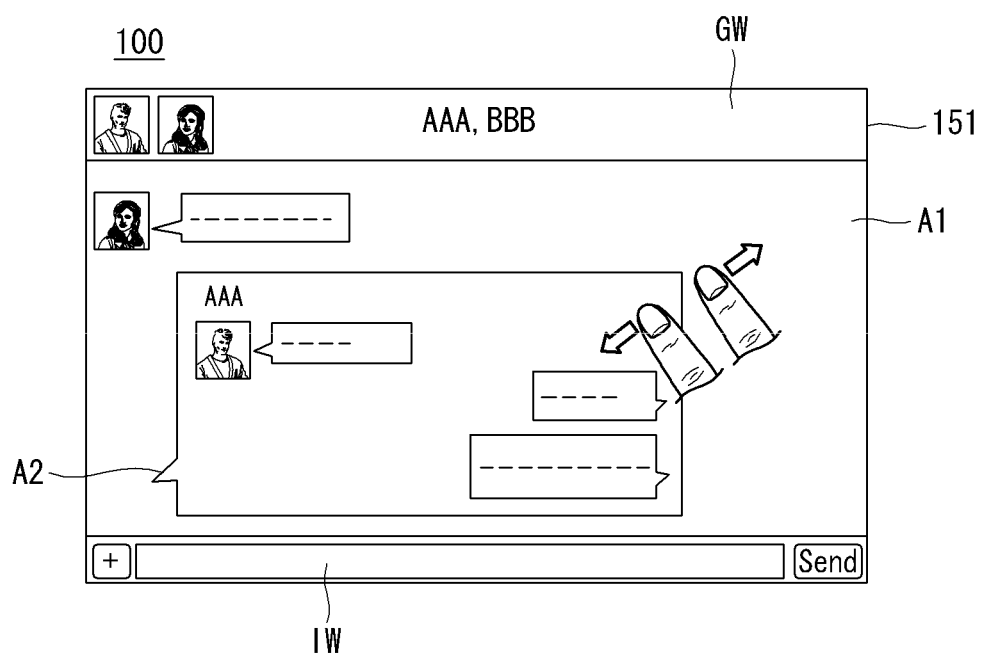

FIG. 34 is a flowchart illustrating a method of separating a chat window of the mobile terminal 100 according to a first exemplary embodiment of the present invention. FIGS. 35 to 37 illustrate a method of separating a chat window of FIG. 34.

Referring to FIG. 34, as described above, while displaying a group message and a private message using one chat window, the controller 180 receives a request for separating chat windows from the user (S601).

Accordingly, the controller 180 controls to separate a group chat window in which group chat contents are displayed and a private chat window in which private chat contents are displayed (S602).

Further, the controller 180 controls to display each message in a chat window corresponding to each message (S603). That is, the controller 180 controls to display group chat contents displayed in a group chat area in the group chat window and to display private chat contents displayed in a private chat area in the private chat window.

At step S601, a control input for requesting separation of chat windows may be received by various methods.

The controller 180 receives the control input for requesting separation of chat windows based on a touch input that is input to a chat window.

For example, when a private chat area displayed within a chat window is touched and dragged to a specific area, the controller 180 may receive a request for separation of chat windows.

Further, for example, when a group chat area and a private chat area provided within one chat window are multi-touched and pinched-out, the controller 180 may receive a request for separation of a chat window.

Further, when a view mode of the mobile terminal 100 is changed, the controller 180 may receive a request for separation of a chat window.

FIGS. 35 to 37 illustrate examples of separating a chat window.

Referring to FIG. 35(a), when a private chat area A2 displayed within the group chat window GW is touched for predetermined time period or more and dragged to the outside of a display area, the controller 180 receives a request for separation of a chat window.

Accordingly, the controller 180 separates a private chat window PW from the group chat window GW and controls to display chat windows GW and PW separately, as shown in FIG. 35(b).

Accordingly, message input windows IW1 and IW2 for inputting a message transmitted through each chat window GW and PW are displayed to each chat window GW and PW separately. Further, a message displayed in the group chat area A1 is displayed in a separated group chat window GW, and a message displayed in the private chat area A2 is displayed in a separated private chat window PW.

Referring to FIG. 36, when the group chat area A1 and the private chat area A2 are multi-touched and pinched-out, the controller 180 receives a chat window separation request. Accordingly, the controller 180 separates the private chat window PW from the group chat window GW and controls to display chat windows GW and PW in separated areas, as shown in FIG. 35(b).

Referring to FIG. 37(a), the controller 180 controls to display a group chat window GW including the private chat area A2 in a portrait view mode.

Thereafter, when the mobile terminal 100 rotates, the controller 180 converts a view mode of the mobile terminal 100 to a landscape view mode and receives a separation request of chat window, as shown in FIG. 37(b).

Accordingly, the controller 180 separates the private chat window PW from the group chat window GW and controls to display two chat windows GW and PW in separated areas.

According to the first exemplary embodiment of the present invention, if a plurality of private chat areas exist within one group chat window or another private chat area is displayed within a private chat area, the controller 180 may separate a partial private chat area as a separate chat window or separate each of all private chat areas as a separate chat window, as shown in FIGS. 12 and 15.

FIGS. 38 and 39 illustrate other examples of separating a chat window.

Referring to FIG. 38(a), the controller 180 provides a first private chat area A2 for displaying a message transmitted or received one-on-one with another party BBB within a group chat window GW for group chatting with a plurality of another parties AAA and BBB. Further, the controller 180 displays a second private chat area A3 for private chatting with another party AAA within the group chat area A1.

Thereafter, when the second private chat area A3 displayed within the group chat window GW is touched for a predetermined time period or more and dragged to the outside of a display area, the controller 180 receives a chat window separation request.

Accordingly, as shown FIG. 38(b), the controller 180 separates the second private chat area A3 from the group chat window GW, and separately generates a private chat window PW1 corresponding to the private chat area A3. Further, the controller 180 controls to display the group chat window GW and the private chat window PW1 in separated areas.

Referring to FIG. 39(a), in a portrait view mode, the controller 180 provides a first private chat area A2 for displaying private chat contents with another party BBB and another party AAA within a group chat window GW. Further, the controller 180 controls to display a second private chat area A3 for private chatting with the another party AAA within the first private chat area A2.

Thereafter, when the mobile terminal 100 rotates, the controller 180 converts a view mode of the mobile terminal 100 to a landscape view mode and receives a chat window separation request, as shown in FIG. 39(b).

Accordingly, the controller 180 separates each private chat area A2 and A3 from the group chat window GW, and generates private chat windows PW1 and PW2 corresponding to each of private chat areas A2 and A3, respectively. Further, the controller 180 controls to display the group chat window GW and two private chat windows PW1 and PW2 in separated areas.

Hereinafter, a method for displaying a message of the mobile terminal 100 according to a second exemplary embodiment of the present invention and operation of the mobile terminal 100 for embodying the same will be described in detail with reference to necessary drawings.

Figure 40:
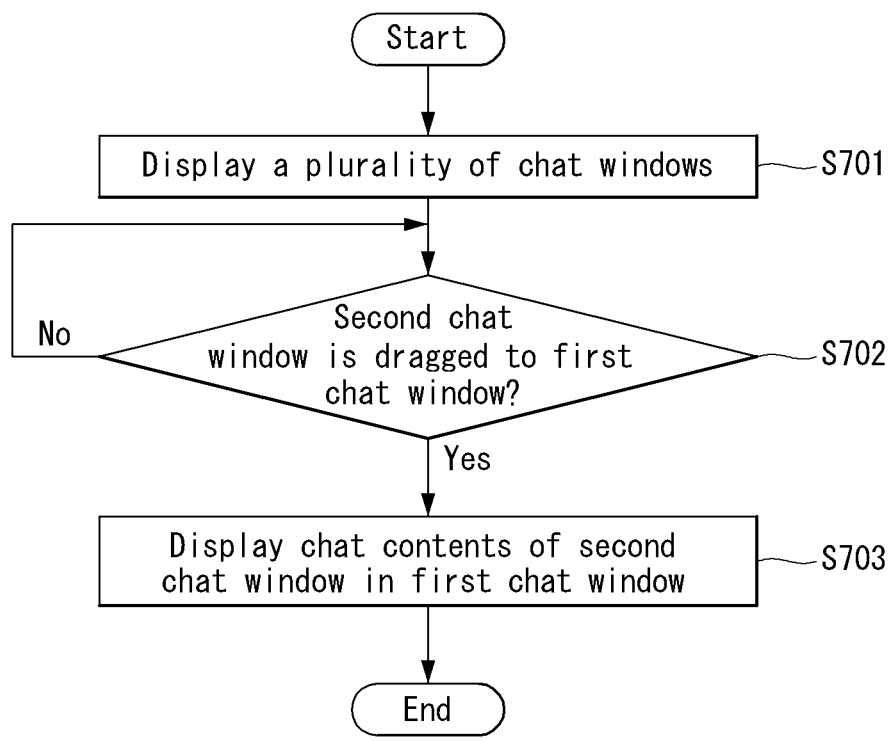
FIG. 40 is a flowchart illustrating a method for displaying a message in a mobile terminal according to a second exemplary embodiment of the present invention.
Figure 41:
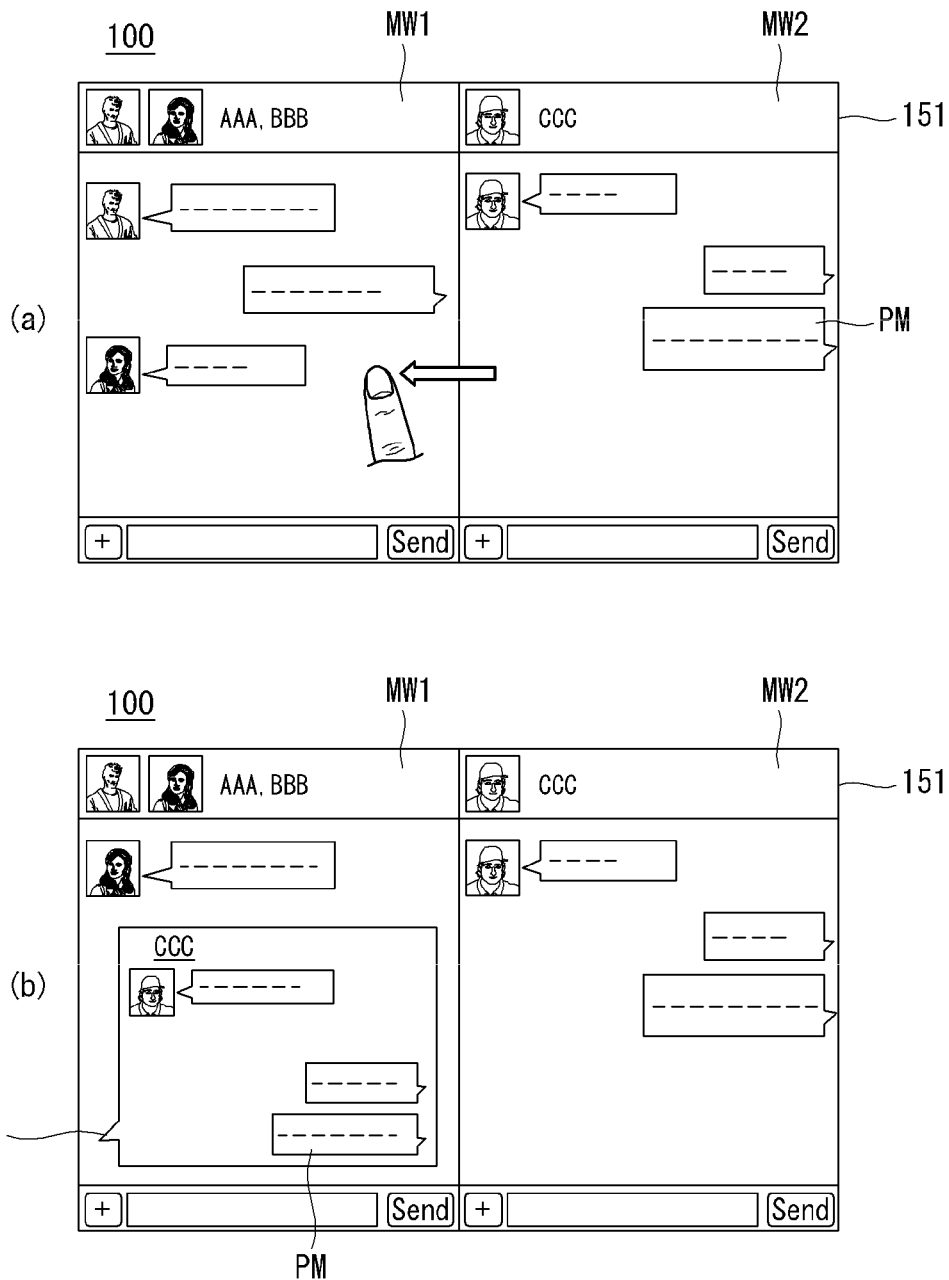
FIG. 41 illustrates an example of sharing a message between chat windows in a mobile terminal according to a second exemplary embodiment of the present invention.

FIGS. 40 to 41 illustrate a method for displaying a message of the mobile terminal 100 according to a second exemplary embodiment of the present invention.

FIG. 40 is a flowchart illustrating a method for displaying a message of the mobile terminal 100 according to a second exemplary embodiment of the present invention. Further, FIG. 41 illustrates the method of displaying a message of FIG. 40.

Referring to FIG. 40, the controller 180 controls to display a plurality of chat windows for transmitting and receiving a message with different at least one another party on a screen based on the user's control input (S701).

Thereafter, if a second chat window of chat windows is dragged to a first chat window, the controller 180 controls to display at least one message displayed within the second chat window within the first chat window (S702, S703). Further, the controller 180 shares at least one message displayed within the second chat window with at least one another party while chatting through the first chat window (S704). That is, the controller 180 transmits at least one message displayed within the second chat window to at least one another party while chatting through the first chat window.

FIG. 41 illustrates an example of sharing a message between chat windows.

Referring to FIG. 41(a), the controller 180 controls to display a first chat window MW1 for displaying a message transmitted to or received from a plurality of another parties AAA and BBB and a second chat window MW2 for displaying a message transmitted to or received from another party CCC in different areas.

Thereafter, when the second chat window MW2 is touched and dragged to the first chat window MW1, the controller 180 controls to copy and pastes chat contents of the second chat window MW2 to the first chat window MW1, as shown in FIG. 41(b).

Referring to FIG. 41(b), when sharing of chat contents is requested, the controller 180 generates a sharing area SA1 to display shared chat contents in the first chat window MW1, and controls to display chat contents copied from the second chat window MW2 within the sharing area SA1.

FIG. 41(b) illustrates a case where the sharing area SA1 is displayed in a speech balloon form, but the present invention is not limited thereto. According to the present invention, the sharing area may be displayed in various forms.

Hereinafter, a method for displaying a message of the mobile terminal 100 according to a third exemplary embodiment of the present invention and operation of the mobile terminal 100 for embodying the same will be described in detail with reference to necessary drawings.

Figure 42:
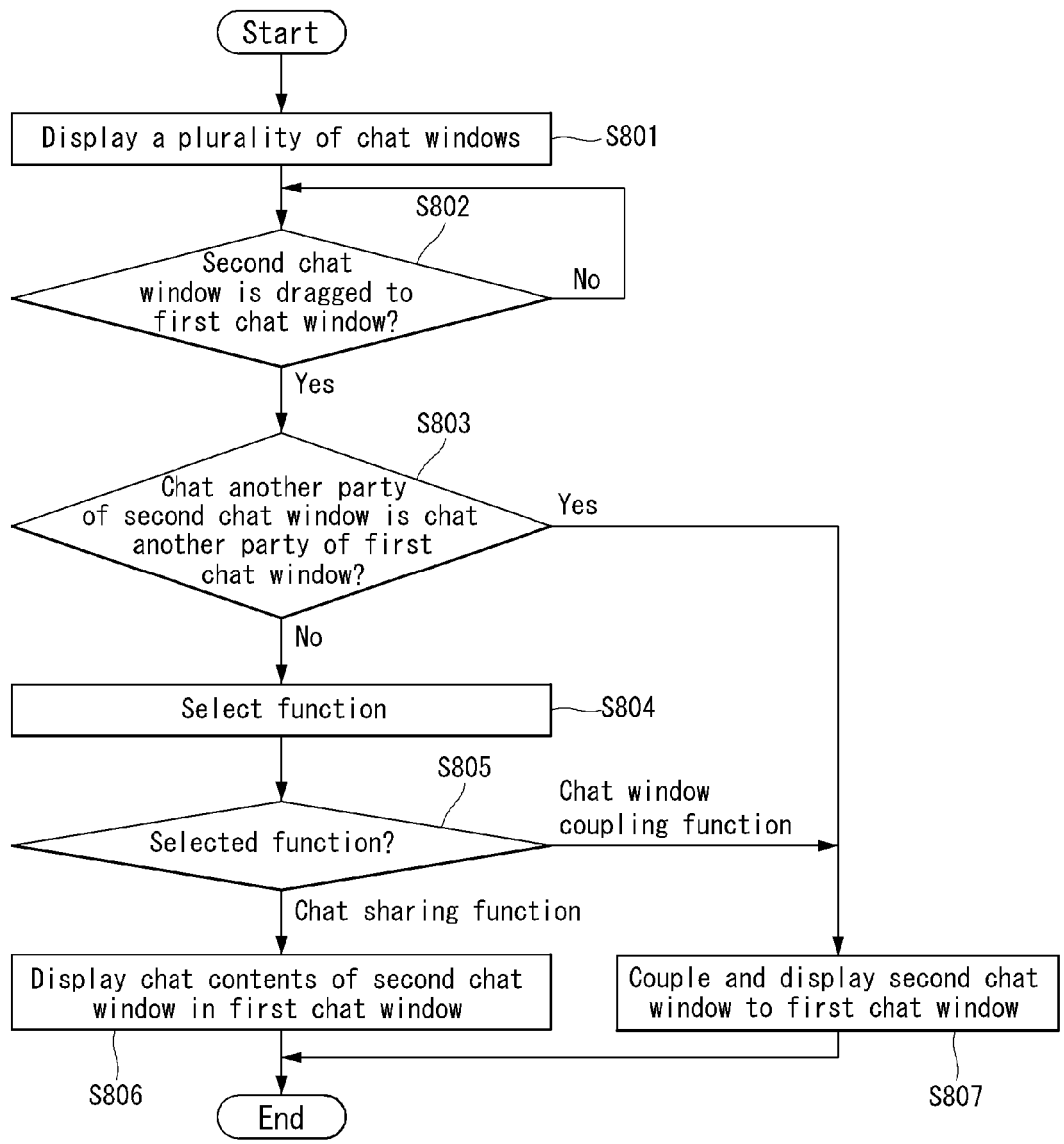
FIG. 42 is a flowchart illustrating a method for displaying a message in a mobile terminal according to a third exemplary embodiment of the present invention.

FIGS. 42 to 43 are diagrams illustrating a method for displaying a message of the mobile terminal 100 according to a third exemplary embodiment of the present invention.

FIG. 42 is a flowchart illustrating a method for displaying a message of the mobile terminal 100 according to a third exemplary embodiment of the present invention. Further, FIG. 43 illustrates a method for displaying a message of FIG. 42.

Referring to FIG. 42, the controller 180 controls to display a plurality of chat windows for transmitting or receiving a message with different at least one another party on a screen based on the user's control input (S801).

Thereafter, if a second chat window of chat windows is dragged to a first chat window of chat windows, the controller 180 determines whether a least one another party transmitting and receiving a message through the second chat window is another party transmitting and receiving a message through the first chat window (S802, S803).

If the least one another party transmitting and receiving a message through the second chat window is not another party transmitting and receiving a message through the first chat window, the controller 180 selects one of a sharing function of chat contents and a integrating function of chat windows based on the user's control input (S804).

The controller 180 determines whether the selected function is the sharing function or the integrating function (S805). And, if the selected function is the function, the controller 180 generates a sharing area for displaying chat contents of the second chat window within the first chat window and controls to display chat contents of the second chat window in the generated sharing area (S806).

If the selected function is the integrating function, the controller 180 controls to integrate the second chat window to the first chat window (S807).

If a least one another party transmitting and receiving a message through the second chat window is another party transmitting and receiving a message through the first chat window at step S803, the controller 180 controls to integrate the second chat window to the first chat window (S807). Here, a method of integrating chat windows is similar to a method of integrating chat windows described with reference to FIGS. 5 to 39. Accordingly, a detailed description of the method of integrating chat windows at step S803 therefore will be omitted.

Referring to FIG. 43(a), the controller 180 controls to display a first chat window MW1 for displaying a message transmitted to or received from a plurality of another parties AAA and BBB and a second chat window MW2 for displaying a message transmitted and received with another party CCC in different areas.

Thereafter, when the second chat window MW2 is touched and dragged to the first chat window MW1, the controller 180 determines whether another party CCC while chatting through the second chat window MW2 is another party while chatting through the first chat window MW1.

If another party CCC while chatting through the second chat window MW2 is not another party while chatting through the first chat window MW1, the controller 180 controls to display menu items for selecting one of a integrating function MI3 of chat windows and a sharing function MI4 of chat contents on a screen, as shown in FIG. 43(b).

The controller 180 controls to integrate the second chat window MW2 to the first chat window MW1 or to copy and paste chat contents of the second chat window MW2 to the first chat window MW1 based on the selected menu item.

According to the foregoing exemplary embodiment, the mobile terminal 100 provides a group chat area for group chat with a plurality of another parties and a private chat area for private chat with a specific another party within one chat window, and thus can perform together group chat and private chat using one chat window, whereby user convenience is improved.

Further, when sharing a message between chat windows, it is unnecessary to perform operation such as separate copy and paste and thus user convenience is improved.

The above-described method of displaying a message of a mobile terminal according to the present invention can be recorded and provided in a computer recordable medium with a program for executing in a computer.

A method for displaying a message of a mobile terminal according to the present invention can be executed through software. When executed with software, constituent means of the present invention are code segments that execute a necessary operation. Program or code segments may be stored in a processor recordable medium or may be transmitted by a computer data signal coupled to a carrier wave in a transmission medium or a communication network.

The disclosed message display method for the mobile terminal may be written as computer programs and may be implemented in digital microprocessors that execute the programs using a computer readable recording medium. The message display method for the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that may store data and may be read by a computer system. Examples of the computer readable recording medium may include read-only memory (ROM), random-access memory (RAM), CD-ROMs, DVD±ROM, DVD-RAM, magnetic tapes, floppy disks, and optical data storage devices. The computer readable recording medium may also be distributed over network coupled computer systems such that the computer readable code is stored and executed in a distributed manner.

The foregoing embodiments and features are merely exemplary in nature and are not to be construed as limiting the present invention. The disclosed embodiments and features may be readily applied to other types of apparatuses. The description of the foregoing embodiments is intended to be illustrative, and not to limit the scope of the claims. Many alternatives, modifications, and variations will be apparent to those skilled in the art.

What is claimed is:

1. A mobile terminal comprising:
a wireless communication unit configured to communicate with a plurality of devices;
a display configured to display information; and
a controller configured to:
cause the display to display a first window for displaying a plurality of messages communicated with the plurality of devices, the plurality of messages comprising a first message, and each of the plurality of messages displayed in a corresponding one of a plurality of first areas within the first window;
cause the display to display a second window for displaying at least one message communicated only with a first device among the plurality of devices;
recognize an input for displaying a second area including the at least one message within the first window while the plurality of messages are displayed in the plurality of first areas;
cause the display to display the second area within the first window in response to the recognized input such that the second area is displayed visually distinguishably from the plurality of first areas and sequentially following a last one of the plurality of first areas, at least a portion of the plurality of messages and at least a portion of the at least one message displayed together in the first window, the last one of the plurality of first areas including a last message communicated with one of the plurality of devices prior to receiving the input;

cause the display to display a second message sequentially following the second area such that the second area is located between the first message and the second message that are displayed in a corresponding one of the plurality of first areas within the first window, the second message received from one of the plurality of devices while the second area is displayed within the first window; and cause the display to display a third message within the second area sequentially following a last one of the at least one message such that the first message, the second message, and the second area are displayed within the first window, the third message received from the first device while the second area is displayed within the first window, wherein the plurality of messages are displayable at all of the plurality of devices.

2. The mobile terminal of claim 1, wherein the controller is further configured to cause the display to terminate displaying of the second window in response to the input such that at least a portion of the second window is integrated into the first window and the first window is enlarged.

3. The mobile terminal of claim 2, wherein the input comprises rotation of the mobile terminal from a first orientation to a second orientation.

4. The mobile terminal of claim 3, wherein the controller is further configured to cause the display to display the first window and the second window separately on the display and terminate display of the second area within the first window in response to rotation of the mobile terminal from the second orientation to the first orientation.

5. The mobile terminal of claim 2, wherein the display comprises a touch screen and the input comprises dragging a pointer in contact with the touch screen from the second window to the first window.

6. The mobile terminal of claim 2, wherein the display comprises a touch screen and the controller is further configured to cause the display to display the first window and the second window separately and terminate display of the second area within the first window when the second area is touched for at least threshold time period and dragged to a specific area on the touch screen.

7. The mobile terminal of claim 1, wherein the display comprises a touch screen and the input comprises dragging one of the plurality of messages to an area of the first window by a pointer in contact with the touch screen.

8. The mobile terminal of claim 1, wherein:

the controller is further configured to cause the display to display a third area within the first window for displaying at least one message communicated only with a second device among the plurality of devices such that the second window is no longer displayed; and the at least one message communicated only with the second device is displayable only at the second device and the mobile terminal.

9. The mobile terminal of claim 8, wherein the controller is further configured to:

re-display the second window and display a third window comprising the at least one message communicated only with the second device in response to an input for allocating the plurality of first areas, the second area, and the third area from the first window to the first, second, and third windows; and cause the display to display the first, second, and third windows separately.

10. The mobile terminal of claim 8, wherein the display comprises a touch screen and the controller is further configured to cause the touch screen to display the third area within the second area in response to dragging a pointer in contact with the touch screen within the second area.

11. The mobile terminal of claim 10, wherein the second area is identified by information associated with the first device and the third area is identified by information associated with the second device.

12. The mobile terminal of claim 1, further comprising an input unit, wherein the controller is further configured to cause the display to:

display an input window for displaying a message to be transmitted that is input via the input unit; and display the message within one area selected among the plurality of first areas and the second area.

13. The mobile terminal of claim 12, wherein the controller is further configured to:

cause the wireless communication unit to transmit the message to the plurality of devices or only to the first device based on the selected area; and cause the display to highlight the selected area.

14. The mobile terminal of claim 13, wherein the controller is further configured to cause the display to display the input window with a color corresponding to the selected area.

15. The mobile terminal of claim 1, wherein the controller is further configured to:

cause the display to display a list of information related to devices such that at least one device related to information selected from the list is added to at least the plurality of first areas or the second area; and add the selected at least one device to the plurality of first areas or the second area when information associated with the selected at least one device is dragged from the list to at least the plurality of first areas or the second area.

16. The mobile terminal of claim 1, wherein the controller is further configured to:

detect dragging of the first message between the first and second areas; and cause the wireless communication unit to transmit the first message to all devices included in the second area or first area to which the first message was dragged.

17. The mobile terminal of claim 1, wherein the controller is further configured to cause the display to:

display a message communicated with the plurality of devices and the second area sequentially in chronological order such that a position of the second area is changed when a new message is generated in one of the plurality of first areas; and display the new message in the first area.

18. The mobile terminal of claim 1, wherein the controller is further configured to cause the display to:

display the plurality of messages sequentially in chronological order within the plurality of first areas;

display the at least one message communicated only with the first device sequentially in chronological order within the second area; and fix a position of the second area on the display such that the second area is displayed at a same position on the display when a new message is generated in one of the plurality of first area or the second area.

19. A method for displaying a message at a mobile terminal, the method comprising:

displaying a first window on a display for displaying a plurality of messages communicated with a plurality of devices;

displaying the plurality of messages comprising a first message on the display such that each of the plurality of messages is displayed in a corresponding one of a plurality of first areas within the first window;

displaying a second window on the display for displaying at least one message communicated only with a first device among the plurality of devices;

recognizing an input for displaying a second area including the at least one message within the first window while the plurality of messages are displayed in the plurality of first areas;

displaying the second area on the display within the first window in response to the recognized input such that the second area is displayed visually distinguishably from the plurality of first areas and sequentially following a last one of the plurality of first areas, the last one of the plurality of first areas including a last message communicated with one of the plurality of devices prior to receiving the input, at least a portion of the plurality of messages and at least a portion of the at least one message displayed together in the first window;

displaying a second message on the display sequentially following the second area such that the second area is located between the first message and the second message that are each displayed in a corresponding one of the plurality of first areas within the first window, the second message received from one of the plurality of devices while the second area is displayed within the first window, and displaying a third message on the display within the second area sequentially following a last one of the at least one message such that the first message, the second message, and the second area are displayed within the first window, the third message received from the first device while the second area is displayed within the first window, wherein the plurality of messages are displayable at all of the plurality of devices.

20. The method of claim 19, further comprising:

displaying a message input window;

receiving a message via the message input window; and displaying the first area and the second area such that the second area is distinctively displayed over the first area, wherein the at least one message is displayable at the mobile terminal and only the first device of the plurality of devices, and wherein the message input window, which is displayed when only the first area is displayed, is displayed at a same position on a display screen when both the first area and second area are displayed such that the same message input window is used to receive a message to be transmitted to the plurality of devices and a message to be transmitted only to the first device.

* * * * *